(12) United States Patent
Freeman et al.

(10) Patent No.: US 9,729,064 B2
(45) Date of Patent: *Aug. 8, 2017

(54) ELECTRICAL CIRCUIT FOR DELIVERING POWER TO CONSUMER ELECTRONIC DEVICES

(71) Applicant: Advanced Charging Technologies, LLC, Tulsa, OK (US)

(72) Inventors: Michael H. Freeman, Tulsa, OK (US); Robert Dieter, Jr., Owasso, OK (US); Mitchael C. Freeman, Sapupla, OK (US); Sateesh Pillai, Murphy, TX (US); Daniel Segarra, Marlborough, MA (US)

(73) Assignee: Advanced Charging Technologies, LLC, Tulsa, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/157,724

(22) Filed: May 18, 2016

(65) Prior Publication Data

US 2016/0373012 A1    Dec. 22, 2016

Related U.S. Application Data

(63) Continuation of application No. 14/304,774, filed on Jun. 13, 2014, now Pat. No. 9,407,154.

(Continued)

(51) Int. Cl.
*H02M 3/335* (2006.01)
*H02M 1/08* (2006.01)
(Continued)

(52) U.S. Cl.
CPC ......... *H02M 3/33507* (2013.01); *H02M 1/08* (2013.01); *H02M 1/36* (2013.01);
(Continued)

(58) Field of Classification Search
CPC ............... H02M 7/219; H02M 7/4826; H02M 2001/007; H02M 2001/0032; H02M 2001/0054; H02M 2007/2195
See application file for complete search history.

(56) References Cited

U.S. PATENT DOCUMENTS

| 4,720,668 A | 1/1988 | Lee et al. |
| 4,841,220 A | 6/1989 | Tabisz et al. |

(Continued)

OTHER PUBLICATIONS

Chinese Office Action ~ (English Translation 1st then the Chinese Office Action (CN 201480041284.7, O/R 068466.00110); Issue Date: Aug. 1, 2016.

(Continued)

*Primary Examiner* — Matthew Nguyen
*Assistant Examiner* — Yusef Ahmed
(74) *Attorney, Agent, or Firm* — Maschoff Brennan

(57) ABSTRACT

An electrical circuit for providing electrical power for use in powering electronic devices is described herein. The electrical circuit includes a power converter circuit that is electrically coupled to an electrical power source for receiving alternating current (AC) input power from the electrical source and delivering direct current (DC) output power to an electronic device. The power converter circuit includes a transformer and a switching device coupled to a primary side of the transformer for delivering power from the electrical power source to a primary side of the transformer. A controller is coupled to a voltage sensor and the switching device for receiving the sensed voltage level from the voltage sensor and transmitting a control signal to the switching device to adjust the voltage level of power being delivered to the electronic device.

16 Claims, 44 Drawing Sheets

Synchronous Modified Çuk Converter with Quasi-Resonant Front End

Related U.S. Application Data

(60) Provisional application No. 61/844,784, filed on Jul. 10, 2013, provisional application No. 61/841,079, filed on Jun. 28, 2013, provisional application No. 61/835,438, filed on Jun. 14, 2013.

(51) Int. Cl.
| | |
|---|---|
| *H02M 1/36* | (2007.01) |
| *H02M 3/00* | (2006.01) |
| *H02M 3/07* | (2006.01) |
| *H02M 3/337* | (2006.01) |
| *H02M 1/00* | (2006.01) |
| *H02M 3/155* | (2006.01) |

(52) U.S. Cl.
CPC ............ *H02M 3/005* (2013.01); *H02M 3/073* (2013.01); *H02M 3/3376* (2013.01); *H02M 3/33523* (2013.01); *H02M 3/33569* (2013.01); *H02M 3/33592* (2013.01); *H02M 2001/0006* (2013.01); *H02M 2001/0009* (2013.01); *H02M 2001/0032* (2013.01); *H02M 2001/0054* (2013.01); *H02M 2001/0058* (2013.01); *H02M 2003/1557* (2013.01); *Y02B 70/1475* (2013.01); *Y02B 70/1491* (2013.01); *Y02B 70/16* (2013.01)

(56) References Cited

U.S. PATENT DOCUMENTS

| | | | |
|---|---|---|---|
| 5,343,140 A | 8/1994 | Gegner | |
| 5,414,610 A * | 5/1995 | Brainard | H02M 3/33569 363/21.15 |
| 5,663,635 A | 9/1997 | Vinciarelli et al. | |
| 5,999,417 A * | 12/1999 | Schlecht | H02J 1/102 363/131 |
| 6,157,179 A | 12/2000 | Miermans | |
| 6,294,900 B1 | 9/2001 | Greenwood et al. | |
| 6,396,719 B2 * | 5/2002 | Morita | H02M 3/33569 363/21.03 |
| 6,490,177 B1 | 12/2002 | Figueroa | |
| 6,519,165 B2 | 2/2003 | Koike | |
| 6,577,111 B1 * | 6/2003 | Dickmander | H02M 3/33507 323/356 |
| 6,580,259 B2 * | 6/2003 | Liu | H02M 1/4208 323/222 |
| 6,664,762 B2 | 12/2003 | Kutkut | |
| 6,791,853 B2 * | 9/2004 | Afzal | G06F 1/263 307/38 |
| 7,298,631 B2 * | 11/2007 | Tsuruya | H02M 3/33569 363/21.01 |
| 7,518,836 B2 * | 4/2009 | Kim | H02M 1/32 361/18 |
| 7,532,488 B2 | 5/2009 | Tsuruya | |
| 8,098,502 B2 * | 1/2012 | Mao | H02M 1/44 363/21.03 |
| 8,144,486 B2 | 3/2012 | Moon et al. | |
| 2002/0126513 A1 * | 9/2002 | Negru | H02M 3/33592 363/25 |
| 2002/0158616 A1 * | 10/2002 | Kovalevski | H01F 27/402 323/331 |
| 2009/0231894 A1 | 9/2009 | Moon et al. | |
| 2009/0237045 A1 | 9/2009 | Dishman et al. | |
| 2009/0257250 A1 | 10/2009 | Liu | |
| 2010/0118567 A1 * | 5/2010 | Liu | H02M 3/33515 363/31 |
| 2010/0142230 A1 | 6/2010 | Schroder Genannt Berghegger | |
| 2010/0164421 A1 | 7/2010 | Dishman et al. | |
| 2010/0194198 A1 | 8/2010 | Djenguerian et al. | |
| 2010/0195355 A1 | 8/2010 | Zheng | |
| 2010/0208500 A1 | 8/2010 | Yan et al. | |
| 2010/0328969 A1 * | 12/2010 | Meyer | H01L 41/044 363/21.03 |
| 2011/0026275 A1 | 2/2011 | Huang et al. | |
| 2011/0103104 A1 * | 5/2011 | Zhan | H02M 3/33507 363/21.17 |
| 2012/0033451 A1 * | 2/2012 | Usui | H02M 1/4258 363/21.02 |
| 2012/0051097 A1 * | 3/2012 | Zhang | H02M 1/4225 363/21.07 |
| 2012/0243271 A1 * | 9/2012 | Berghegger | H02M 3/33507 363/21.15 |
| 2012/0262953 A1 | 10/2012 | Jungreis et al. | |
| 2013/0094250 A1 | 4/2013 | Weger et al. | |
| 2013/0107585 A1 | 5/2013 | Sims et al. | |
| 2013/0301308 A1 | 11/2013 | Hosotani | |
| 2014/0016359 A1 | 1/2014 | Telefus et al. | |
| 2014/0016364 A1 * | 1/2014 | Chen | H02M 3/33507 363/21.02 |
| 2014/0098577 A1 | 4/2014 | Schroeder gen Berghegger | |
| 2014/0112028 A1 * | 4/2014 | Fahlenkamp | G01R 22/06 363/21.12 |
| 2014/0112030 A1 * | 4/2014 | Fahlenkamp | H02M 3/33507 363/21.14 |
| 2014/0185334 A1 * | 7/2014 | Chen | H02M 1/4225 363/21.12 |
| 2014/0198337 A1 * | 7/2014 | Nakajima | G06K 15/4055 358/1.14 |
| 2014/0268915 A1 | 9/2014 | Kong et al. | |
| 2014/0268938 A1 * | 9/2014 | Matthews | H02M 1/32 363/50 |
| 2014/0321167 A1 * | 10/2014 | Klein | H02M 3/33507 363/16 |
| 2015/0349624 A1 * | 12/2015 | Wang | H02M 1/4225 363/21.09 |

OTHER PUBLICATIONS

Canadian Office Action ~ Canadian Patent Application No. 2,915,376 (O/R 068466.00109; Office Action Issue Date: Sep. 1, 2016.
Wilson C.P. De Aragao Filho et al., A Comparison Between Two Current-Fed Push-Pull DC-DC Converters—Analysis, Design and Experimentation, 1996, pp. 313-320.
B. Swaminathan et al., A novel resonant transition push-pull DC-DC converter, J. Indian Inst. Sci, Nov.-Dec. 2004, pp. 217-232, 84, India.
S. Arulselvi et al., A New Push-Pull Zero Voltage Switching Quasi-Resonant Converter: Topology, Analysis and Experimentation, IEEE Indiacon 2005 Conference, Dec. 11-13, 2005, pp. 482-486, Chennai, India.
Sateesh Pillai, Push Pull Architecture, May 7, 2013, 7 Pages, Intrinsix.
Sateesh Pillai, Simulating Power Converters, May 14, 2013, 7 pages, Intrinsix.
Sateesh Pillai, Testing Needs and BOM for a Power Converter, May 16, 2013, Intrinsix.
Intrinsix Corporation, Phase 0 Project Review for Semitrex, Jun. 5, 2013, 9 Pages.

* cited by examiner

Asynchronous Modified Ćuk Converter

Asynchronous Modified SEPIC Converter

Asynchronous Modified Push-Pull Converter

Synchronous Modified Ćuk Converter

Synchronous Modified SEPIC Converter

Synchronous Modified Push-Pull Converter

Synchronous Modified Ćuk Converter with Quasi-Resonant Front End

Synchronous Modified SEPIC Converter With Quasi-Resonant Front End

Synchronous Modified Push-Pull Converter With Quasi-Resonant Front End

Synchronous Modified Push-Pull Converter With Quasi-Resonant Front End and Hall Effect Sensors Synchronous Modified Buck Converter With Synchronous Rectification on Transformer Primary Voltage Plot At Each Capacitor Voltage Plot Across Each Capacitor Voltage Plot Across Each Switch BiDFET with FET Source Connected to AC Main, Asynchronous Secondary, PWM Controller Referenced to Secondary Asynchronous BiDFET with FETs Blocking Current from Transformer BiDFET With Single Side Switching BiDFET with FET Source Connected to Transformer, Synchronous Secondary, PWM Controller Referenced to Secondary BiDFET with FET Source Connected to Transformer and PWM Controller Referenced to Asynchronous Secondary BiDFET with FET Source Connected to Transformer, Synchronous Secondary, PWM Controller Referenced to Primary BiDFET with FET Source Connected to Transformer, Asynchronous Secondary, PWM Controller Referenced to Primary Asynchronous BiDFET with FETs Blocking Current From AC Source Synchronous BiDFET With FETs Blocking Current From Transformer BiDFET with FET Source Connected to AC Main and PWM Controller Referenced to Synchronous Secondary Block Diagram of Dies for a BiDFET Integrated Module Package

ELECTRICAL CIRCUIT FOR DELIVERING POWER TO CONSUMER ELECTRONIC DEVICES

CROSS-REFERENCES TO RELATED APPLICATIONS

This application is a continuation of U.S. Non-Provisional patent application Ser. No. 14/304,774, filed Jun. 13, 2014, which claims the benefit of U.S. Provisional Patent Application Ser. No. 61/844,784, filed on Jul. 10, 2013, claims the benefit of U.S. Provisional Patent Application Ser. No. 61/841,079, filed on Jun. 28, 2013, and claims the benefit of U.S. Provisional Patent Application Ser. No. 61/835,438, filed on Jun. 14, 2013, all of which are hereby incorporated by reference in their entirety for all purposes.

FIELD OF THE INVENTION

The present invention relates generally to electrical power circuits and, and more particularly, to an electrical power circuit for providing electrical power for use in charging consumer electronic devices.

BACKGROUND OF THE INVENTION

The Energy Crises Requires Demand Side Response That Lowers Current Loads. The Energy Crisis is upon us worldwide. For instance, the U. S. Department of Energy predicts that by 2015 there will not, on the average, be enough electric power to supply average demand in the U.S.

One of the controllable offenders is "Vampire Loads". Also call "Wall Wort Power" or "Standby Power" this electricity waste is estimated by the U.S. Department of Energy (DOE) to be in excess of 100 Billion kW annually costing over Ten Billion Dollars in wasted energy. Vampire Load producers includes cell phone chargers, lap top chargers, notebook chargers, calculator chargers, small appliances, and other battery powered consumer devices.

The U.S. Department of Energy said in 2008:

"Many appliances continue to draw a small amount of power when they are switched off. These "phantom" loads occur in most appliances that use electricity, such as VCRs, televisions, stereos, computers, and kitchen appliances. This can be avoided by unplugging the appliance or using a power strip and using the switch on the power strip to cut all power to the appliance."

According to the U.S. Department of Energy, the following types of devices consume standby power:
1. Transformers for voltage conversion. (Including cell phone, lap top and notepad, calculators and other battery powered devices that use wall chargers).
2. Wall wart power supplies powering devices which are switched off (Including cell phone, lap top and notepad, calculator, battery powered drills and tools, all of which have wall chargers and have either completely charged the batteries or are actually disconnected from the device).
3. Many devices with "instant-on" functions which respond immediately to user action without warm-up delay.
4. Electronic and electrical devices in standby mode which can be woken by a remote control, e.g. some air conditioners, audio-visual equipment such as a television receiver.
5. Electronic and electrical device which can carry out some functions even when switched off, e.g. with an electrically powered timer. Most modern computers consume standby power, allowing them to be woken remotely (by Wake on LAN, etc.) or at a specified time. These functions are always enabled even if not needed; power can be saved by disconnecting from mains (sometimes by a switch on the back), but only if functionality is not needed.
6. Uninterruptible power supplies (UPS)

All this means that even when a cell phone, lap top or like device is completely charged, current is still flowing, but not accomplishing anything and wasting electricity. Most recently manufactured devices and appliances continue to draw current all day, every day—and cost you money and add to the Energy Crisis Worldwide.

The National Institute of Standards and Technology (NIST) (a division of the U.S. Department of Commerce) through its Buildings Technology Research and Development Subcommittee in 2010 stated its goals for reducing "plug loads," stating:

"The impact of plug loads on overall consumption is quite significant. For commercial buildings, plug loads are estimated at 35% of total energy use, for residential 25%, and for schools 10%.

Opportunities for lowering plug loads include:
1) more efficient plugged devices and appliances,
2) automated switching devices that turn off unused appliances and reduce "vampire" loads from transformers and other small but always on appliances, or
3) modifying occupant behaviors."

One of the problems experienced by virtually all modern electronics is that power supplies, whether external or embedded "power modules" are not energy efficient. This is true for a number of several reasons, one of which dates back to 1831 when Michael Faraday invented the transformer. Transformers are inherently inefficient because, as an analog device, they can only produce on power output for each specific winding. So if two power outputs are necessary, two secondary windings are necessary. Moreover, there are often over 50 parts and pieces that are necessary to work with a transformer to create a common modern external power supply, the numbers only get somewhat lower with internal or embedded power modules. The number of parts in a power supply is inherently inefficient because current must travel in, around and through the various parts, each with different power dissipation factors; and even the circuit traces cause resistive losses creating energy waste.

Further, the way a transformer works is creating and collapsing a magnetic field. Since all of the electrons cannot be "recaptured" by the magnetic field creation/collapse, those that escape often do so as heat, which is why cell phone, lap top and tablet chargers feel warm or hot to the touch. It is also the primary reason why all consumer electronics create heat, which not only wastes energy/electricity, but causes eventual detrition through heating of other associated electronic parts.

Another inefficiency found in current electronics is the need for multiple internal power supplies to run the different parts. For instance, in the modern world power modules MOSFETS which have become more and more important part of the "real world" interfaces in circuitry.

MOSFETS enable switching, motor/solenoid driving, transformer interfacing, and a host of other functions. At the other end of the spectrum is the microprocessor. Microprocessors are characterized by steady reduced operating voltages and currents, which may be 5 volts, 3.3 volts, 2.7 volts or even 1.5 volts. In most systems the MOSFETS and microprocessors are used together or in combination to make the circuitry work. However, most often the microprocessor and the drivers for the MOSFETS operate at different voltages, causing the need for multiple power supplies within a circuit.

A standard MOSFET requires a driver that can deliver on the order of a 15 volt swing in order to successfully turn it on and off. In the case of turn on, there is actually a requirement for that the driver voltage exceed the rail power to be effective. Specialty drivers using charge pump technology have been devised for this purpose. The MOSFET drivers other main function is to have a reduced input drive requirement making it compatible with the output drive capability of modern CMOS processor.

This MOSFET/driver arrangement, common in most external power supplies, like chargers, actually requires three separate power supplies. The first power supply needed is the main power rail, which is normally composed of a voltage in the range of 100 VAC to 300 VAC supplied to the MOSFET. The second power supply needed is the 15 volts (or higher) required by the MOSFET drivers. Finally, the microprocessors require another isolated power supply for their many different and varying voltages.

A good example of the current inefficiencies and energy waste is found in a typical television, which requires as many as four to six different power supply modules, to run the screen, backlighting, main circuit board, and sound and auxiliary boards. This current system requires multiple transformers and dozens of parts for each power supply needed. The transformers and the parts (including MOSFETS) multiply heat through their duplicated inefficiencies, which is one reason the back of a television is always hot to the touch. In addition, the more transformers that are needed for various power outputs, the more parts are needed, and more causation for energy waste is created.

In addition to the heat problem, the multiple transformer based power supplies all need typically from forty to sixty parts to operate, requiring dozens of parts for a typical transformer based television power supply module which increases costs and total component size while decreasing reliability. With the multiplicity of parts comes increased system resistance which ends up in wasted energy as heat.

The present invention is aimed at one or more of the problems identified above to provide better efficiencies and create more control over electrical inrush currents from rail sources.

SUMMARY OF THE INVENTION

In one aspect of the present invention, an electrical circuit for providing electrical power for use in charging applications and/or powering a constant supply circuit for electronic devices is provided. The electrical circuit includes a power converter circuit that is electrically coupled to an electrical power source for receiving alternating current (AC) input power from the electrical source and delivering direct current (DC) output power to an electronic device. The power converter circuit includes a transformer and a switching device coupled to a primary side of the transformer for delivering power from the electrical power source to a primary side of the transformer. A voltage sensor is coupled to the primary side of the transformer for sensing a voltage level of power being generated by the transformer. A controller is coupled to the voltage sensor and the switching device for receiving the sensed voltage level from the voltage sensor and transmitting a control signal to the switching device to adjust the voltage level of power being delivered to the electronic device.

In another aspect of the present invention, an electrical circuit for providing electrical power for use in charging applications and/or powering a constant supply circuit for electronic devices is provided. The electrical circuit includes a power converter circuit electrically that is coupled to an electrical power source for receiving alternating current (AC) input power from the electrical source and delivering direct current (DC) output power to an electronic device. The power converter circuit includes a transformer and a switching device coupled to a primary side of the transformer for delivering power from the electrical power source to the transformer. A Hall Effect sensor is coupled to the transformer primary side for sensing a magnetic field being generated by the transformer. A controller is coupled to the Hall Effect sensor and the switching device and is configured to receive the sensed magnetic field from the Hall Effect sensor and transmit a control signal to the switching device to adjust the voltage level of power being delivered to the electronic device. The control signal is determined as a function of the sensed magnetic field.

In a further aspect of the present invention, an electrical circuit for providing electrical power for use in charging applications and/or powering a constant supply circuit for electronic devices is provided. The electrical circuit includes a rectifier circuit coupled to an electrical source for receiving the AC input power from the electrical source and converting the AC input power to DC input power. A quasi-resonant circuit is coupled to the rectifier circuit. The quasi-resonant circuit may include a first switching device, an inductor, and a capacitor. The first switching device may include a MOSFET. In one embodiment, the quasi-resonant circuit does not include an inductor and/or a diode. In another embodiment, the quasi-resonant circuit does not include the first switching device. A power converter circuit is coupled to the quasi-resonant circuit for receiving the DC input power signal from the quasi-resonant circuit and delivering a DC output power having a reduced voltage level. The power converter circuit includes a transformer and a second switching device coupled to a primary side of the transformer for delivering power from quasi-resonant circuit to the transformer. A synchronous rectifier circuit is coupled to the transformer and includes a synchronous switching device coupled to a secondary side of the transformer and a synchronous rectifier controller coupled to the synchronous switching device for transmitting a switch control signal to the synchronous switching device to modify the output power being delivered to the electronic device. The electrical circuit may also include the synchronous rectifier circuit coupled to the primary side of the transformer in place of the bridge rectifier. A voltage sensor is coupled to the primary side of the transformer for sensing a voltage level of power being generated by the transformer. A controller is coupled to the voltage sensor and is configured to receive the sensed voltage level from the voltage sensor and transmit control signals to the first and the second switching devices to adjust the voltage level of power being delivered to the electronic device. In one embodiment, the features of the controller may be in firmware on a chip as in digital components like in a state machine which uses typical analog to digital communication conversions. One or more of the MOSFETs and corresponding drivers may be formed on a single chip.

The electrical circuit also includes a vampire load system that is configured to determine when a consumer device has finished charging and/or is disconnected from the power circuit, and operates the power circuit to disconnect the supply of power to the power circuit and/or the electronic device.

In another aspect of the invention, the power circuit is formed on a semiconductor chip that includes analog and digital components on the same chip. A process like a 311V SoI BCD could be used for the semiconductor, which would permit the integration on one die of the microcontroller, timer/quartz, PID controller and PWM controllers, MOS-FETs, and corresponding drivers.

BRIEF DESCRIPTION OF THE DRAWINGS

Other advantages of the present invention will be readily appreciated as the same becomes better understood by reference to the following detailed description when considered in connection with the accompanying drawings wherein.

Corresponding reference characters indicate corresponding parts throughout the drawings.

DETAILED DESCRIPTION OF INVENTION

With reference to the drawings and in operation, the present invention overcomes at least some of the disadvantages of known power delivery systems by providing a power circuit that provides DC voltage output power to consumer electronic devices from an AC mains supply (typically 120 VAC (US) to 264 VAC[EU/Asia]). The power circuit is configured to provide electrical power to charge electronic storage devices and/or power consumer electronic products. The power circuit includes a power converter circuit that includes a switching device connected to the primary side of a transformer and a controller that is coupled to the switching device to adjust the duty cycle of the switching device to adjust a voltage level of the output power to within a desired power specification. In addition, the controller may adjust the frequency of the switching device to adjust a voltage level of the output power. By providing a switching device such as, for example a MOS-FET, connected to the primary side of the transformer, the size of a filter capacitor may be reduced over known electrical circuits, or removed.

The power circuit may also include a quasi-resonant front end, and synchronous rectification of the transformer secondary to facilitate reducing switching and transformer losses and increase the efficiency of power transfer when charging and/or powering electronic devices. In addition, the power circuit includes a vampire load system that is configured to determine when a consumer device has finished charging and/or is disconnected from the power circuit, and operates the power circuit to disconnect the supply of power to the power circuit and/or the electronic device. By providing a power circuit that includes a greater level of efficiency over known power circuits and that reduces the occurrence of vampire loads, wall wort power, and/or standby power being drawn by the electronic device this electricity waste, the amount of electricity used to charge and/or operate consumer electronic devices is significantly reduced, thus reducing a cost of operating consumer electronic products.

A selected embodiment of the present invention will now be explained with reference to the drawings. It will be apparent to those skilled in the art from this disclosure that the following description of the embodiment of the present invention is provided for illustration only and not for the purpose of limiting the invention as defined by the appended claims and their equivalents.

Figure 1:
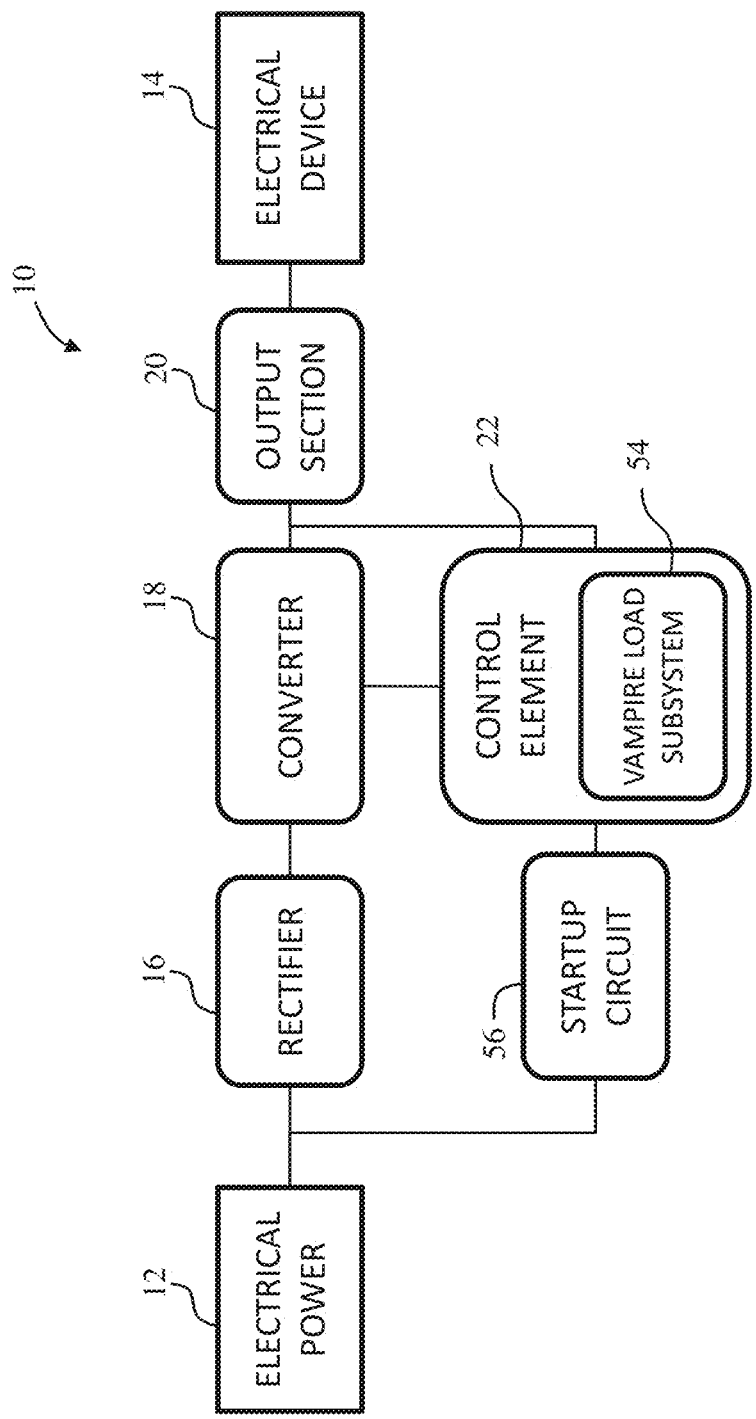
FIG. 1 is a block diagram of a power circuit for use in providing electrical power to consumer electronic devices.
Figure 2:
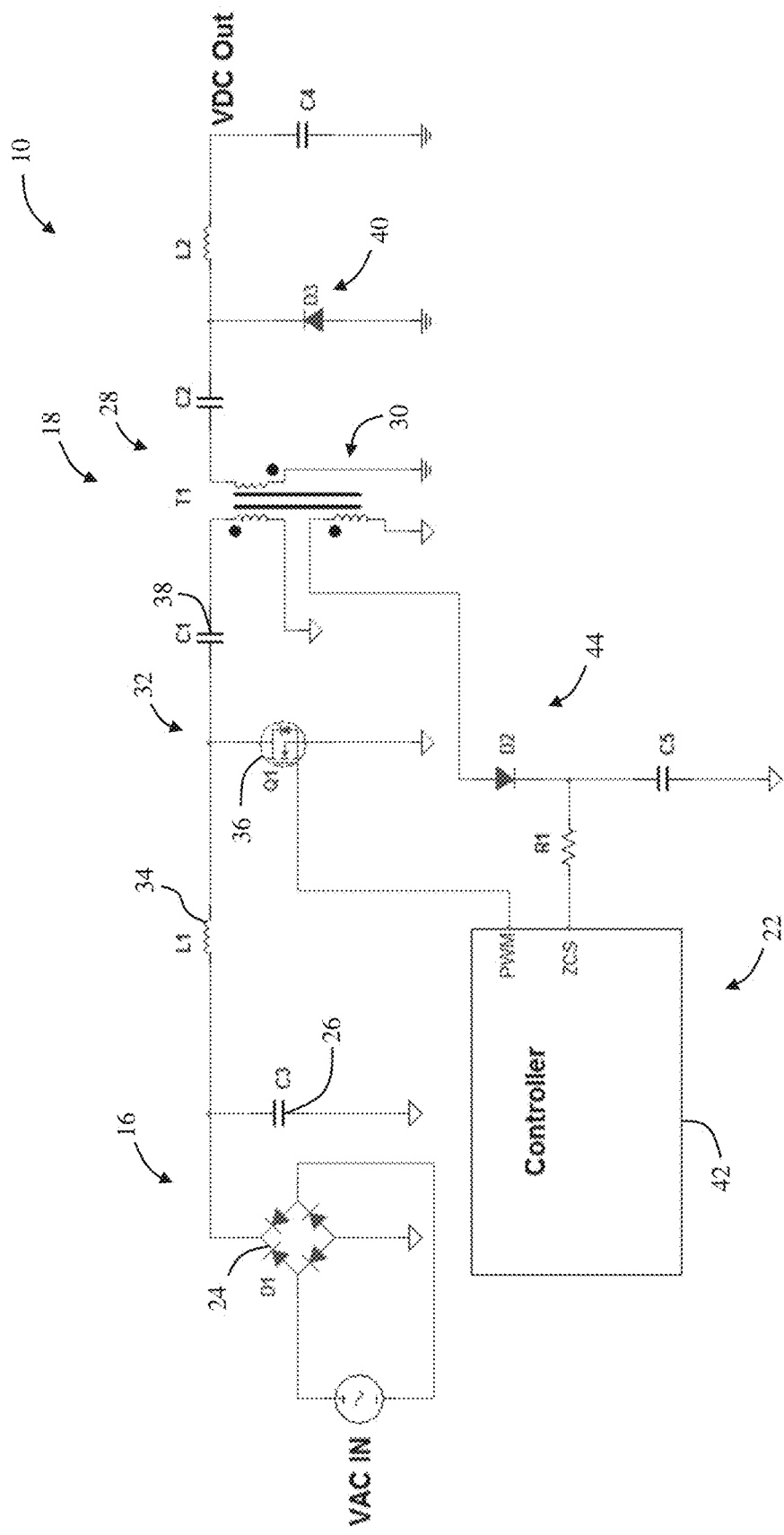
FIG. 2-4 are schematic diagrams of the power circuit shown in FIG. 1, according to embodiments of the present invention.
Figure 3:
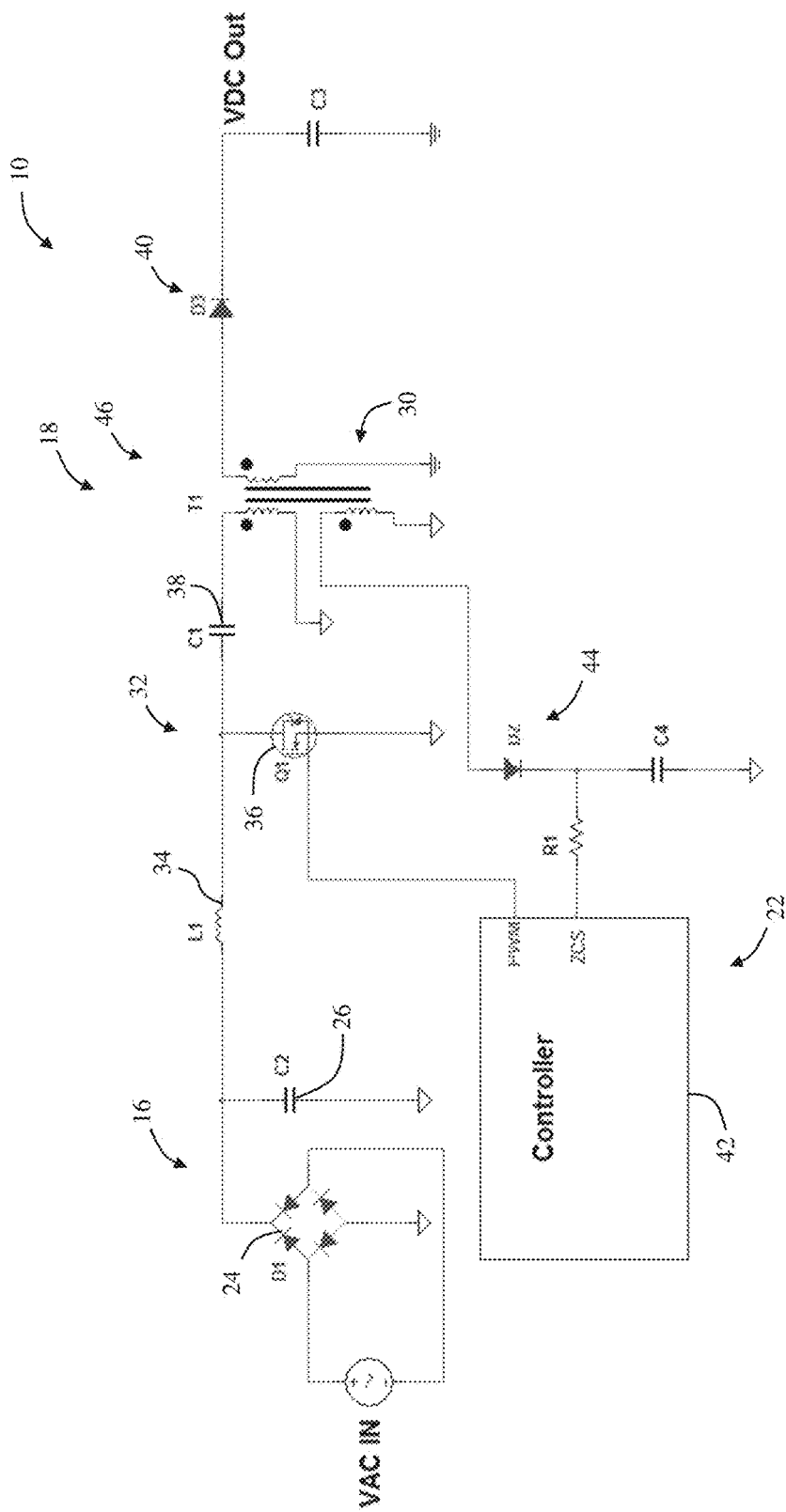
Figure 4:
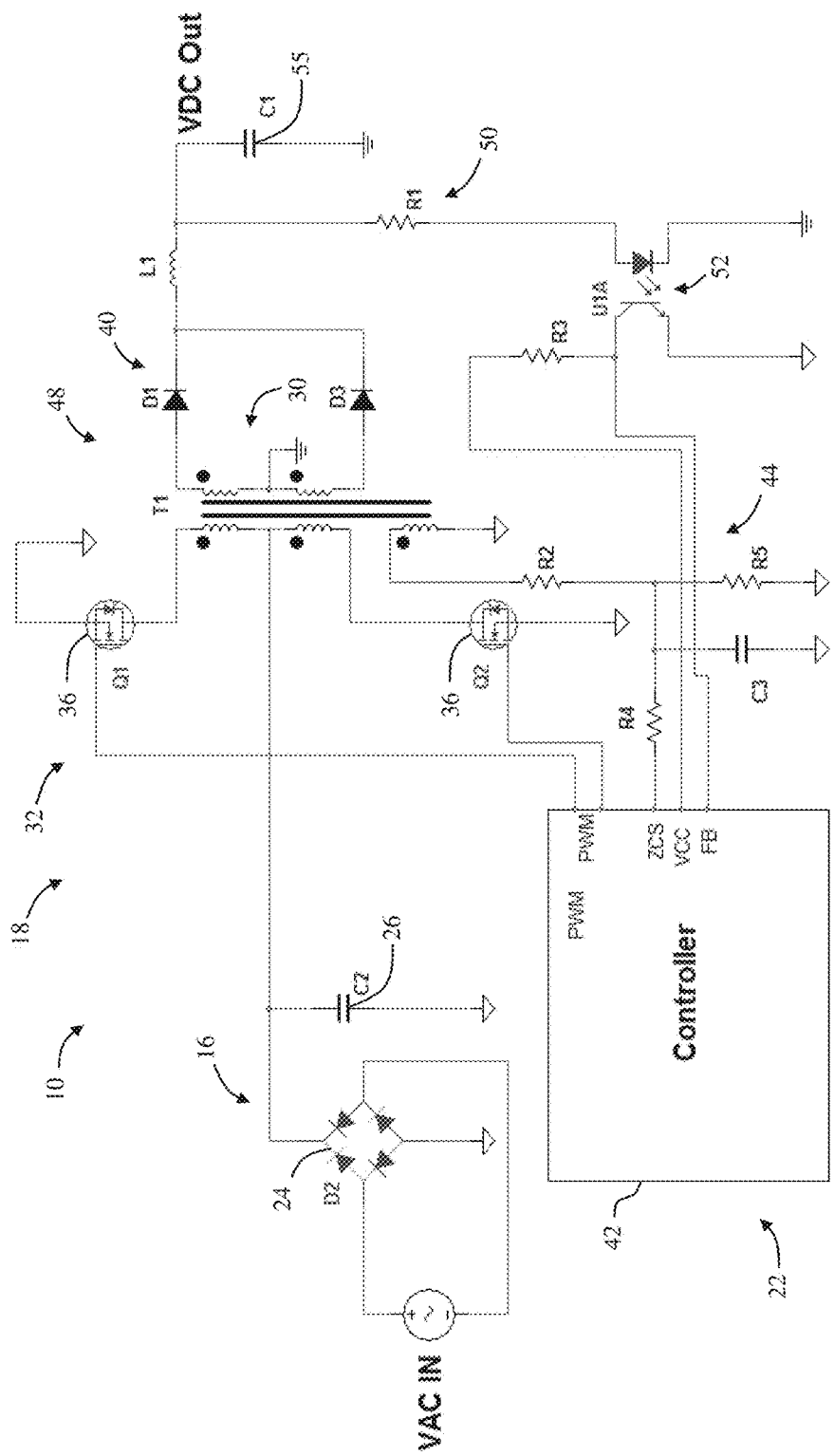

FIG. 1 is a block diagram of a power circuit 10 for use in providing electrical power to consumer electronic devices. FIG. 2-4 are schematic diagrams of the power circuit 10. In the illustrated embodiment, the power circuit 10 is configured to receive power from an electrical power source 12 and deliver power to an electronic device 14 such as, for example, portable consumer electronic devices including, but not limited to, a cell phone, a smartphone, a tablet computer, a laptop, and/or any suitable electronic device. In addition, the power circuit 10 may deliver power for use in charging electronic storage devices such as, for example, mobile phone/laptop/tablet power storage batteries. In one embodiment, the power circuit 10 may include AC to DC supplies that are designed to provide low voltage DC output (typically 5 VDC) from an AC mains supply (typically 120 VAC (US) to 264 VAC[EU/Asia]). These systems as described below consist of main subsystems, including:

[1.] Preprocessing, usually using a Full Wave diode bridge and a filter capacitor to convert the AC input voltage into a DC voltage.

[2.] Conversion/Switching, using one of various schemes to convert the high input voltage to a much lower output voltage. Often this takes the voltage from DC to AC.

[3.] Rectification, re-converting the AC to DC.

[4.] Post processing/Output, modifying the output of the conversion process. This output is usually an AC voltage which must be changed into a DC output voltage.

The power circuit 10 may also include unique combinations of these subsystems to produce superior power supplies designed for low voltage battery charging and other power supply services from conventional AC mains sources available throughout the world.

The conversion process is the central subsystem about which the pre and post processing subsystems are wrapped. These subsystems may consist of one of the following topologies:

[1.] Push-Pull
[2.] Ç UK (named after its originator, Slobodan Ç uk)
[3.] SEPIC (Single-ended primary-inductor converter)
[4.] Buck
[5] Flyback These subsystems will be described below along with the various pre and post processing methods utilized to deliver fully functioning power supply.

In the illustrated embodiment, the power circuit 10 is configured to receive input power of a first type from the electrical power source 12 and deliver output power of a more desirable type to the electronic device 14. In one embodiment, the electrical power source 12 may include alternating current (AC) input power received from a power grid. For example, the electrical power source 12 may include AC input power being delivered at a given voltage, e.g., 120 volts and at a frequency of 60 Hertz (the North American Standard) or 220-240 volts at a frequency of 50 Hz (the European Standard). In addition, the power circuit 10 may be configured to receive input power having an input voltage within a range between about 85 volts to 300 volts at either 50 or 60 Hertz so as to accept a world-wide range of mains power. In the illustrated embodiment, the power circuit 10 is configured to convert the AC input power to a more desirable direct current (DC) output power. For example, in one embodiment, the power circuit 10 is configured to delver DC output power at the desired voltage, such as 5 volts direct current (VDC). In the illustrated embodiment, the power circuit 10 is configure to receive input power from the electrical power source having an AC power signal at a first voltage level and delivering an output power signal having a DC power signal at a second voltage level that is less than the first voltage level. For example, in one embodiment, the power circuit 10 is configured to receive input power at 120 volts AC at a frequency of 60 Hertz and deliver output power at 5 volts DC.

In the illustrated embodiment, the power circuit 10 includes a rectifier circuit 16 that is coupled to the electrical power source 12, a power converter circuit 18 that is electrically coupled to rectifier circuit 16, an output section 20 that is coupled to the power converter circuit 18 for delivering power from the power converter circuit 18 to the electronic device 14, and a control element 22 for operating the power converter circuit 18 to deliver power to the output section 20 at a desired power signal.

In one embodiment, the rectifier circuit 16 is configured to generate a modified AC power signal from the AC input power received from the electrical power source 12. The power converter circuit 18 is configured to receive the modified AC power signal at an input voltage level from the rectifier circuit 16 and generate a DC output power signal at an output voltage level that is less than the input voltage level. More specifically, the rectifier circuit 16 receives the AC input power signal at the input voltage level from the power source 12 and generates the modified AC power signal. The control element 22 operates the power converter circuit 18 to reduce the input voltage level and generate the DC output power signal at the desired output voltage level from the received modified AC power signal.

The output section 20 includes an appropriate power connector or port, such as a universal serial bus (USB) port, that is configured to electrically couple the electronic device 14 to the power circuit 10 to facilitate delivering power from the power circuit 10 to the electronic device 14.

The rectifier circuit 16 is configured to receive an AC input power from the electrical power source 12 and deliver DC input power to the power converter circuit 18. In the illustrated embodiment, the rectifier circuit 16 includes a plurality of diodes that are arranged in a full-wave bridge rectifier 24 having first and second input terminals coupled to the high and low sides of the electrical power source 12 for producing a DC power signal from an AC input power signal. In one embodiment, the rectifier circuit 16 may also include a filter capacitor 26 that is coupled to the full-wave bridge rectifier 24. In another embodiment, the rectifier circuit 16 may include a half-bridge rectifier (not shown). In yet another embodiment, the rectifier circuit 16 does not include the filter capacitor 26.

In the illustrated embodiment, the power converter circuit 18 receives the DC input power from the rectifier circuit 16 and delivers a DC output power to electronic device 14 via the output section 20. In one embodiment, the power circuit 10 does not include the rectifier circuit 16 and the power converter circuit 18 is coupled to the electrical power source 12 for receiving AC input power from the electrical power source 12 and delivering DC output power to the electronic device 14.

Referring to FIG. 2, in one embodiment, the power converter circuit 18 includes a modified Ç uk converter 28. In contrast to known non-isolated and isolated Ç uk converters that are used for DC-DC conversions, the modified Ç uk converter 28 is configured for AC-DC conversions using rail voltage which is reduced down to, for instance, 5V at the desired current. The modified Ç uk converter 28 includes a high frequency transformer 30, and a switching device 32 coupled to a primary side of the transformer 30. In the illustrated embodiment, the switching device 32 includes an inductor 34, a main field-effect transistor (FET) 36 on the top side of the transformer 30, and a capacitor 38 as the main energy-storage component. In one embodiment, the FET 36 may be a metal-oxide-semiconductor field-effect transistor (MOSFET). In addition, the FET 36 may include an N-channel MOSFET and/or a P-channel MOSFET. The modified Ç uk converter 28 also includes an asynchronous rectification circuit 40 connected to the secondary side of the transformer 30. The asynchronous rectification circuit 40 may include a capacitor, a diode, and an inductor.

In the illustrated embodiment, the control element 22 includes a controller 42 that is coupled to the main FET 36 and a sensing circuit 44 that is coupled to the transformer 30 for sensing an output voltage level of power being generated by the transformer 30. In one embodiment, the sensing circuit 44 includes a diode, a capacitor, and a resistor. The controller 42 is configured to receive the sensed voltage from the sensing circuit 44 and transmit a control signal to the switching device 32 to operate the switching device 32 to adjust a voltage level of output power being delivered from the power converter circuit 18 to the electronic device 14. In one embodiment, the controller 42 includes a microprocessor that is programmed to receive the sensed voltage level from the voltage sensor and transmit a control signal to the switching device 32 to adjust the voltage level of power being delivered to the electronic device 14. The controller 42 may also implement a pulse-width modulation (PWM) process to operate the switching device 32 to adjust the voltage level of the output power signal.

In the illustrated embodiment, the modified Çuk converter 28 control is identified as $V_{out}/V_{in}$=duty cycle/(period−duty cycle), which is used by the controller 42 to drive the main FET included in the switching device 32. Moreover, the controller 42 is configured to adjust a duty cycle of the control signal to adjust a voltage level of the output power. The sensing circuit 44 provides feedback to the controller 42 so that if the output voltage is too low, the controller 42 increases the duty cycle of the control signal and the FET 36. Conversely, if the voltage is too high the duty cycle is decreased. Another advantage of the modified Çuk converter 28 is that the relation between the output and input voltage is D/(1-D), where D is the duty cycle. For a given transformer 30, the output voltage may be increased or decreased as required so that Dial-A-Voltage features may apply. Also, because of the relationship of the input to output voltage with respect to the duty cycle, the output voltage can be adjustable.

Referring to FIG. 3, in one embodiment, the power converter circuit 18 includes a modified SEPIC converter 46. Known SEPIC converters are known to be used for DC-DC rectification. In contrast to known SEPIC converters, the modified SEPIC converter 46 is configured for AD-DC conversions. The modified SEPIC converter 46 is configured to enable a method of operation that provides that the electrical potential (voltage) at its output to be greater than, less than, or equal to that at its input.

In the illustrated embodiment, the modified SEPIC converter 46 includes a high frequency transformer 30 and a switching device 32 that is coupled to a primary side of the transformer 30. The switching device 32 includes an inductor 34, a main FET 36 on the top side of the transformer 30, and a capacitor 38. The modified SEPIC converter 46 also includes an asynchronous rectification circuit 40 that includes a diode connected to the secondary side of the transformer 30. The modified SEPIC converter 46 is operated to convert AC to DC using rail (mains) power and convert it down to a desired voltage, such as 5V at a desired current, such as 10 to 12 A.

The control element 22 includes the controller 42 that is coupled to the switching device 32 and the sensing circuit 44 for sensing an output voltage level of power being generated by the transformer 30. The output of the modified SEPIC converter 46 is controlled by the duty cycle of the control transistor. The control is accomplished by $V_{out}/V_{in}$=duty cycle/(period−duty cycle). The main FET 36 is driven by the controller 42 in the modified SEPIC converter 46 to adjust a voltage level of the output power being delivered to the electronic device 14. In addition, the sensing circuit 44 provides feedback to the controller 42 to enable the controller 42 to adjust a duty cycle of the control signal being transmitted to the main FET 36 to adjust an output voltage of the transformer 30. For example, if the sensed output voltage is too low, the controller 42 increases the duty cycle of the control signal to increase the output voltage level. Conversely, if the voltage is too high the duty cycle is decreased.

For the modified SEPIC converter 46, the current through the main FET Q1 in the modified SEPIC converter 46 is approximately equal to the sum of the input current as well as the output current. The modified SEPIC converter 46 includes minimal switches similar to the modified Çuk converter 28, but the current through the MOSFET Q1 is reduced. This is because the secondary load current is prevented from flowing through Q1 by the way diode D3 is positioned. This reduces the $I^2R$ heating loss in MOSFET Q1.

Figure 14:
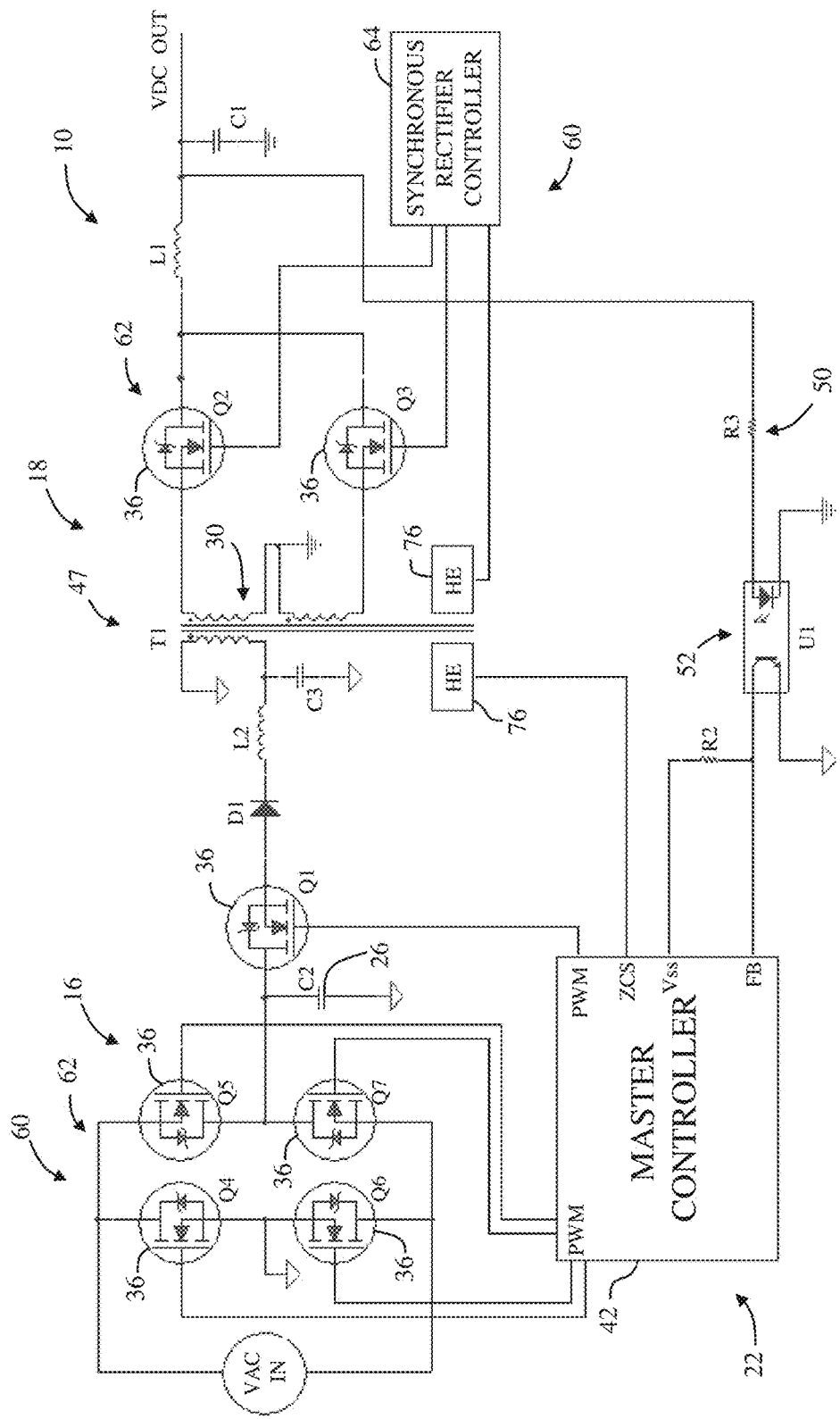

In one embodiment, as shown in FIG. 14, the power converter circuit 18 may include a modified Buck converter 47.

Referring to FIG. 4, in one embodiment, the power converter circuit 18 may include a modified Push-Pull converter 48. Known Push-Pull conversion topology has been known in the industry and is exclusively used for DC-DC conversions. In contrast to known Push-Pull topologies, the modified Push-Pull converter 48 is configured for AC-DC conversion from rail voltages down to 5V capable of producing 10 to 12 Watts. In one embodiment, the modified Push-Pull converter 48 includes a high frequency transformer 30. In addition, the primary side of the transformer 30 is center tapped with the rectified high voltage attached to the center tap. In addition, the modified Push-Pull converter 48 includes a switching device 32 that includes a pair of FETs 36 arranged 180 degrees out of phase with respect to each other, and that alternate pulling the current through the each side of the primary winding (hence the name push-pull) of the transformer 30. Since the magnetic flux switches direction with the push pull, the voltage on the secondary will also switch direction. Therefore, a center tapped secondary is used because when the flux is flowing in one direction the top half of the secondary will be positive. Likewise, when the flux reverses, the lower side will produce a positive voltage. The modified Push-Pull converter 48 may also include an asynchronous rectification circuit 40 that includes a pair of diodes, D1, D3, connected to the secondary side of the transformer 30. The diodes are configured as a clamping mechanism to prevent the backflow of electricity from the transformer, and may include a super barrier diode, due to its high blocking abilities, with low energy losses.

The modified Push-Pull converter 48 includes FETs 36 on either side of the transformer primary that are configured to be pulled low by the PWM process at opposite times. The controller 42 transmits control signals to each of the FETs 36 to operate the modified Push-Pull converter 48 to control the power circuit 10 as follows: the FETs 36 on either side of the transformer primary will be pulled low by the PWM process at opposite times. When the output voltage falls below a certain threshold the first FET Q1 will turn on for a fixed time and then turn off. Next, after a predetermined dead time, the second FET Q2 will turn on for a fixed time and then turn off. After the second FET Q2 turns off, the system enters a rest time relative to the output current desired or the time needed to transfer enough energy to the load to cause the output voltage to drop below a certain threshold (the higher the current, the rest time reduces, and the lower the output current, the greater the rest time). The process would repeat when the secondary side voltage decreased below the threshold. In addition, the controller 42 receives the sensed voltage from the sensing circuit 44 and transmits a control signal to each of the FETs 36 to adjust a voltage level of output power being delivered from the power converter circuit 18 to the electronic device 14.

In one embodiment, as shown in FIG. 4, the sensing circuit 44 may include a sensor 50 connected to the asynchronous rectification circuit 40 and/or the transformer secondary for sensing a voltage level and/or a current level of the output power signal being delivered to the electronic device 14 from the power converter circuit 18. In one embodiment, the sensor 50 includes a resistor that is coupled to the controller 42 for transmitting a signal indicative of power characteristics associated with the output power. The controller 42 may be configured to determine a voltage level of the output power as a function of the received signal. In another embodiment, the controller 42 may determine a current draw of the electronic device 14 as a function of the sensed signal. Moreover, the controller 42 may be configured to adjust a duty cycle of the control signals being transmitted to the power converter circuit 18 as a function of the sensed power characteristic.

In one embodiment, the controller 42 may be configured to detect an initial current draw from the electronic device 14 as a function of the signal being received from the sensing circuit 44 and responsively initiate a charging cycle including operating the power circuit 10 to deliver output power to the electronic device 14. In addition, the controller 42 may monitor a level of current being drawn by the electronic device 14 during the charging cycle and detect if the monitored level of current being drawn by the electrical device is different than a threshold level of current. The controller 42 may also determine a voltage level of power being delivered to the electronic device 14 as a function of the signals being received from the sensing circuit 44 and transmit a control signal to the power circuit 10 to adjust the voltage level of power being delivered to the electrical device. In one embodiment, the controller 42 may adjust a duty cycle of the control signal being transmitted to the power circuit 10 to adjust the voltage level of power being delivered to the electrical device. Moreover, the controller 42 may adjust the duty cycle of the control signal to maintain the monitored voltage level within a predefined voltage range.

In one embodiment, the controller 42 generates a control signal that is a variable frequency. The frequency of the control signal is modified to deliver the desired output power. The switching device 32 receives a control signal from the control element 22 and converts the DC voltage output of the rectifier circuit 16 into an alternating current power signal. The frequency of the alternating current power signal is responsive to the control signal. Moreover, the frequency of the control signal from the control element 22 controls the frequency of the alternating current power signal. Based on the sensed voltage and current delivered, the control element 22 may modify the frequency of the control signal to fine tune and more accurately control the output of the power circuit 10. For example, in one embodiment, the controller 42 monitors the output power signal and adjusts the control signals to the switching device 32 to keep the power output within specification. The controller 42 may also include an associated control program that may compensate for different output load conditions, component tolerances, component parameter variations at different operating points, and component changes due to temperature. The control program also monitors several operating parameters to turn the switching device off, which removes power from the output, if a condition that is unsafe or out of the operating range is detected.

In one embodiment, the controller 42 includes software to enable the controller 42 to recognizes through its logic in the microprocessor the draw from the battery as connected and analyzes the ramp up draw from that battery and then either sends 1 A (for charging a cell phone) or up to 2.4 A for devices like a tablet; or up to 9.2 A for charging a notebook or laptop, which the current invention can either do alternatively or at the same time. In one embodiment, the acceptable input voltage can range from a low of 85V—a high of 300V worldwide. Output voltage is device dependent but 5V to 19V are possible.

In the illustrated embodiment, the sensing circuit 44 includes an electrical isolation device 52 connected between the controller 42 and the sensor 50. The electrical isolation device 52 may include, but is not limited to, a transistor, an opto transistor, an opto triac, and/or any suitable electrical isolation device.

In one embodiment, the control element 22 may include a vampire load subsystem 54 that is configured to monitor the output power being delivered to the electronic device 14 and/or to monitor a current draw of the electronic device 14 to determine if the electronic device is powered by, being charged and/or is attached to the power circuit 10. The vampire load subsystem 54 may include synchronous switching at high voltage subsystem that includes a synchronous switch matrix that may increase efficiency during high current operation and provides the opportunity for significantly reduced idling power as well. During operation, the controller 42 may monitor the output power to determine if a device was being charged or is attached to the power circuit 10, and disconnect the power circuit 10 from the electrical power source 12 upon determining that the electronic device 14 is no longer being charged.

For example, in one embodiment, the controller 42 is configured to receive a signal from the sensing circuit 44 that is indicative of current being drawn by the electronic device 14, detect an initial current draw from the electrical device as a function of the received signal, and responsively initiate a charging cycle and responsively deliver output power to the electronic device 14 via the power circuit 10. The controller 42 may also monitors a level of current being drawn by the electronic device 14 during the charging cycle, detects if the monitored level of current being drawn by the electrical device is less than a threshold level of current, and responsively operates the power circuit 10 to disconnect power to the electronic device 14. The controller 42 may also determine that the electronic device 14 is disconnected from the power circuit if the monitored level of current is less than the threshold level of current. In one embodiment, power for the control and monitor would be stored in an on-board capacitor and a timer that would allow the circuit to periodically wake up, power up the system, and determine whether to keep it powered up. This duty cycle would result in a significant reduction in average quiescent power (the power wasted when no device is being charged).

In one embodiment, the vampire load subsystem 54 may determine a level of charge being held in a output supply capacitor 55 and determine whether the electronic device 14 is connected to the power circuit, being charged by the power circuit 10, and/or being powered by the power circuit 10 as a function of level of charge being held in the output supply capacitor 55. For example, in one embodiment, the sensing circuit 44 may sense a voltage across the output supply capacitor 55 and disconnect the power being supplied to the electronic device 14 if the sensed voltage is different than a threshold voltage. The vampire load subsystem 54 is configured to determine if the sensed voltage is different than a threshold voltage level and operate the power converter circuit to disconnect power to the electronic device. For example, in one embodiment, the vampire load subsystem 54 determines if the sensed voltage is less than a threshold voltage, e.g. 5 volts, and responsively determine that the electronic device 14 is being charged by the power circuit 10, and/or being powered by the power circuit 10. In addition, if the sensed load is greater than, or equal to, the threshold voltage level, the vampire load subsystem 54 may responsively determine that the electronic device 14 is not drawing power from the power circuit and responsively operate the power circuit 10 to disconnect the delivery of power to the electronic device 14.

The controller 42 and sensing circuit 44 continually monitor the draw of current from the charging device. From the initiation of the charging cycle, a table is formed in the controller 42 for use in analyzing the current draw. During the charging cycle the controller 42 continues to monitor the current draw that is being consumed by the electronic device 14 via the sensing circuit 44 and analyzes that draw and reports when the draw begins to wane due to a fully charged device. The controller 42 may also sense when the current diminishes as the charging device approaches a full charge. From the initial outrush of current to the charging device through the entire charging cycle, the controller 42 determines when a charging device is fully or nearly fully charged (and when the current draw approaches zero), and shuts off power from its inrush supply and shuts down the charging and power draw from the inrush source. The controller 42 may also detect when a device is connected to the power circuit 10 by sensing the current draw. At any time when there is no current draw, the controller 42 operates power circuit 10 to shut off, avoiding the ongoing electrical waste that normally exist when a charging device is still plugged into a wall outlet, but no phone is attached.

In the illustrated embodiment, the power circuit 10 includes a startup circuit 56 that is connected to the control element 22 for providing start-up power to the controller 42. The high voltage diode bridge is a potentially significant opportunity to place the vampire load subsystem 54, since a diode bridge is passive. When power is off and then is turned on (when the power supply is plugged into the socket), the bridge begins conducting power into the system automatically. The main issue with having a synchronous switch configuration at the line interface is the chicken-egg problem. Switches must be actively controlled. Active control requires power, but power may not be available until the switches are actively turned on. The startup circuit 56 may facilitate the start-up issue and may include a separate, extremely simple, low power regulator circuit that is configured to provide just enough power to the controller 42 for the monitor and switch matrix controller to function. Being simple, this regulator would not be very efficient. However, it would be sized for very low power and therefore any inefficiency would be relatively unimportant, and it would be disconnected (turned off) once the main power supply chain and microprocessor is on-line, further reducing energy loss.

The control element 22 may also include separate primary and secondary monitor and switch controller sections of circuitry. The secondary would be the one powered continuously whenever the power supply was plugged in. The primary would maximize the efficiency of the system during charging. Its performance might need to be superior to that of the secondary, whose purpose is only to operate when the unit is first plugged in.

Figure 5:
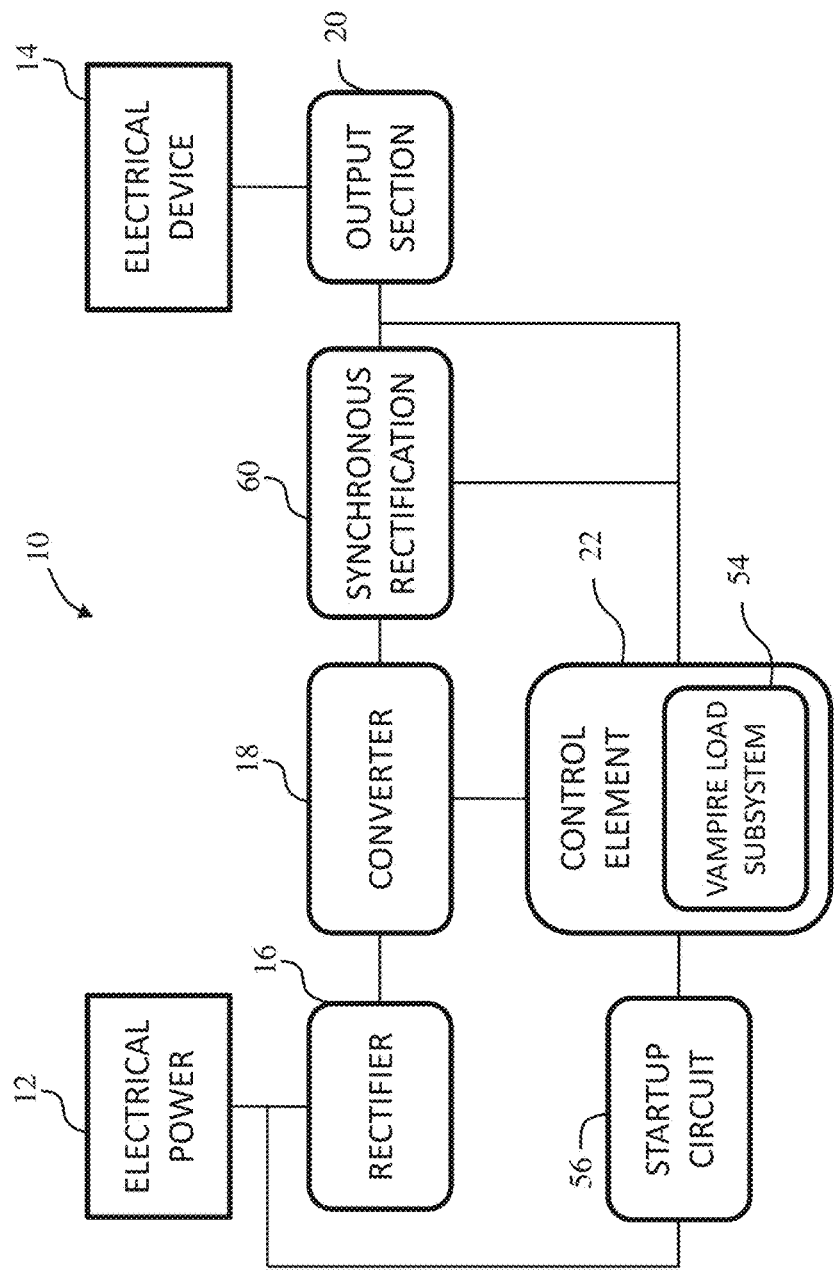
FIG. 5 is another block diagram of the power circuit shown in FIG. 1, according to an embodiment of the present invention.
Figure 6:
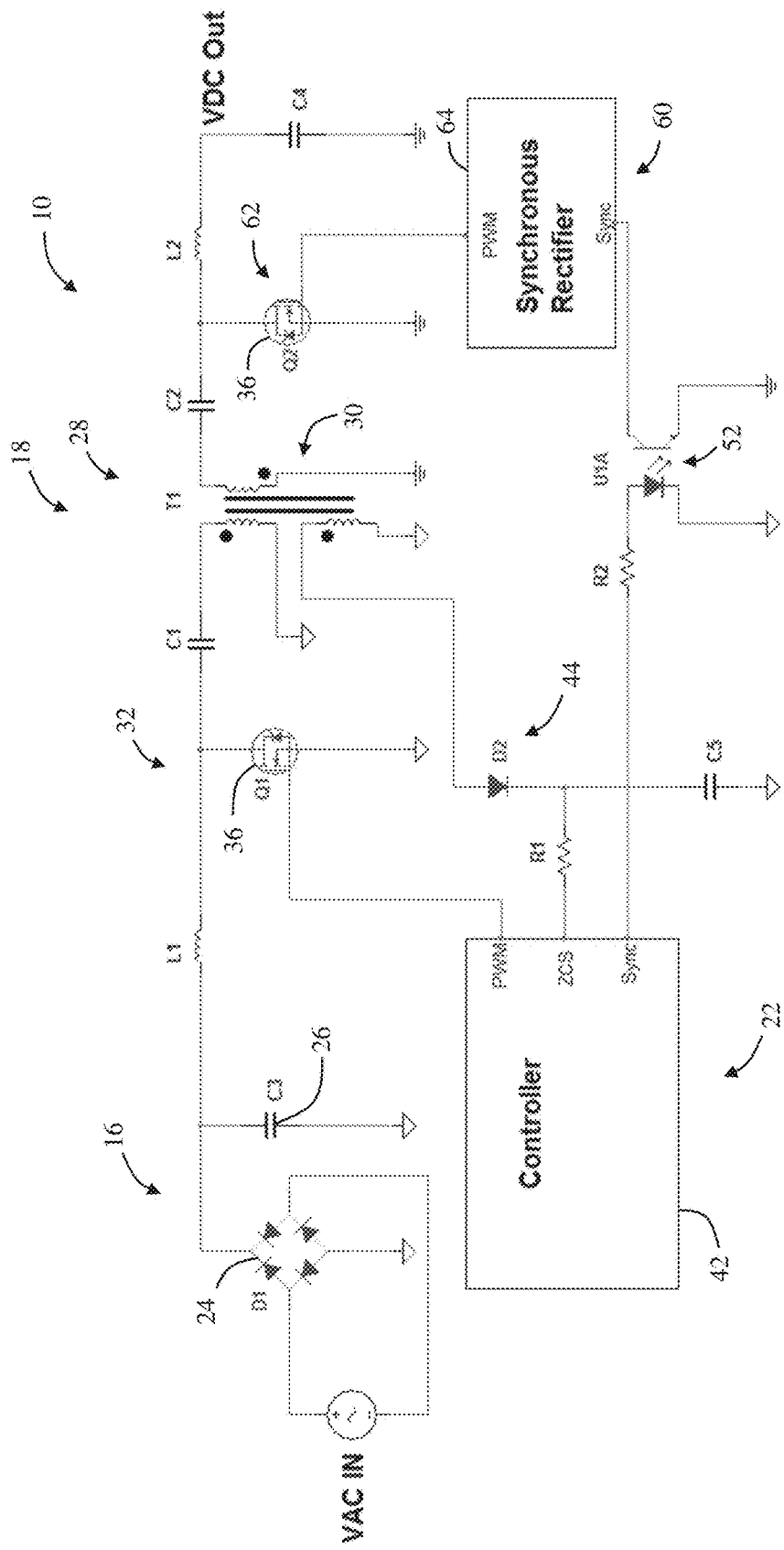
FIGS. 6-8 are schematic diagrams of the power circuit shown in FIG. 5, according to embodiments of the present invention.
Figure 7:
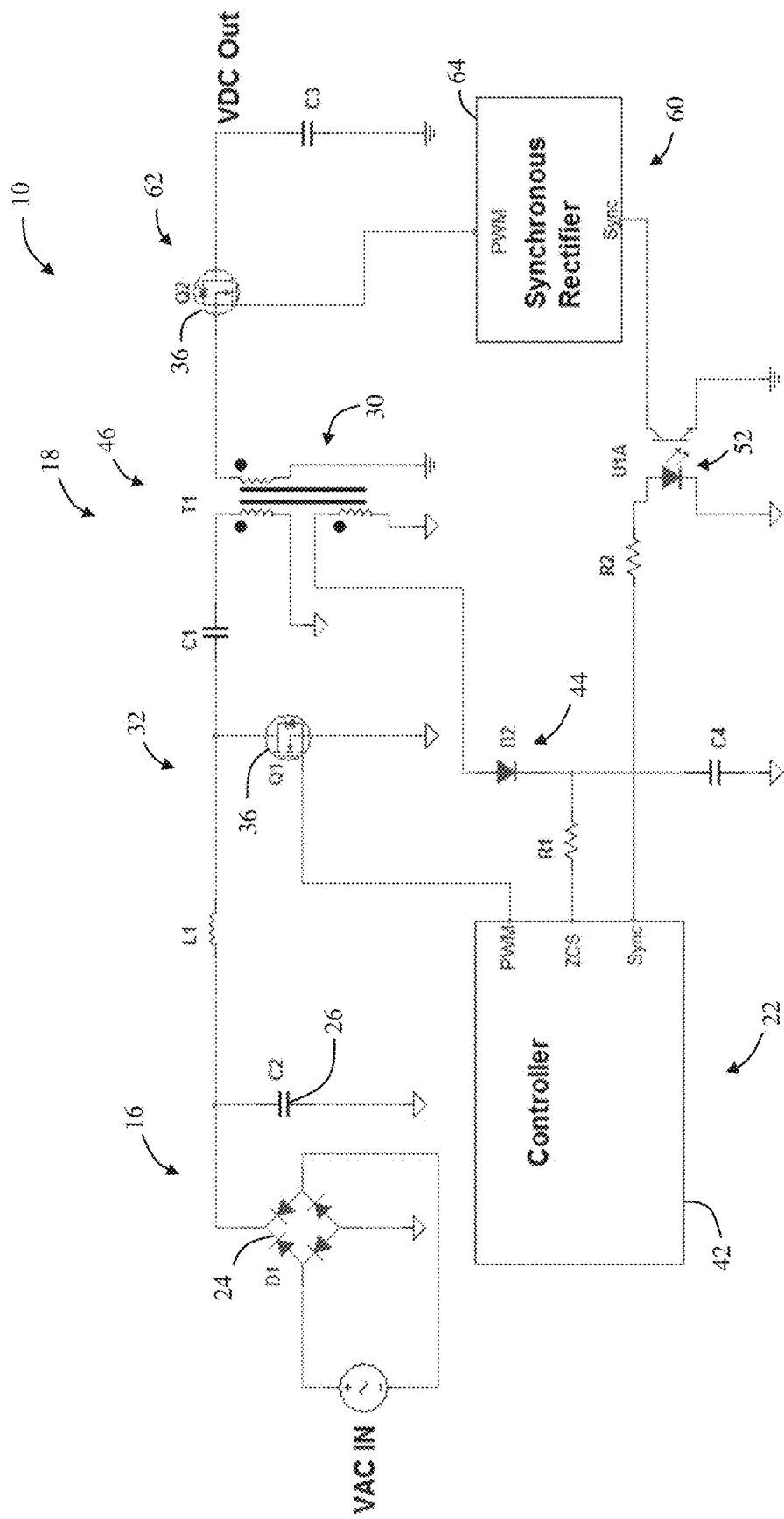
Figure 8:
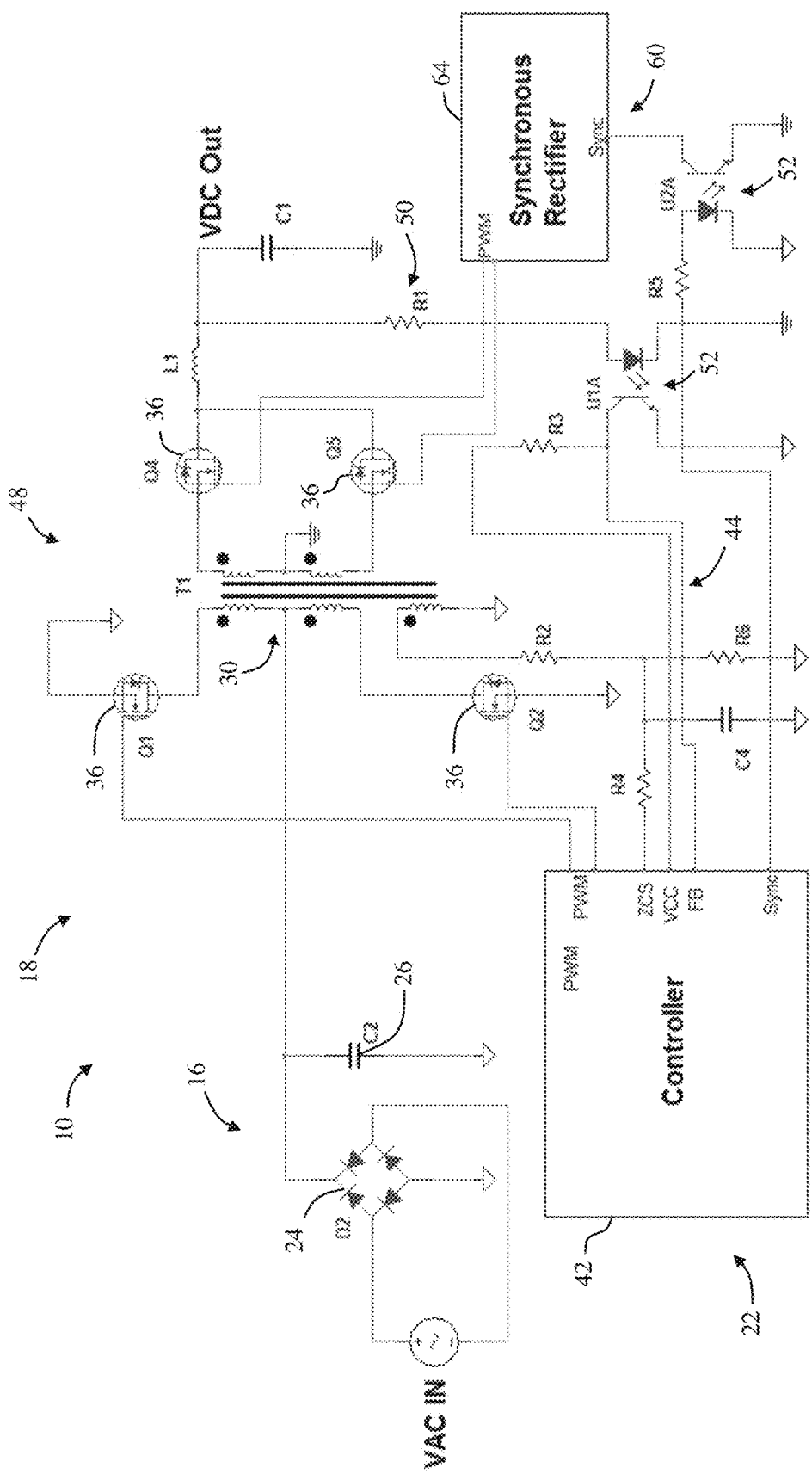

FIG. 5 is another block diagram of the power circuit 10, according to an embodiment of the present invention. FIG. 6-8 are schematic diagrams of the power circuit 10. In the illustrated embodiment, the power circuit 10 includes a synchronous rectification circuit 60 that is connected to the power converter circuit 18 for use in rectifying the output power signal being delivered to the electronic device 14. The synchronous rectification circuit 60 includes a synchronous switching device 62 that is coupled to the transformer secondary and a synchronous control device 64 that is coupled to the synchronous switching device 62. The synchronous control device 64 is connected to the controller 42 and is configured to receive a synchronization control signal from the controller 42 and generate a switch control signal as a function of the received synchronization control signal to operate the synchronous control device 64 to rectify the output signal received from the transformer 30. In one embodiment, the controller 42 is configured to adjust a duty cycle of transistor control signal as a function of the sensed transformer voltage level and/or the voltage level of the output power delivered to the electronic device 14. In the illustrated embodiment, the synchronous rectification circuit 60 includes an electrical isolation device 52 connected between the synchronous control device 64 and the controller 42.

In one embodiment, the synchronous switching device 62 may include a FET 36 that is connected to the secondary side of the transformer 30. The synchronous control device 64 is coupled to the FET 36 to rectify the power output signal being delivered to the electronic device 14 from the transformer 30. For example, as shown in FIG. 6, the power circuit 10 may include the modified Ç uk converter 28 with the synchronous rectification circuit 60 including a synchronous FET 36 connected to the transformer secondary. In addition, as shown in FIG. 7, the power circuit 10 may include the modified SEPIC converter 46 with the synchronous rectification circuit 60 including a synchronous FET 36 connected to the transformer secondary.

In another embodiment, as shown in FIG. 8, the synchronous switching device 62 may include a pair of synchronous FETs 36 that are connected to the secondary side of the transformer 30. For example, the power circuit 10 may include the modified Push-Pull converter 48 with the synchronous rectification circuit 60 including a pair of synchronous FETs 36 on the transformer secondary to control the flow from each half of the secondary winding so that current from the output flows only one way producing a DC output. The synchronous FET(s) is(are) turned on by the controller when the voltage across the FET will allow current to flow to the output of the converter, and is(are) turned off to block the flow of current back through the converter, preventing current to backflow to the transformer. In the modified Push-Pull converter 48 (shown in FIG. 8), the FET(s) replace diodes and provide increased efficiency as the $R_{on}$ features of a FET provide a lower power loss than a diode.

In one embodiment, as shown in FIG. 14, the power circuit 10 includes a synchronous rectification circuit 60 connected to the primary side of the transformer 30 in place of, or in addition to, the full-wave bridge rectification circuit 24. The primary side synchronous rectification circuit 60 may include a synchronous switching device 62 that includes four synchronous FETs 36. In one embodiment, the synchronous switching device 62 may include a single synchronous FET 36, a pair of synchronous FETs 36, or any suitable number of FETs 36 connected to the transformer primary side. By providing the rectification circuit 16 including a synchronous rectification circuit 60, the size of the filter capacitor 26 may be reduced over known electrical circuits, or the filter capacitor 26 may be removed from the power circuit 10.

Figure 9:
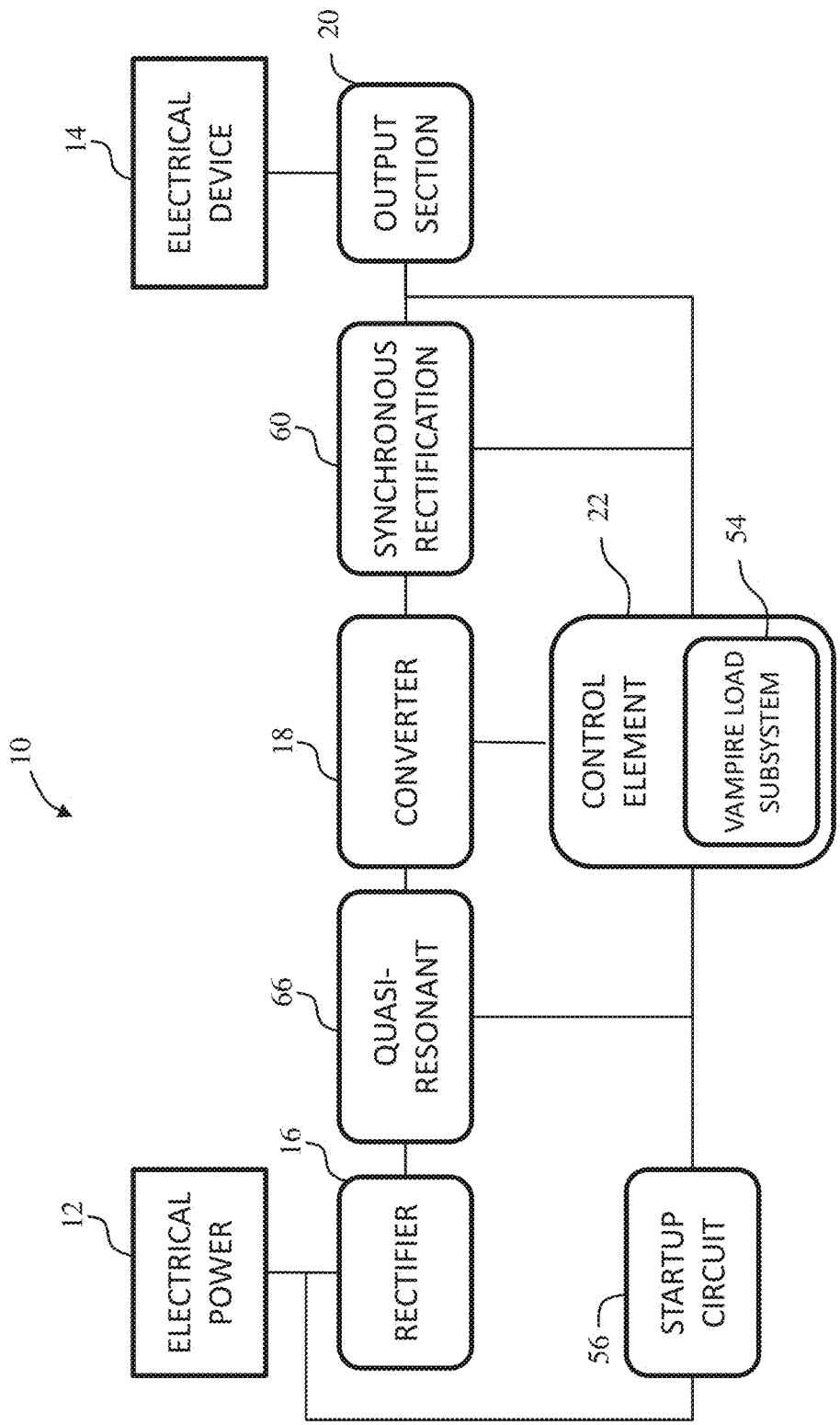
FIG. 9 is another block diagram of the power circuit shown in FIG. 1, according to an embodiment of the present invention.
Figure 10:
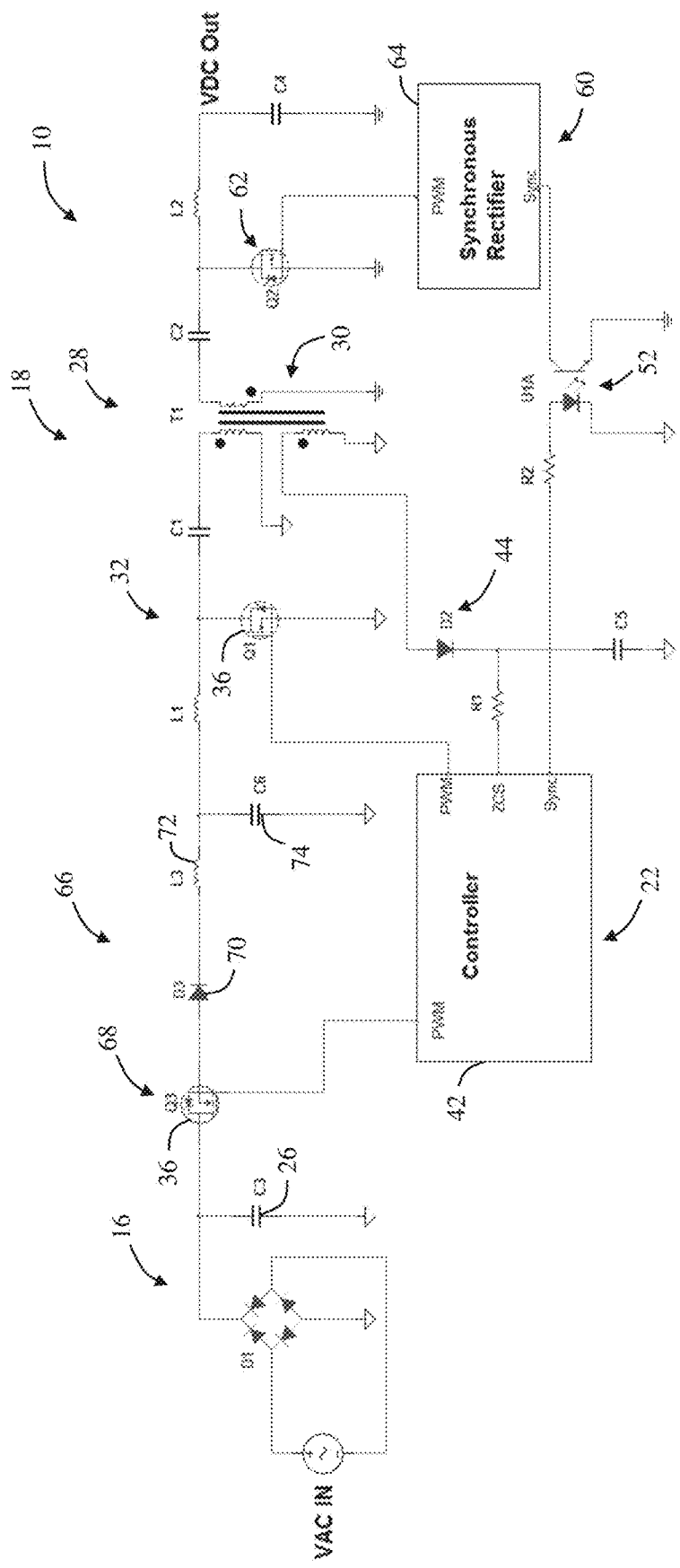
FIGS. 10-14 are schematic diagrams of the power circuit shown in FIG. 9, according to embodiments of the present invention.
Figure 11:
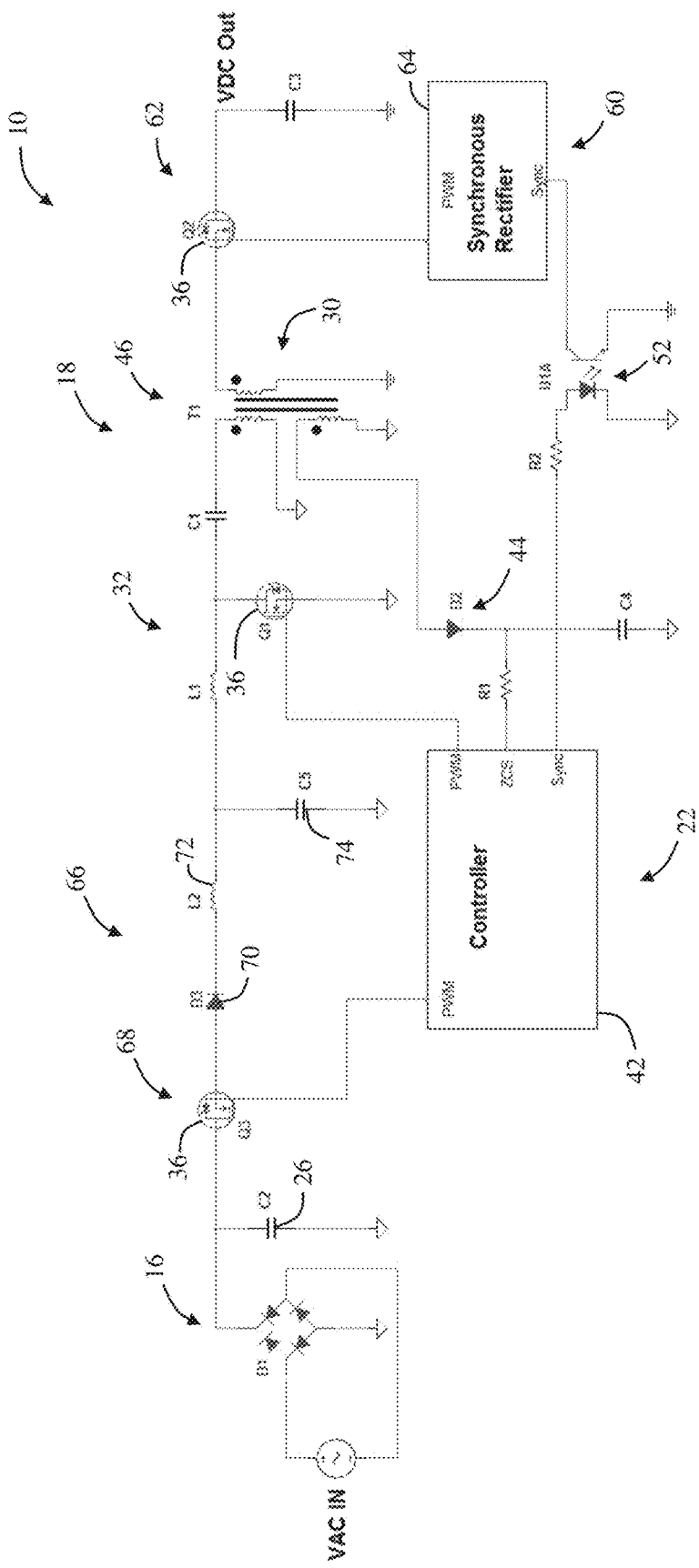
Figure 12:
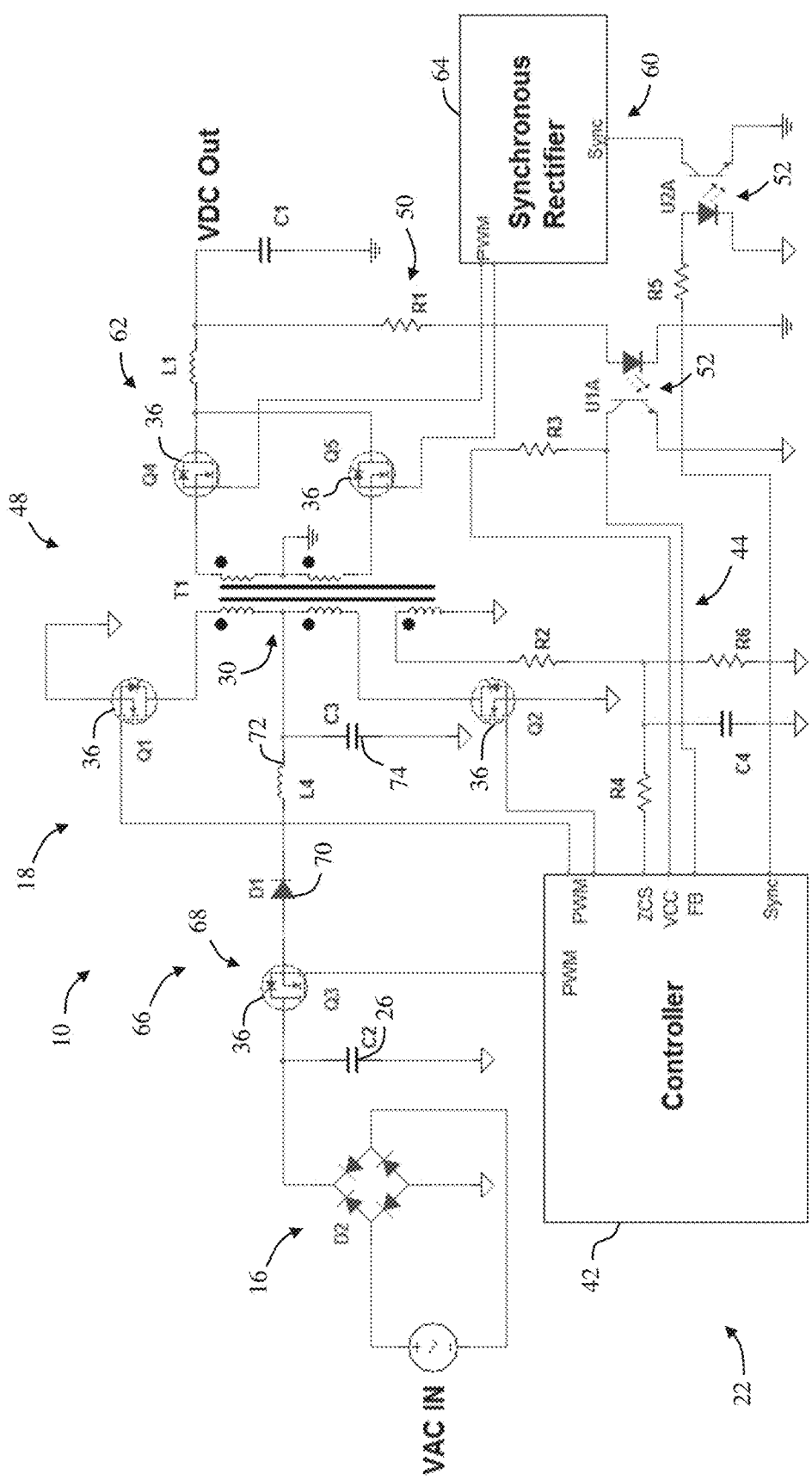

FIG. 9 is another block diagram of the power circuit 10, according to an embodiment of the present invention. FIGS. 10-14 are schematic diagrams of the power circuit 10. In the illustrated embodiment, the power circuit 10 includes a quasi-resonant circuit 66 that is coupled to the power converter circuit 18. The quasi-resonant circuit 66 includes a switching device 68 that is coupled to the controller 42, a diode 70 that is coupled to the switching device 68, an inductor 72 coupled to the diode 70, and a capacitor 74 that is coupled to the inductor 72. In one embodiment, the switching device 68 may include a FET 36. In one embodiment, the quasi-resonant circuit 66 does not include an inductor 72 and/or a diode 70. In another embodiment, the quasi-resonant circuit 66 does not include the switching device 68.

In the illustrated embodiment, the controller 42 is configured to determine a zero crossing of the transformer 30 as a function of the sensed transformer voltage and operate the switching device 68 to deliver input power to the primary side of the transformer 30 as the transformer 30 approaches the zero crossing. In addition, the controller 42 may also monitors a level of current being drawn by the electronic device 14 during the charging cycle, detects if the monitored level of current being drawn by the electrical device is less than a threshold level of current, and responsively operates the power circuit 10 to disconnect power to the electronic device 14. In one embodiment, the controller 42 may operate the one or more FETs 36 included in the switching device 32, the quasi-resonant circuit 66 and/or the synchronous switching device 62 to disconnect power from the electrical power supply 12 and/or the electronic device 14.

As shown in FIGS. 10-14, each of the modified Ç uk converter 28, the modified SEPIC converter 46, the modified Buck converter 47, and/or the modified Push-Pull converter 48 may include the quasi-resonant circuit 66. In one embodiment, the quasi-resonant circuit 66 may include a FET, diode, and LC circuit that are placed on the front end to allow the main switching elements to fully turn while the current passing through them is "zero" or similar. The FET in the quasi-resonant circuit 66 provides an oscillation to allow the main FET(s) included in the power converter circuit 18 to switch at zero current to reduce switching losses. Unlike a linear power supply, the quasi-resonant circuit 66 includes regulation that uses a pass transistor of a switching-mode supply which continually switches between low-dissipation, full-on and full-off states, and spends very little time in the high dissipation transitions, which minimizes wasted energy. Ideally, a switched-mode power supply dissipates no power. Voltage regulation is achieved by varying the ratio of on-to-off time. In contrast, a linear power supply regulates the output voltage by continually dissipating power in the pass transistor. This higher power conversion efficiency is an important advantage of a switched-mode power supply. Switched-mode power supplies may also be substantially smaller and lighter than a linear supply due to the smaller transformer size and weight.

Figure 13:
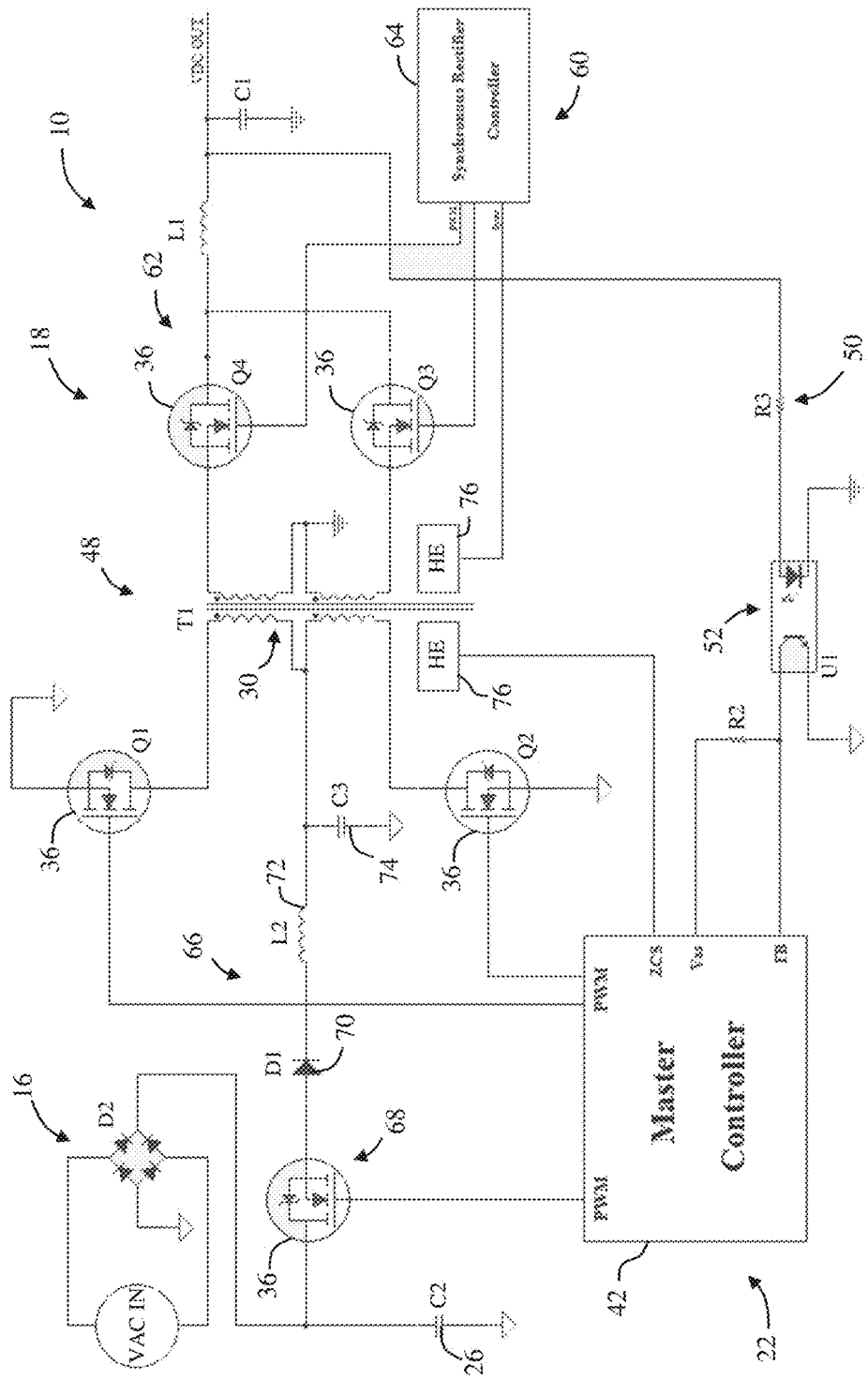

Referring to FIGS. 13 and 14, in one embodiment, the control element 22 includes one or more Hall Effect sensors 76 that are coupled to the transformer 30 for sensing a magnetic field being generated within the transformer 30. The Hall Effect sensors 76 facilitate determining a zero-crossing of the transformer 30 by directly sensing the magnetic field being generated by the transformer 30 during operation. In one embodiment, the control element 22 include a primary side Hall Effect sensor 76 coupled to the primary side of the transformer 30. The primary side Hall Effect sensor 76 is connected to the controller 42 for transmitting a signal to the controller 42 for use in determining when the transformer 30 nears the "zero-crossing". In another embodiment, the control element 22 includes a secondary side Hall Effect sensor 76 that is coupled to the secondary side of the transformer 30, and is connected to the synchronous control device 64 for transmitting a signal indicative of the transformer magnetic field for use in determining the time at which the transformer 30 reaches the "zero-crossing".

Figure 15:
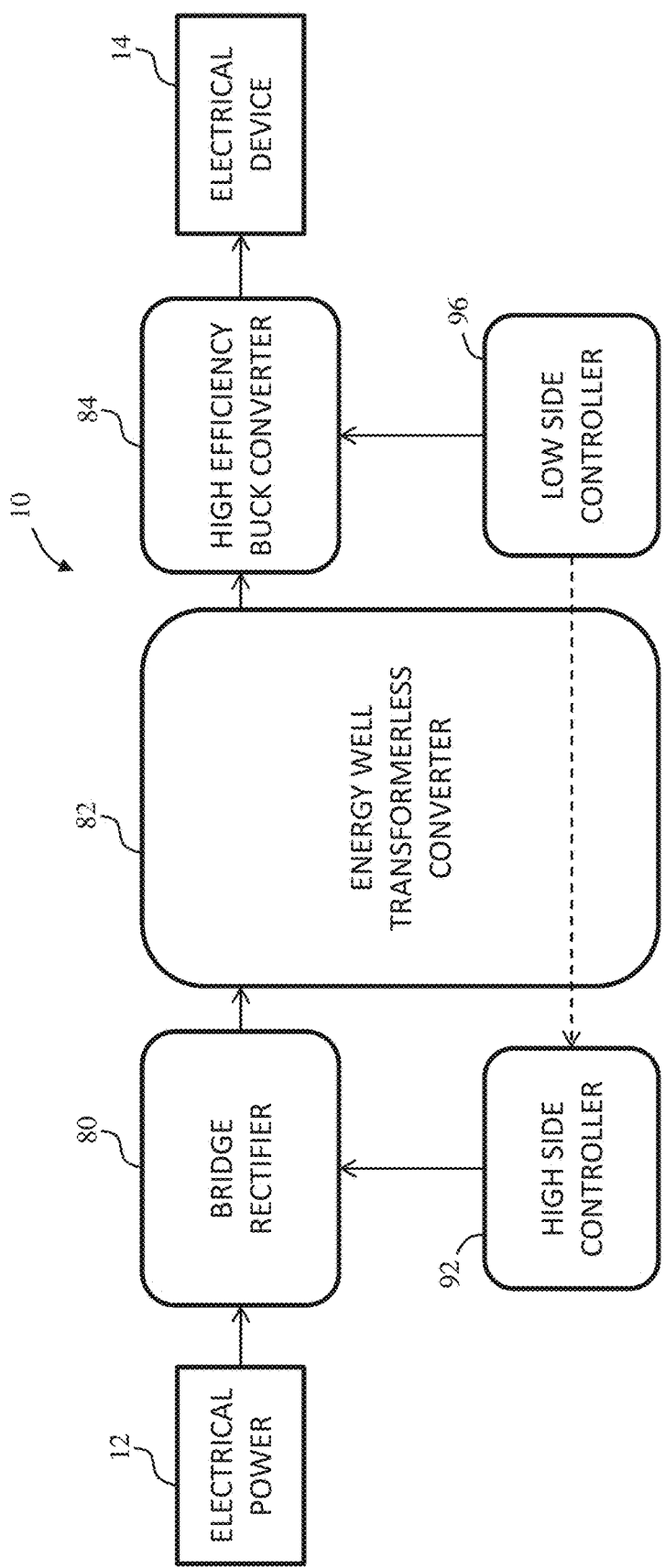
FIG. 15 is another block diagram of the power circuit shown in FIG. 1, according to an embodiment of the present invention.
Figure 16:
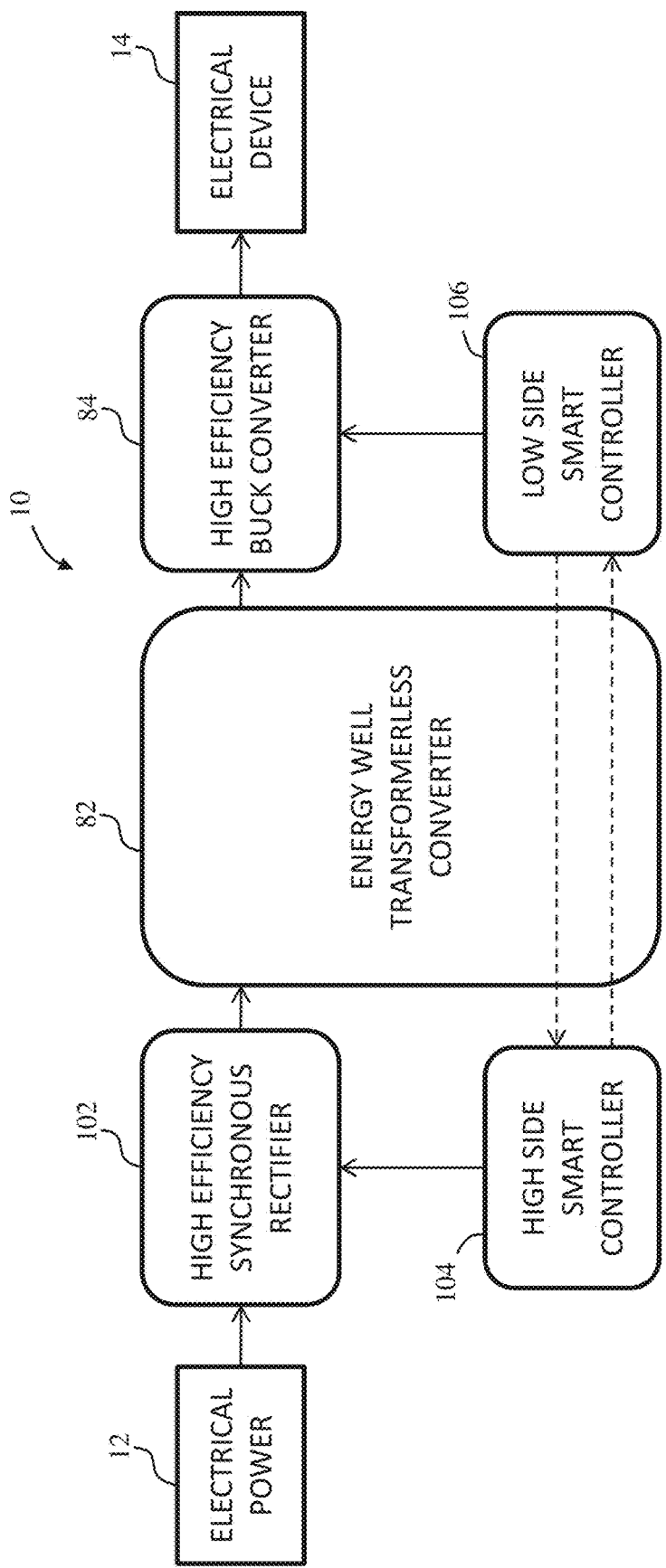
FIG. 16 is another block diagram of the power circuit shown in FIG. 15, according to an embodiment of the present invention.
Figure 17:
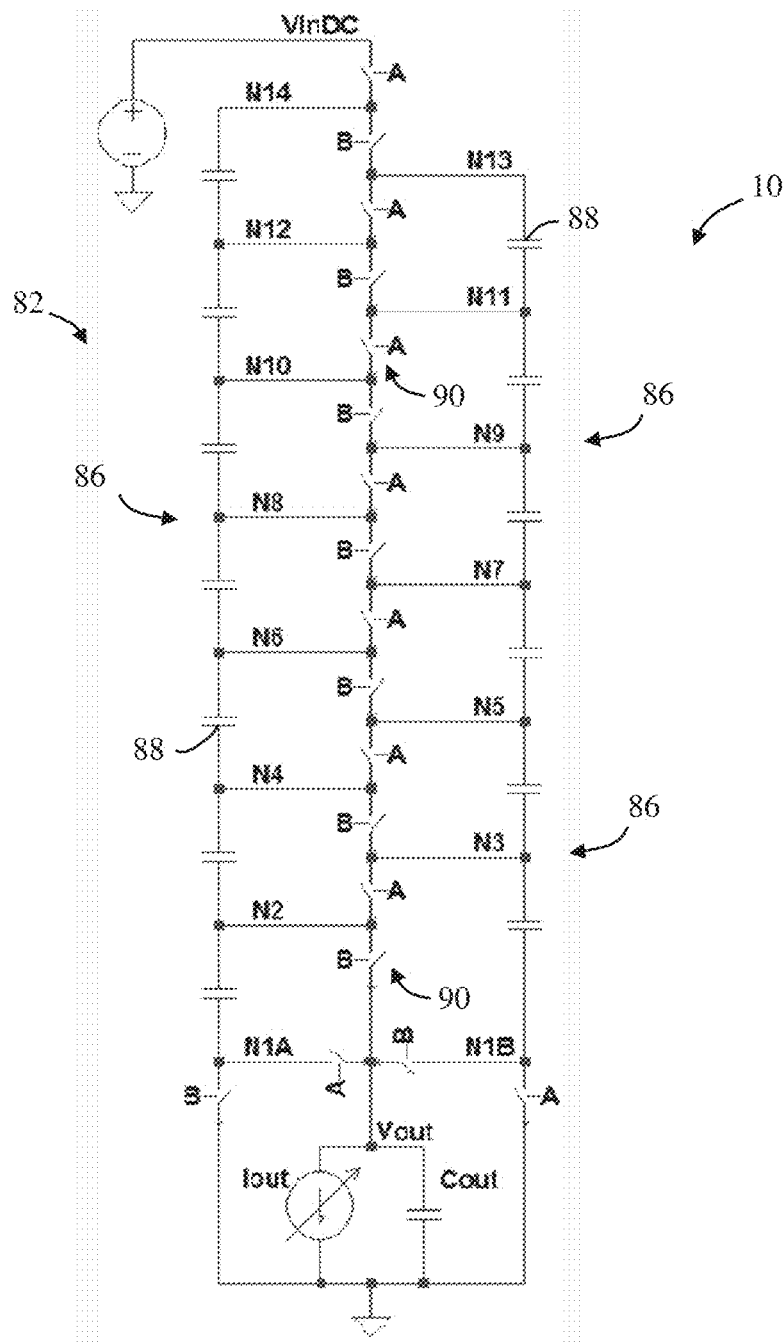
FIGS. 17-19 are schematic diagrams of the power circuit shown in FIGS. 15 and 16, according to embodiments of the present invention.
Figure 18:
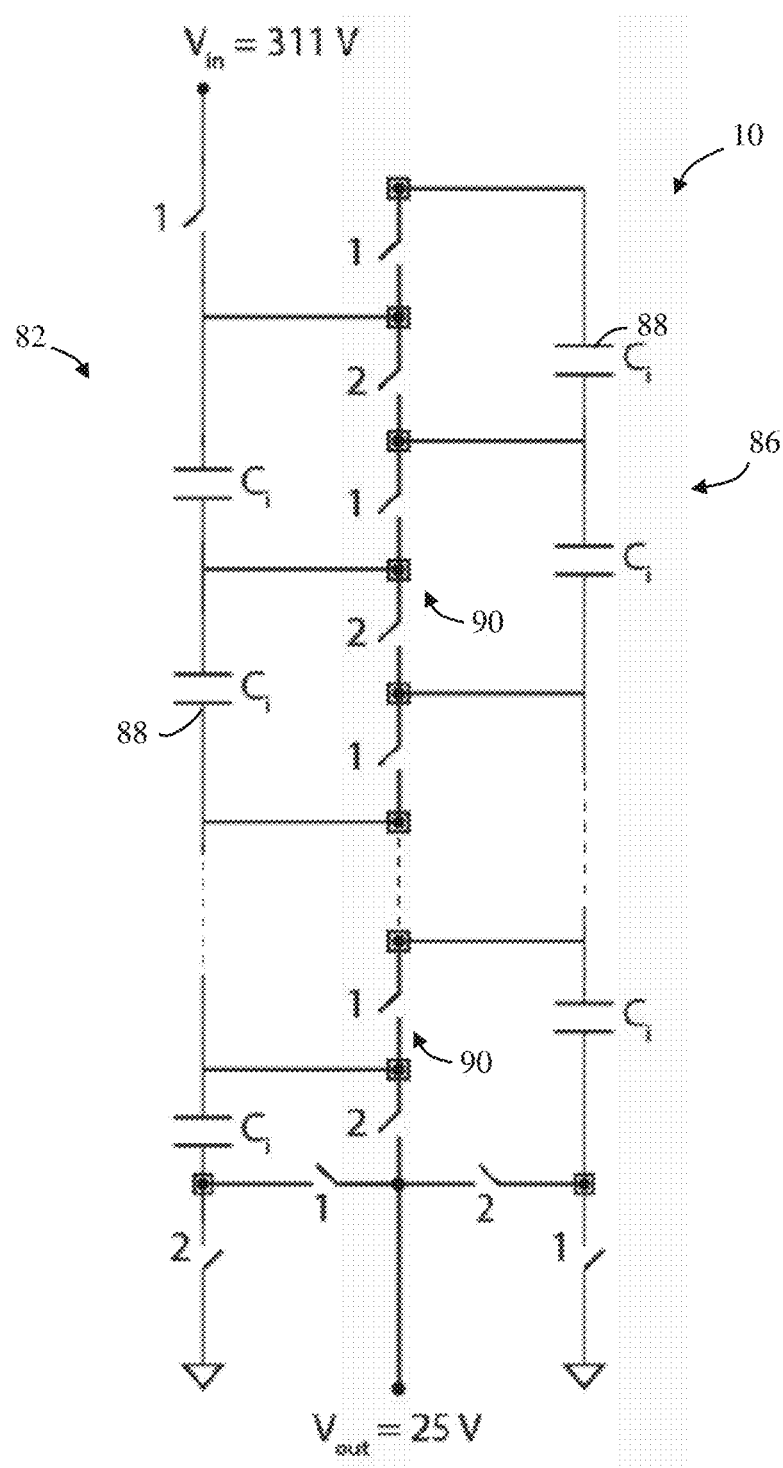
Figure 19:
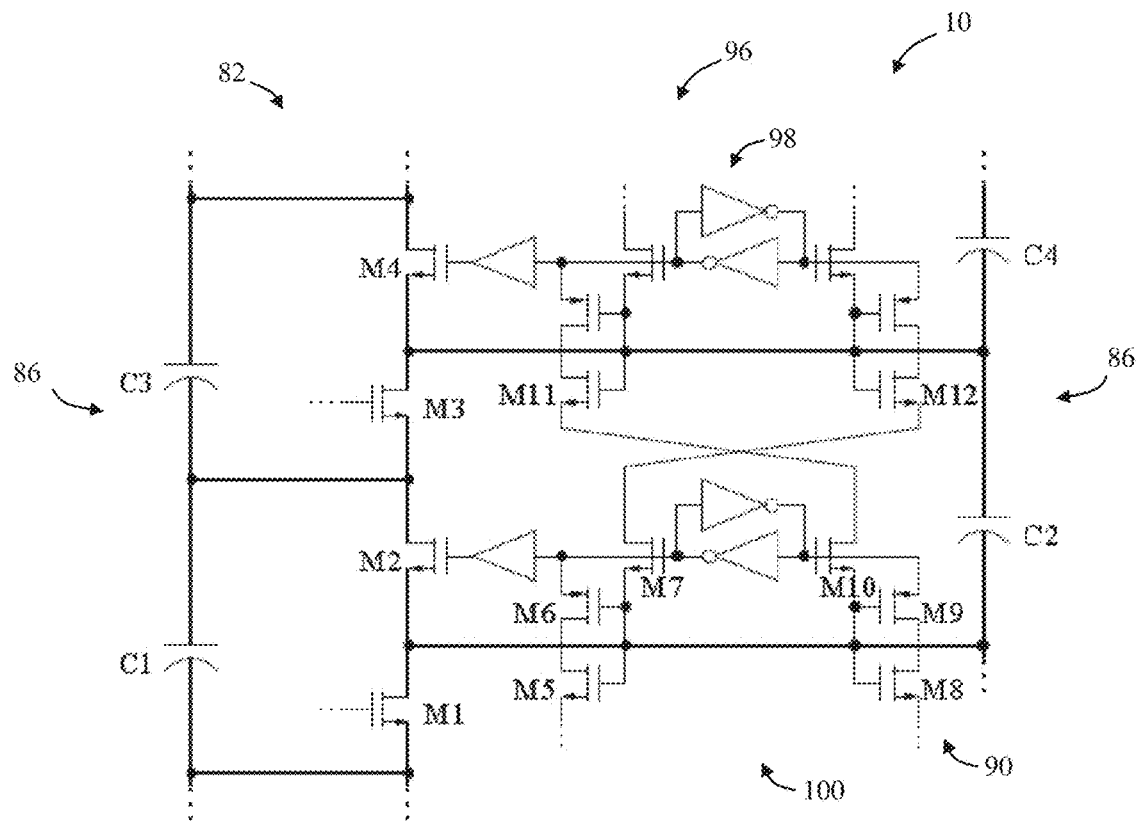
Figure 20:
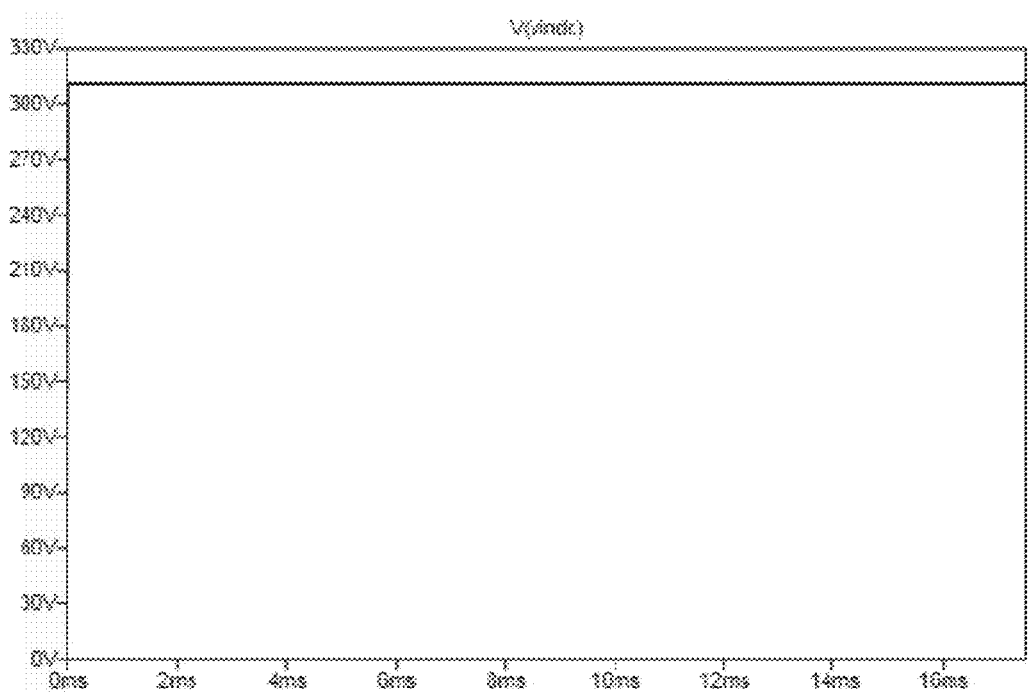
FIG. 20-24 are graphic representations of voltage plots associated with power circuits shown in FIG. 17.
Figure 21:
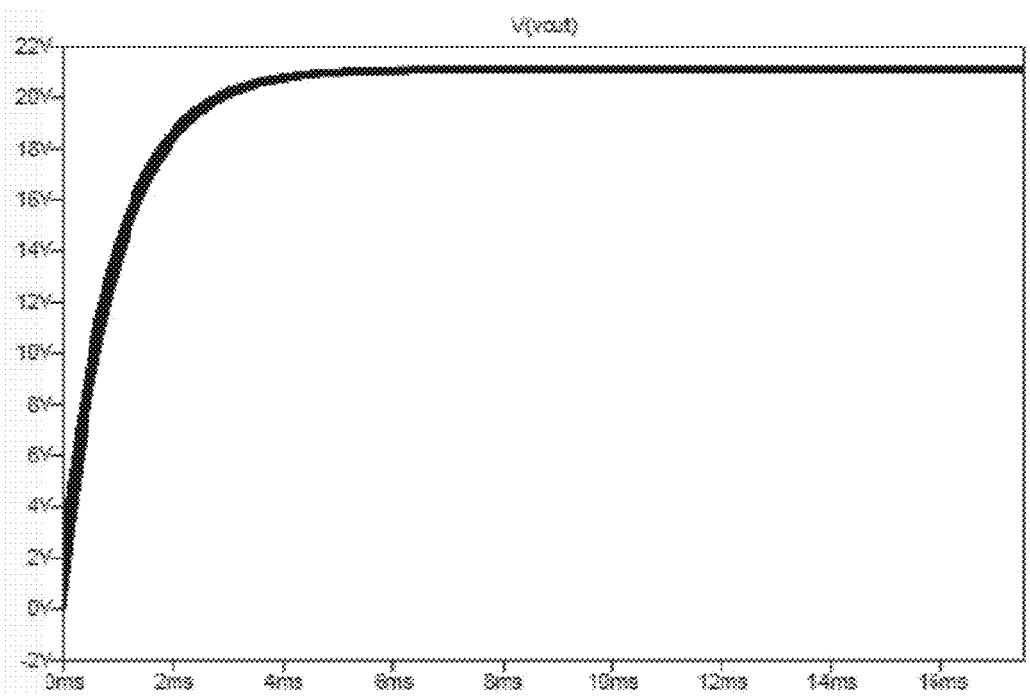
Figure 22:
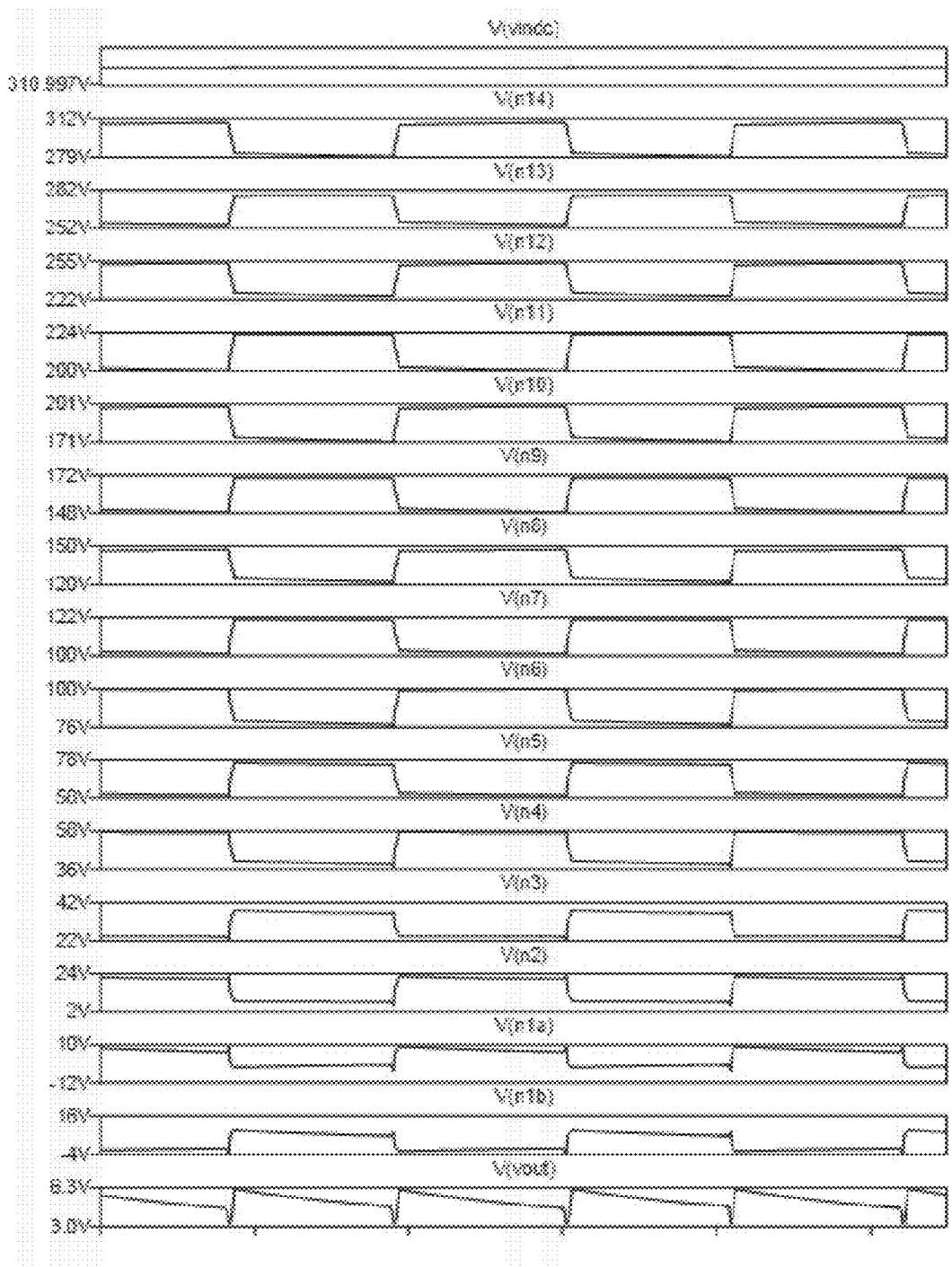
Figure 23:
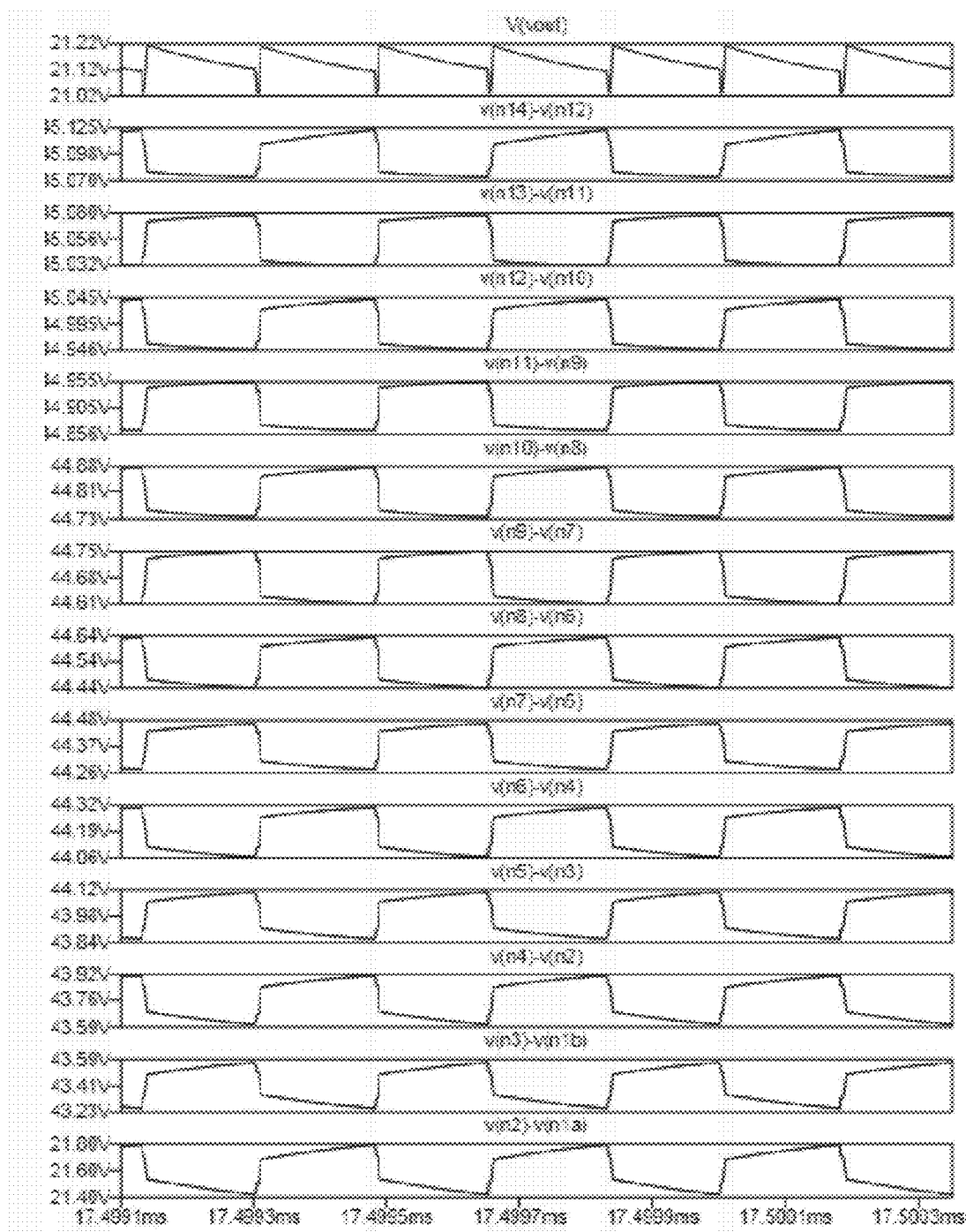
Figure 24:
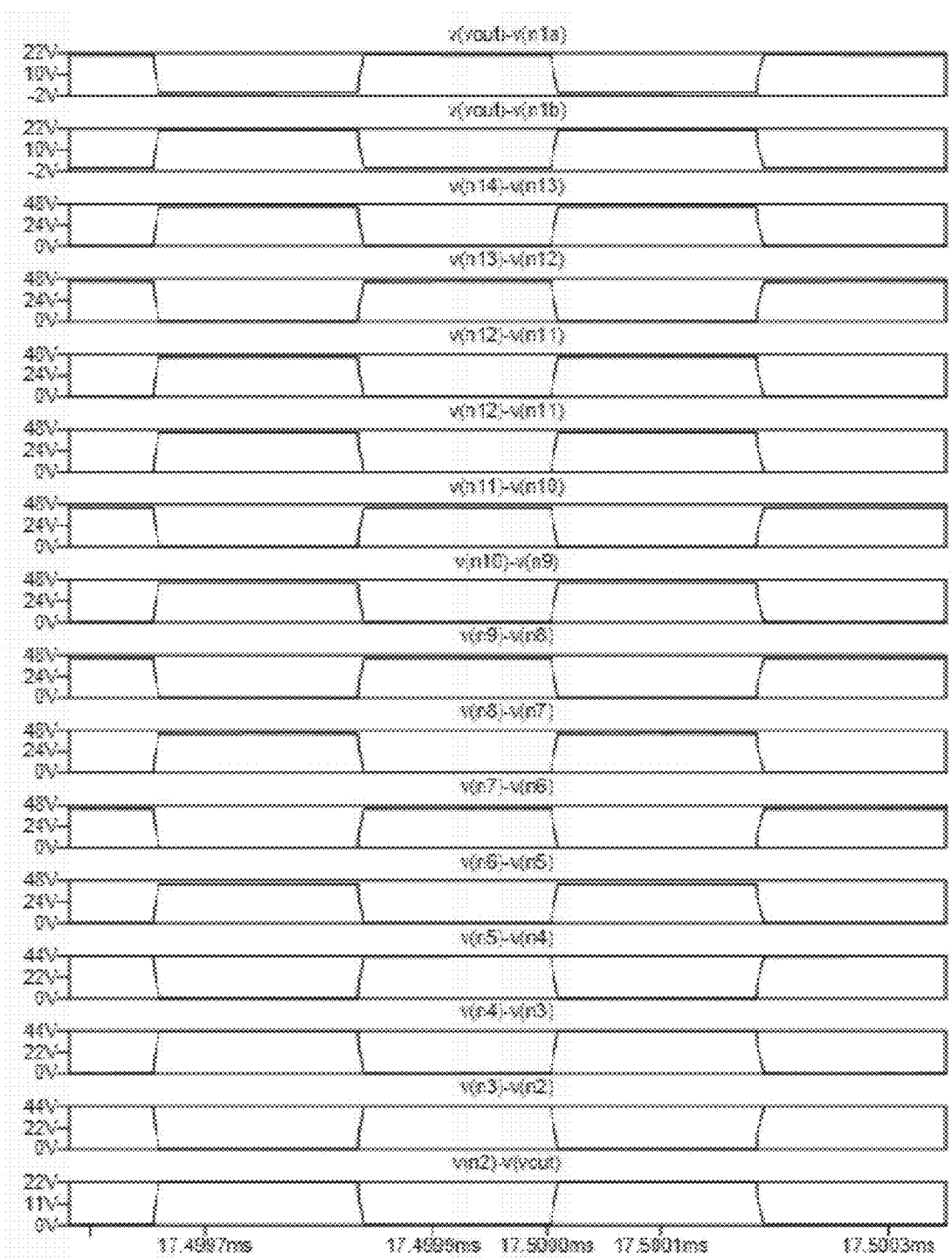

FIGS. 15 and 16 are additional block diagrams of the power circuit 10, according to an embodiment of the present invention. FIGS. 17-19 are schematic diagrams of the power circuit 10. In the illustrated embodiment, the power circuit 10 includes a bridge rectifier 80, an energy well transformerless converter 82, and a high efficiency buck converter 84. The bridge rectifier 80 receives AC input power and delivers DC input power to the energy well transformerless converter 82. The energy well transformerless converter 82 receives the DC input power at a voltage level and delivers a DC output power at a lower voltage level to the buck converter 84 for delivery to the electronic device 14. In one embodiment, the energy well transformerless converter 82 delivers power to the buck converter 84 at a first voltage level and the buck converter 84 delivers the DC output power to the electronic device 14 at a second voltage level that is less than the first voltage level. For example, as shown in FIG. 18, the energy well transformerless converter 82 may receive an input power at an input voltage, Vin equal to about 311 VDC, and deliver an output power at a output voltage, Vout equal to about 25 VDC. The buck converter 84 may receive the output power at 25 VDC and deliver output power to the electronic device 14 at an output voltage of about 5 VDC.

In the illustrated embodiment, the energy well transformerless converter 82 includes a modified Dickson charge pump including a plurality of voltage reduction energy wells 86 for use in reducing a voltage of an input power signal. Each energy well 86 includes one or more capacitors 88 which are set in ranges of different voltages in any voltage division, from very small to large (i.e. 0.10V, 1V, 5V, and etc.). Switching devices 90, such as, for example MOSFETs, are connected to the energy wells 86. In one embodiment, the switches devices 90 may be configured to withstand a 1/N of voltage swing, $V_{DS}$ and/or a 2/N voltage swing. In the illustrated embodiment, the power circuit 10 may also include a high side controller 92 and a low side controller 96 to facilitate operating the power circuit 10.

In one embodiment, the energy well transformerless converter 82 may also include a floating gate drive 96 that is connected to one or more stacks and/or stages of energy wells 86. In addition, the floating gate drive 96 may include a first set 98 of MOSFETs and diodes and a second set 100 of MOSFETs and diodes that are connected via a cross-coupling converter.

In one embodiment, as shown in FIG. 16, the power circuit 10 may include a high efficiency synchronous rectifier 102 that is connected to the energy well transformerless converter 82. In addition, the power circuit 10 may also include a high side smart controller 104 for use in controller the synchronous rectifier 102, and a low side smart controller 106 for use in controlling an operation of the buck converter 84.

Figure 25:
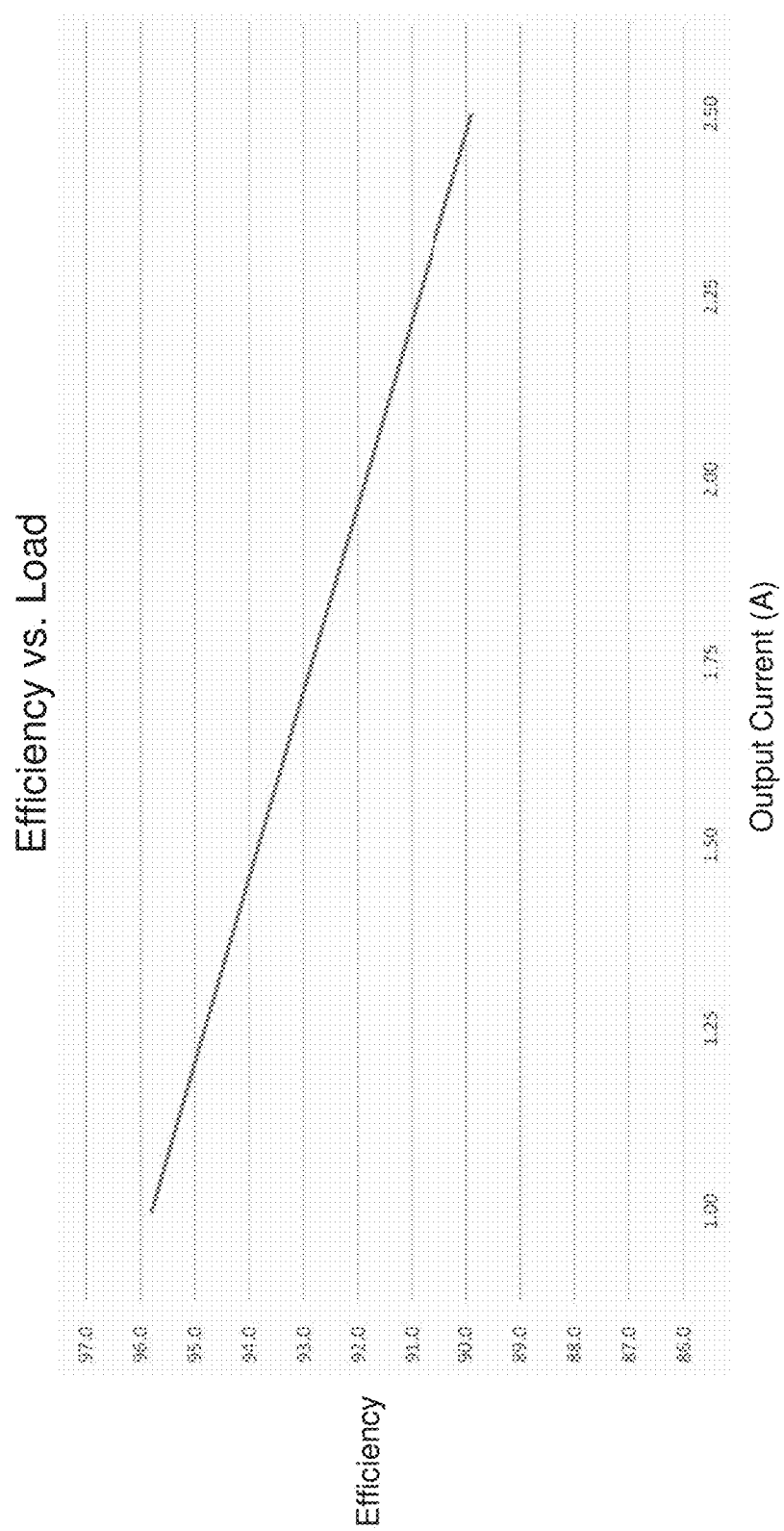
FIG. 25 is a graphic representation of Efficiency vs. Load associated with the power circuit shown in FIG. 17.

FIG. 20-24 are graphic representations of voltage plots associated with the power circuit 10 including the energy well transformerless converter 82. FIG. 25 is a graphic representation of Efficiency vs. Load associated with the power circuit 10 shown in FIG. 17. The illustrative plots shown in FIGS. 20-25 are generated during a simulation of the power circuit 10 under the following parameters: clkperiod=3.5e-007; clkcycles=50000; switchRon=1; ci=1e-006; Vin=311; and Iout=1.2 A.

Figure 26:
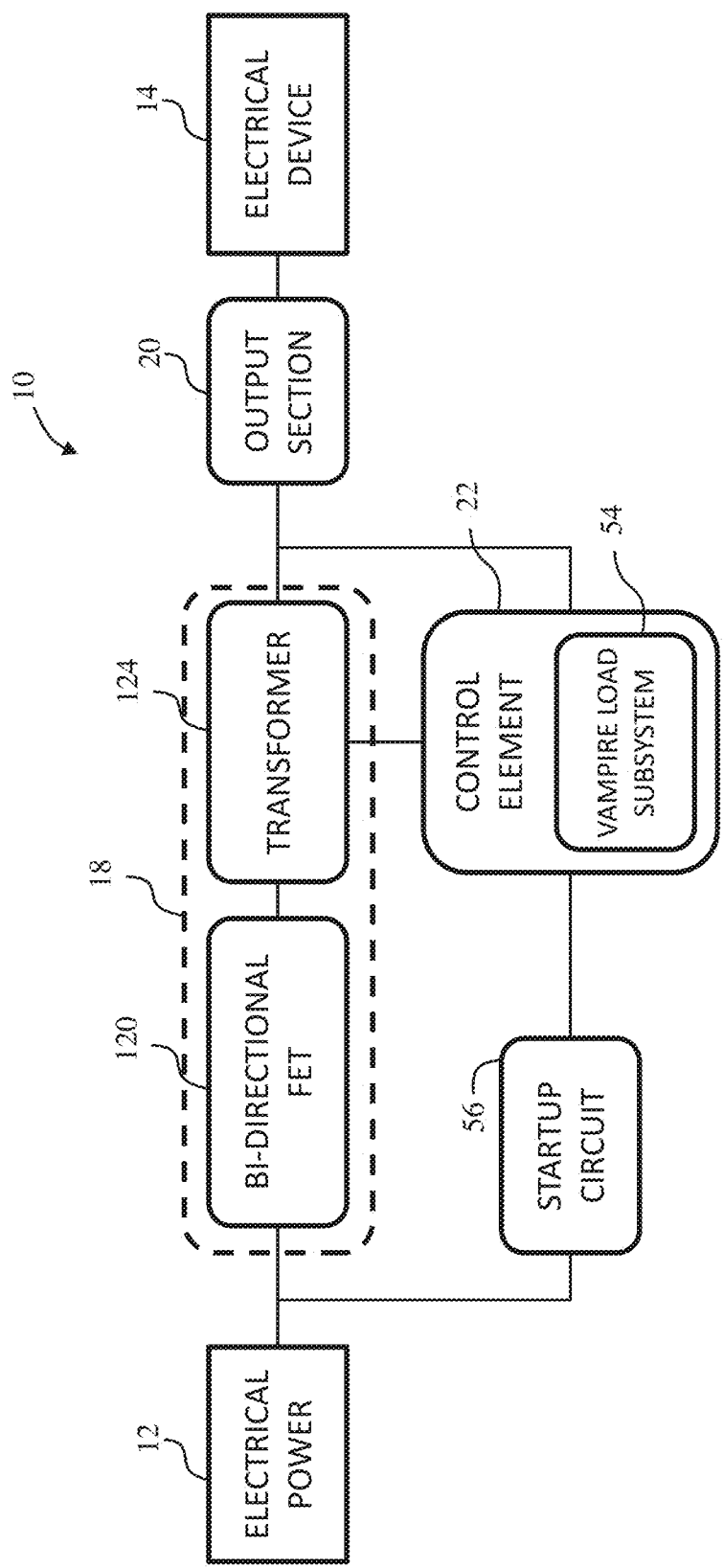
FIG. 26 is another block diagram of the power circuit shown in FIG. 1, according to an embodiment of the present invention.
Figure 27:
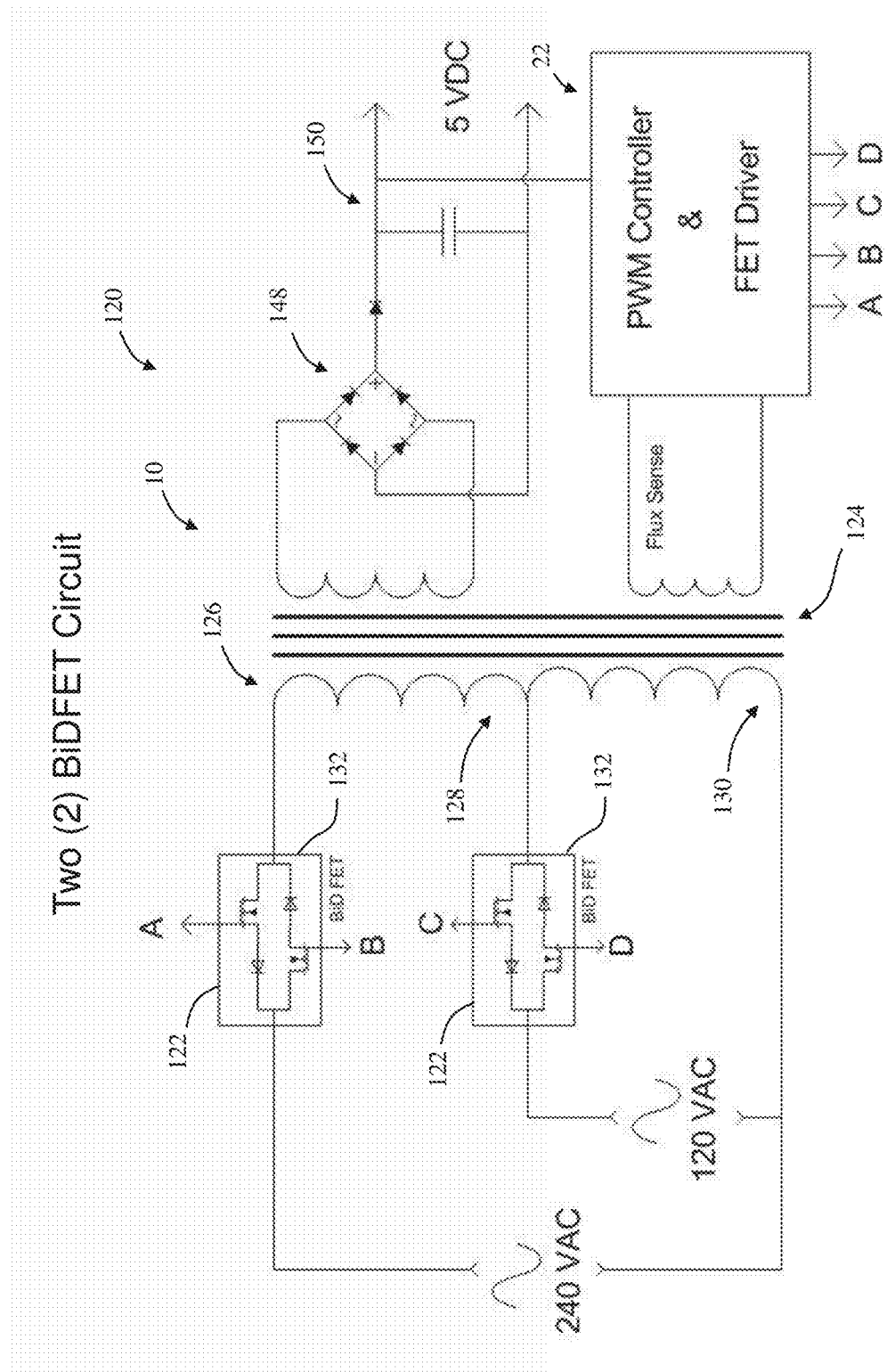
FIG. 27-41 are schematic diagrams of a BiDFET circuit that may be used with the power circuit shown in FIG. 26, according to an embodiment of the present invention.
Figure 28:
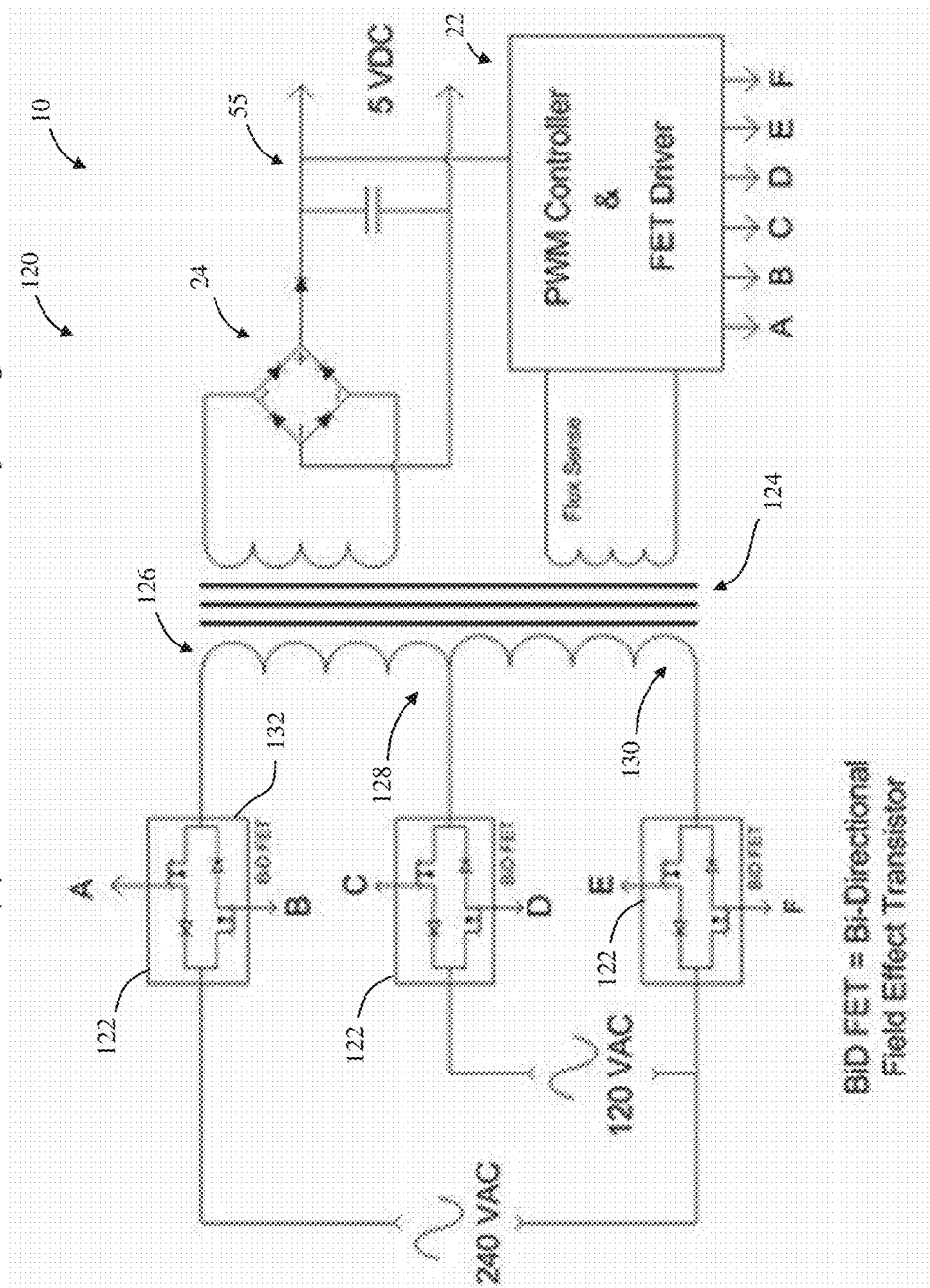
Figure 29:
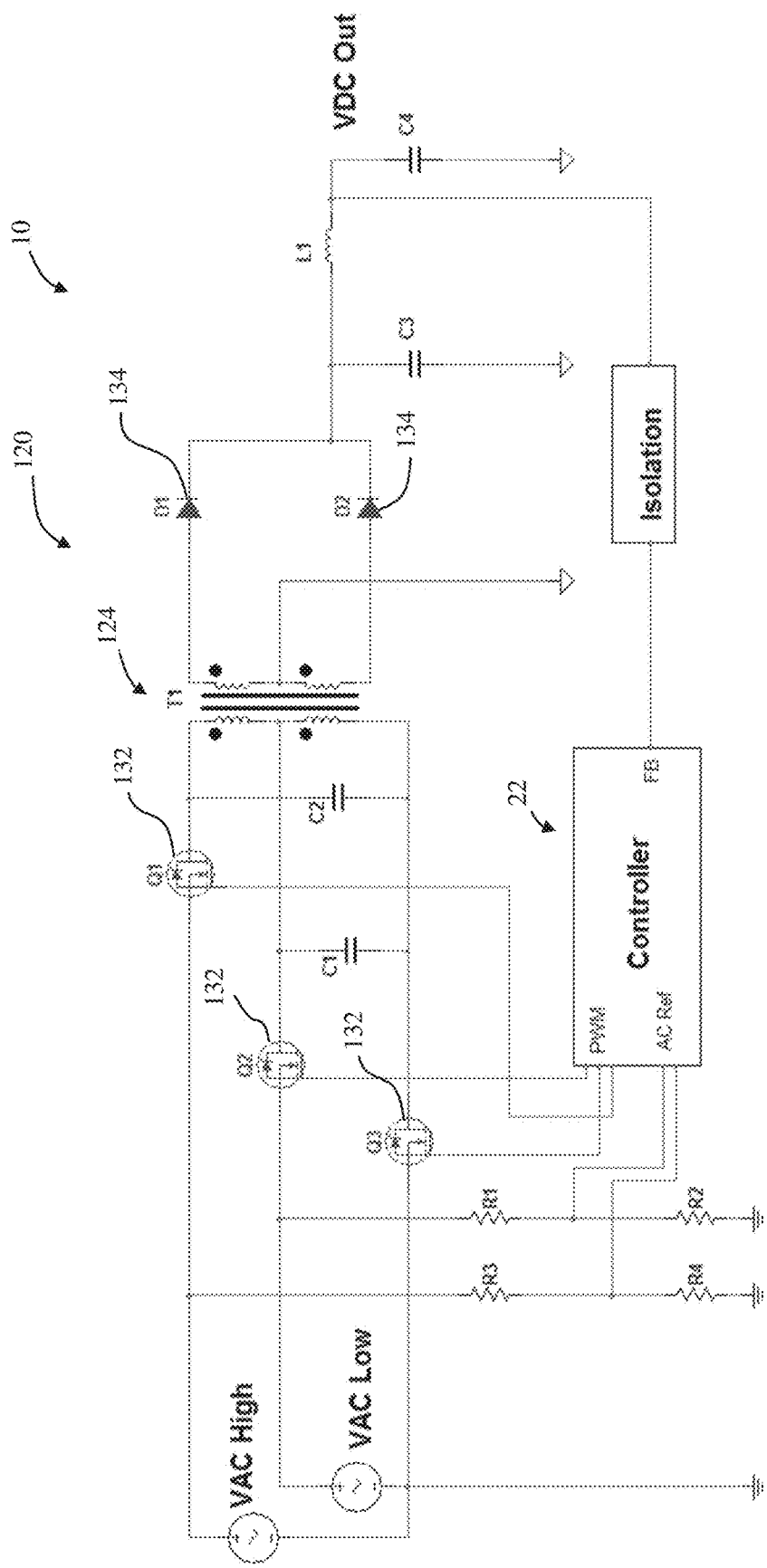
Figure 41:
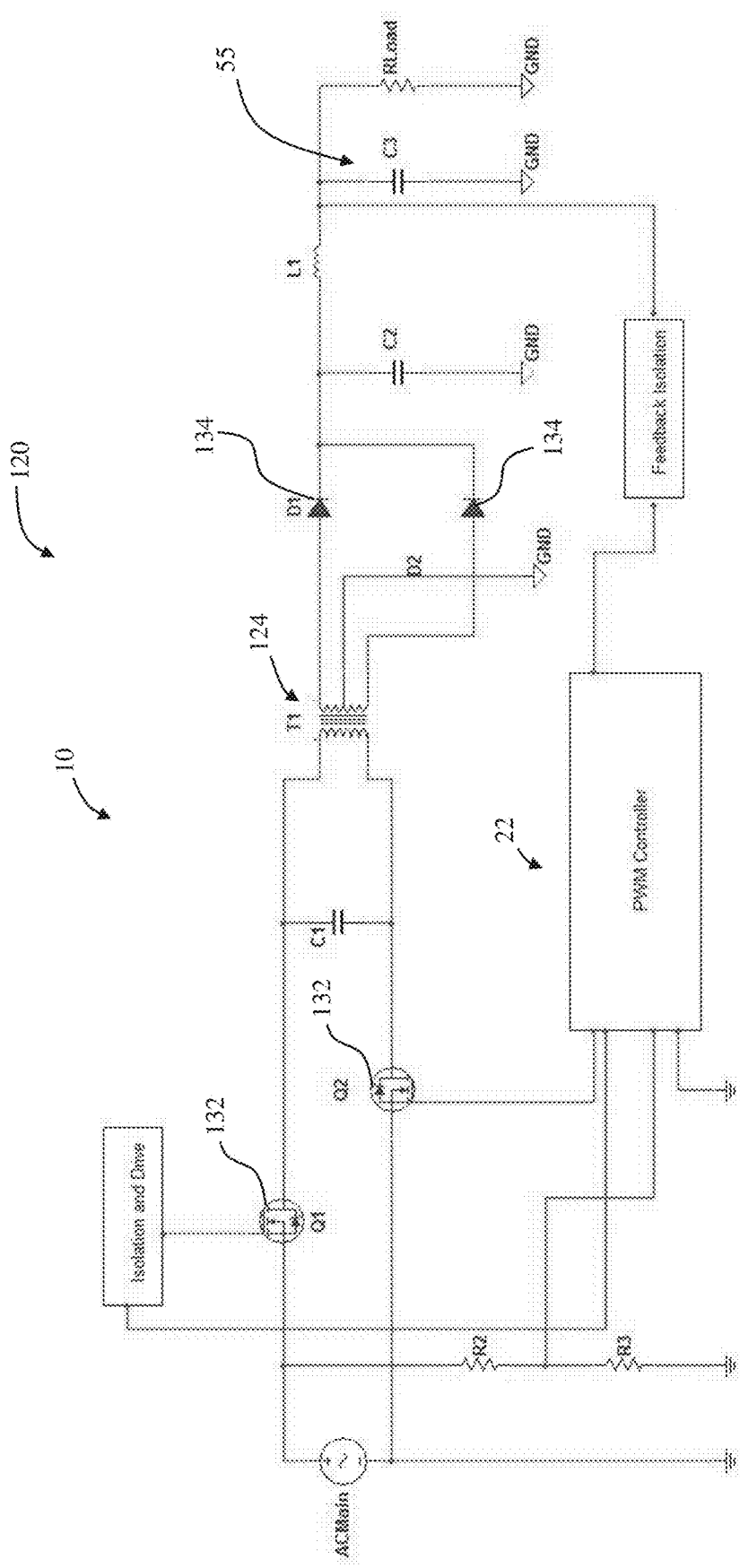
Figure 42:
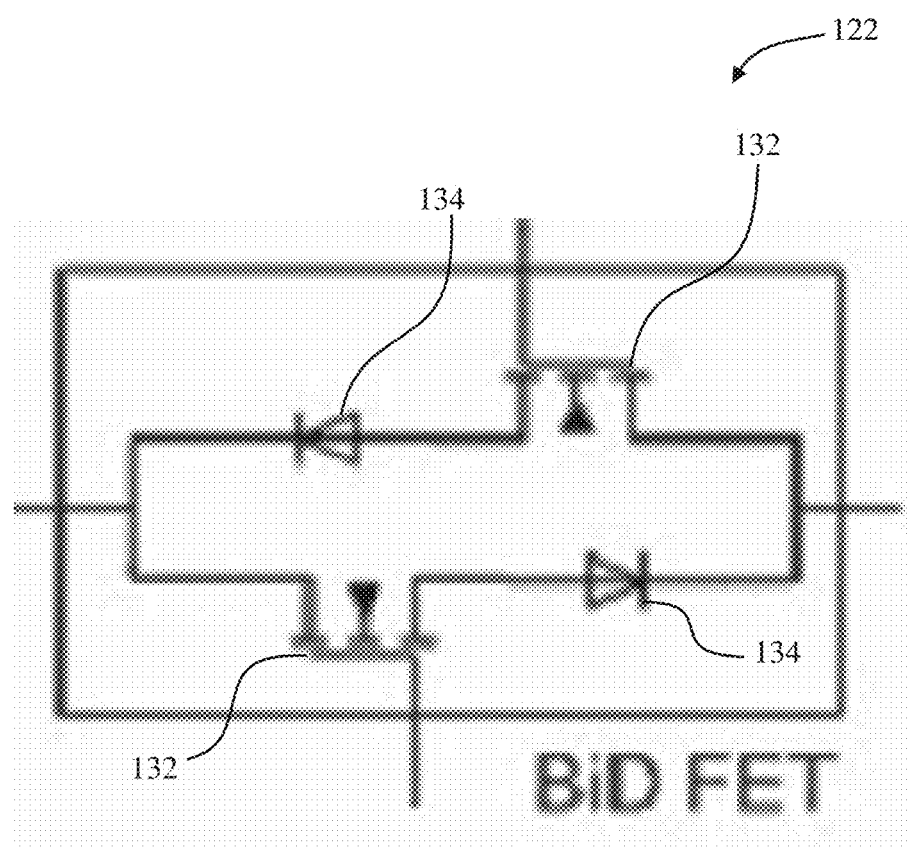
FIG. 42 is a schematic diagram of a bi-directional field effect transistor (BiDFET) that may be used with the power circuit shown in FIGS. 27-41, according to an embodiment of the present invention.

FIG. 26 is another block diagram of the power circuit 10 including the power converter circuit 18 including a bi-directional field effect transistor (BiDFET) circuit 120, according to an embodiment of the present invention. FIGS. 27-41 are schematic diagrams of a BiDFET circuit 120 that may be used with the power circuit 10. FIG. 42 is a schematic diagram of a BiDFET 122 that may be used with the BiDFET circuit 120. In the illustrated embodiment, the BiDFET circuit 120 includes one or more BiDFETs 122 that are connected to a transformer 124. In one embodiment, the transformer 124 includes high-end tap 126, a center tap 128, and a low-end tap 130. The power circuit 10 may also include three BiDFETs 122 that are connected to each of the high-end tap 126, a center tap 128, and a low-end tap 130. The transformer 124 is center tapped, such that with the three BiDFETs 122 either as separate components or built as integrated into a single IC's permitting the conversion from either 240/260 VAC can be made (using the top tap on the transformer), and the conversion from 110/120 VAC can be made by utilizing the center tap on the transformer. As shown in FIGS. 28 and 29, one of the BiDFETs 122, is a "common" BiDFET and the other two BiDFETs 122 are configured to receive inputs from both 110AC and 240AC, respectively. The power circuit 10 is configured to operate the BiDFETs 122 to receive input power at varying voltage levels. For example, the power circuit 10 may include a 110 VAC BiDFET 122 placed on the center tap 128, a 240 VAC BiDFET 122 at the high-end tap 126, and a common BiDFET 122 or ground on the low-end tap 130 of the transformer 124. This enables the power circuit 10 to generate the DC output power signal having a output voltage level (i.e. 6 VAC) at the same current regardless of which mains voltage is selected (110 VAC/240 VAC). In another embodiment, the BiDFET circuit 120 may include two BiDFETs 122 (shown in FIG. 27) that are connected to the center tap 128 and the high-end tap 126. In addition, the BiDFETs 122 may also be used with transformerless circuits such as, for example, the power circuit 10 shown in FIGS. 15 and 16.

Referring to FIG. 42, in the illustrated embodiment, each BiDFET 122 includes two field effect transistors (FET) 132 that are connected in parallel back to back. In one embodiment, the BiDFET 122 includes one or more diodes 134 in their respective drains. The FETs 132 are selected as a function of a suitable breakdown voltage such as 650 volts for units designed to operate in a 120 VAC or 240 VAC environment. The diodes 134 are selected with the same breakdown voltage as the FETs 132. In addition, the diodes 134 are connected to the respective drains of each FET 132 and may be connected to the sources instead of drains. The diodes 134 are configured to protect the corresponding FET 132 from the high reverse voltage that could be extant via the AC inputs half cycle that is opposite of the BiDFETs 122 normal operating voltage. In one embodiment, the BiDFET 122 may include two MOSFETS back to back pointed in the opposite direction with each half of the BiDFET 122 having a forward biased diode in series with the drain. The point of the diode, if not incorporated into the BiDFET 122, is to protect the BiDFET 122 when there exist high level reverse voltages. In another embodiment, the BiDFET 122 may include an opto triac and/or two SCR's back to back. The opto triacs may be configured to vary the signal frequency, switch at high speeds, and be "turned-off". In another embodiment, the BiDFET circuit 120 may include a combination BiDFET layout that includes one diode 134 attached to one of the BiDFET's drain with the other diode 134 placed off the source of the companion BiDFET 122.

In the illustrated embodiment, the BiDFET 122 is configured to be normally used in any location within the power circuit 10 that a Triac might be used, with the added advantage that the BiDFET 122 can be turned off. Thus, the BiDFET 122 does not have two drawbacks that Triacs possess. The BiDFET 122 can switch at high operating frequencies and may be turned off unlike Triacs which, when once turned on, can only turn off when the applied voltage is reduced to zero.

Figure 30:
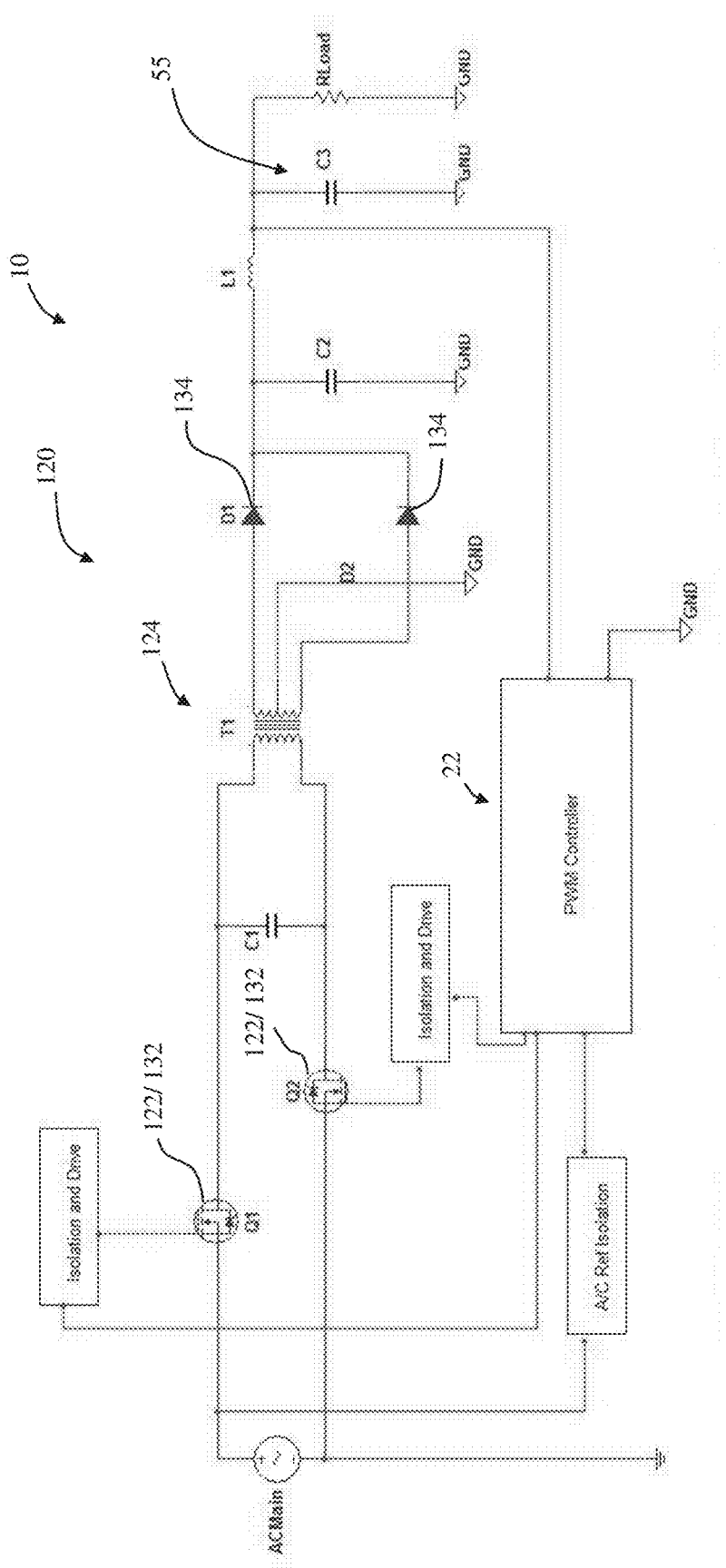
Figure 31:
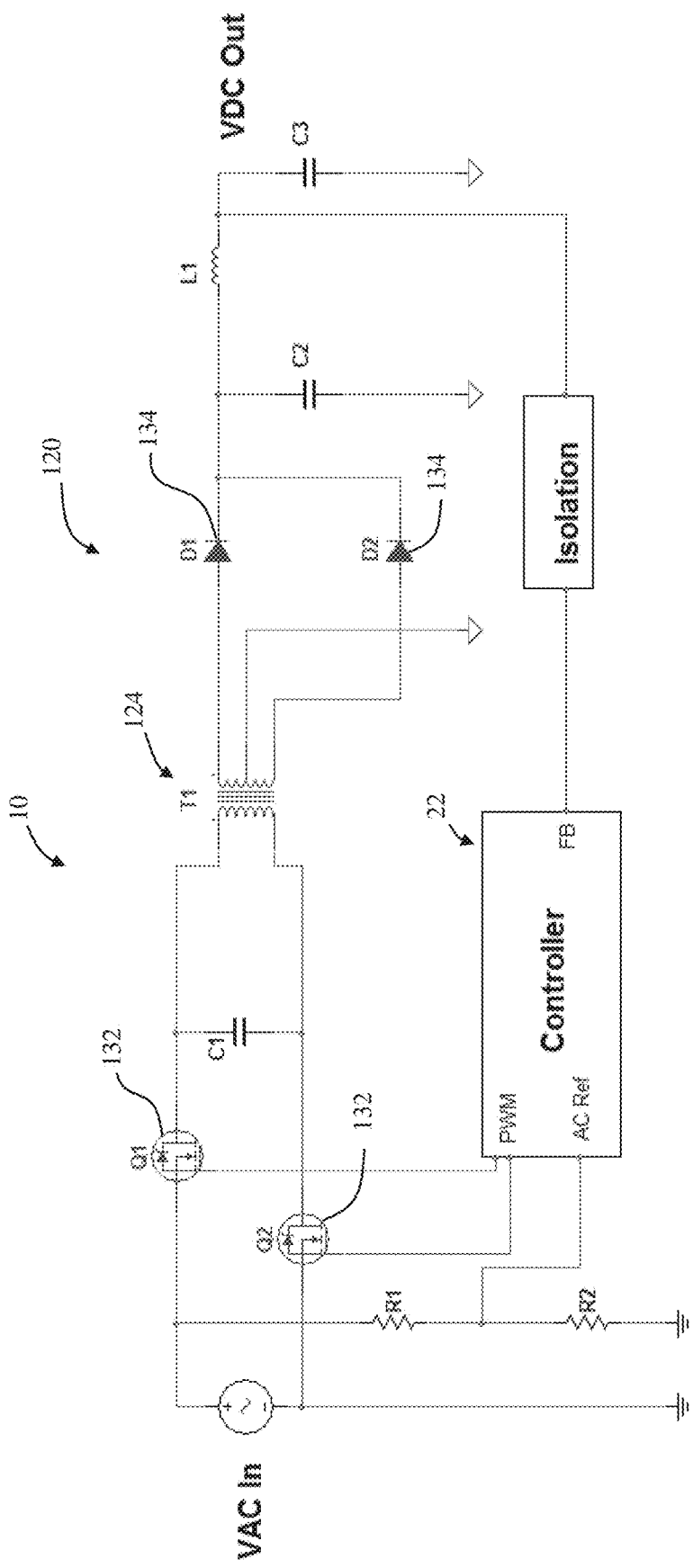
Figure 32:
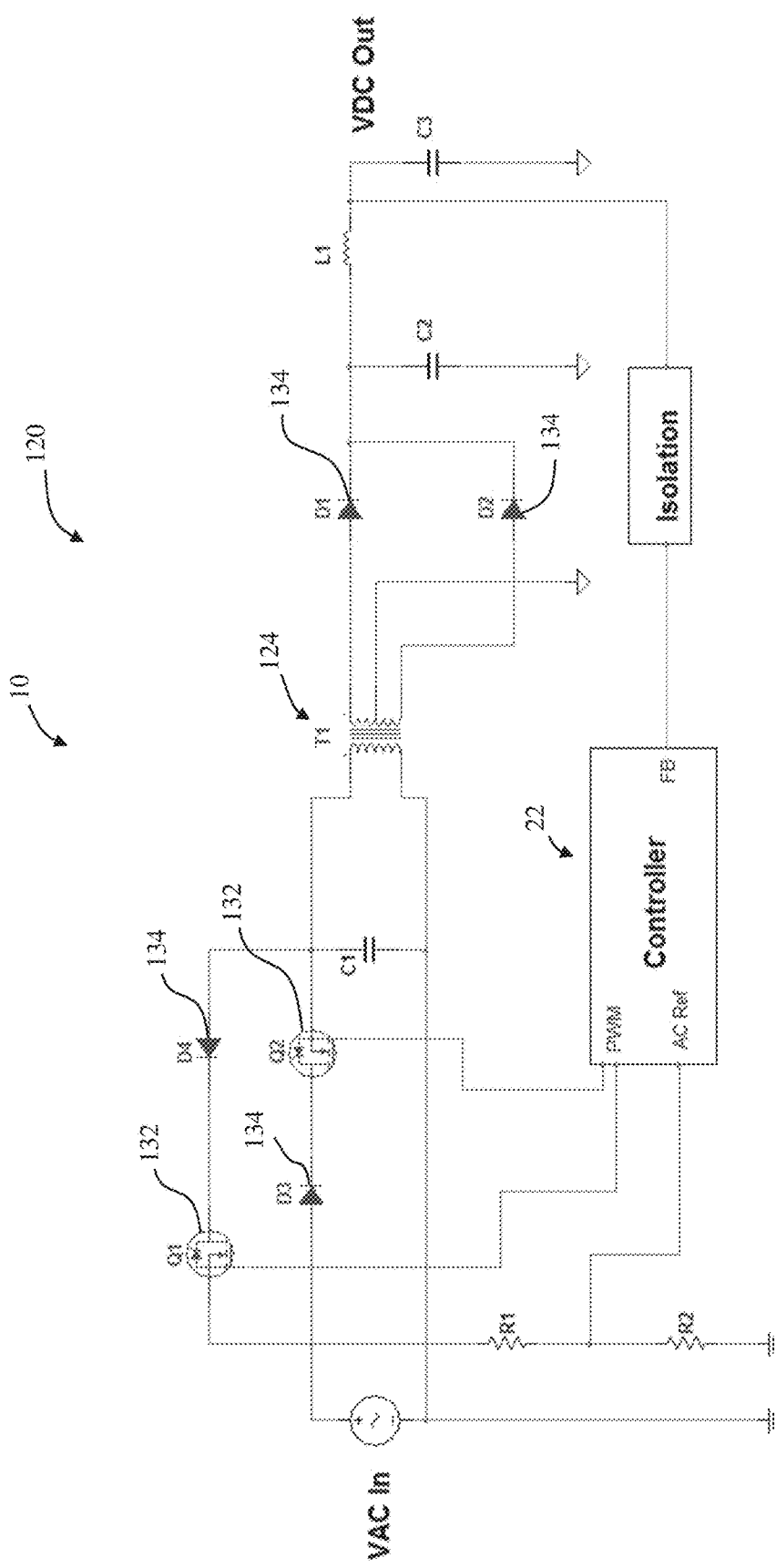
Figure 33:
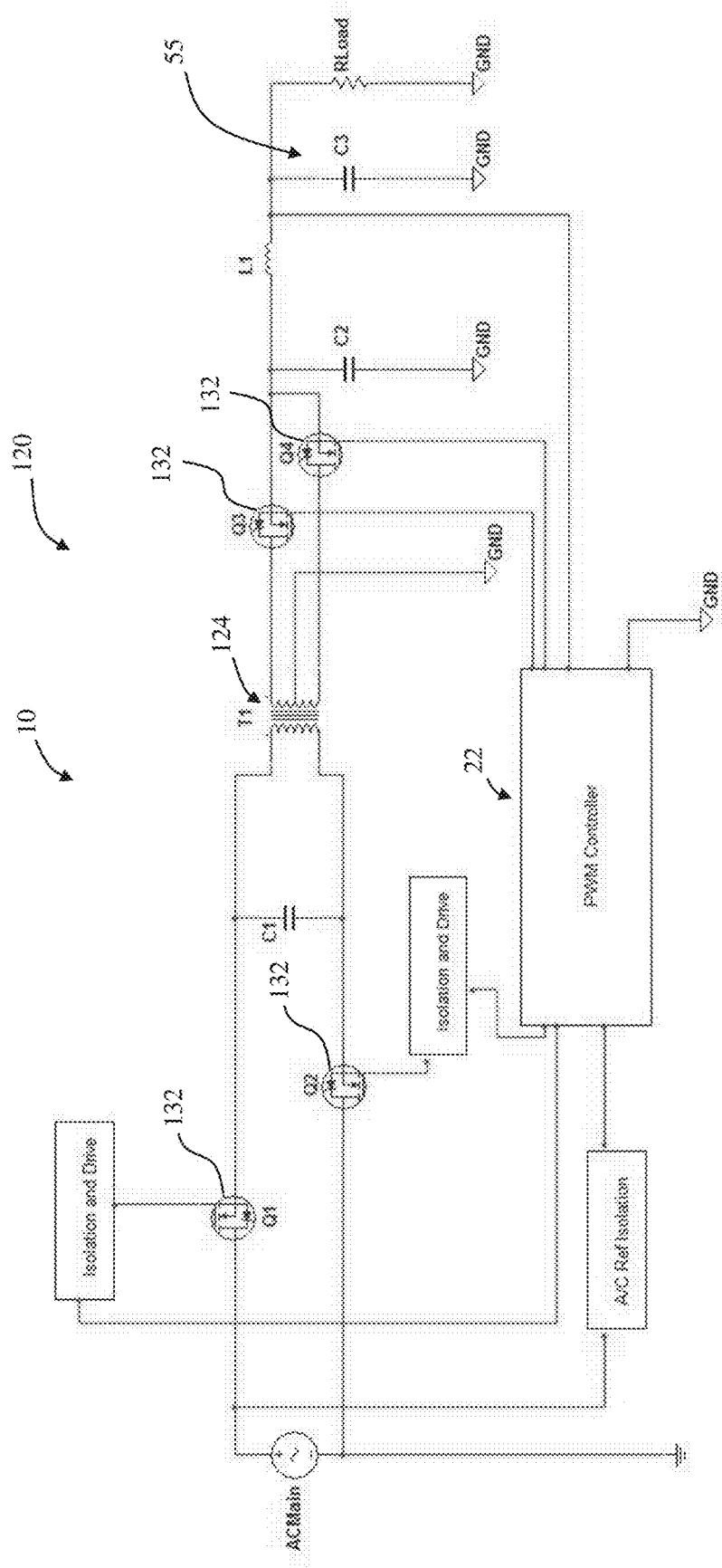
Figure 34:
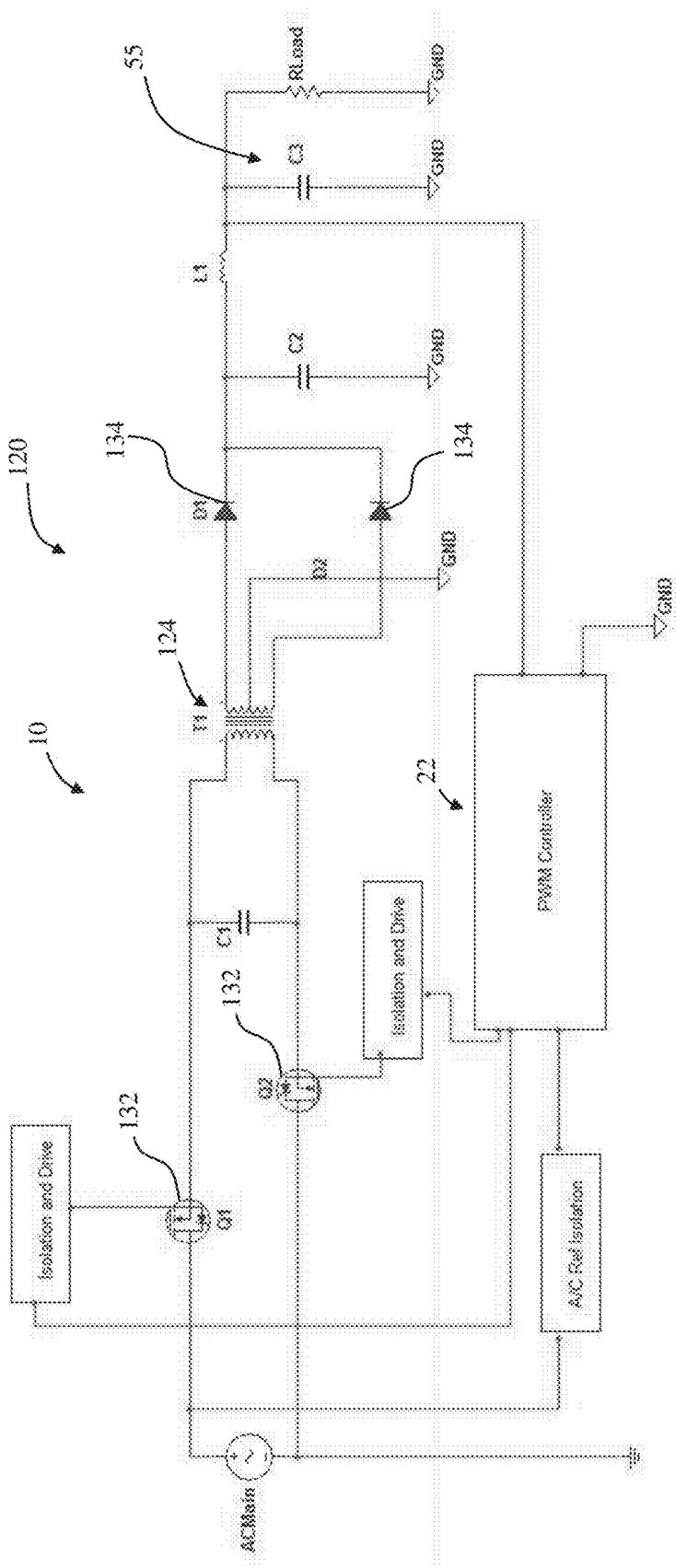
Figure 35:
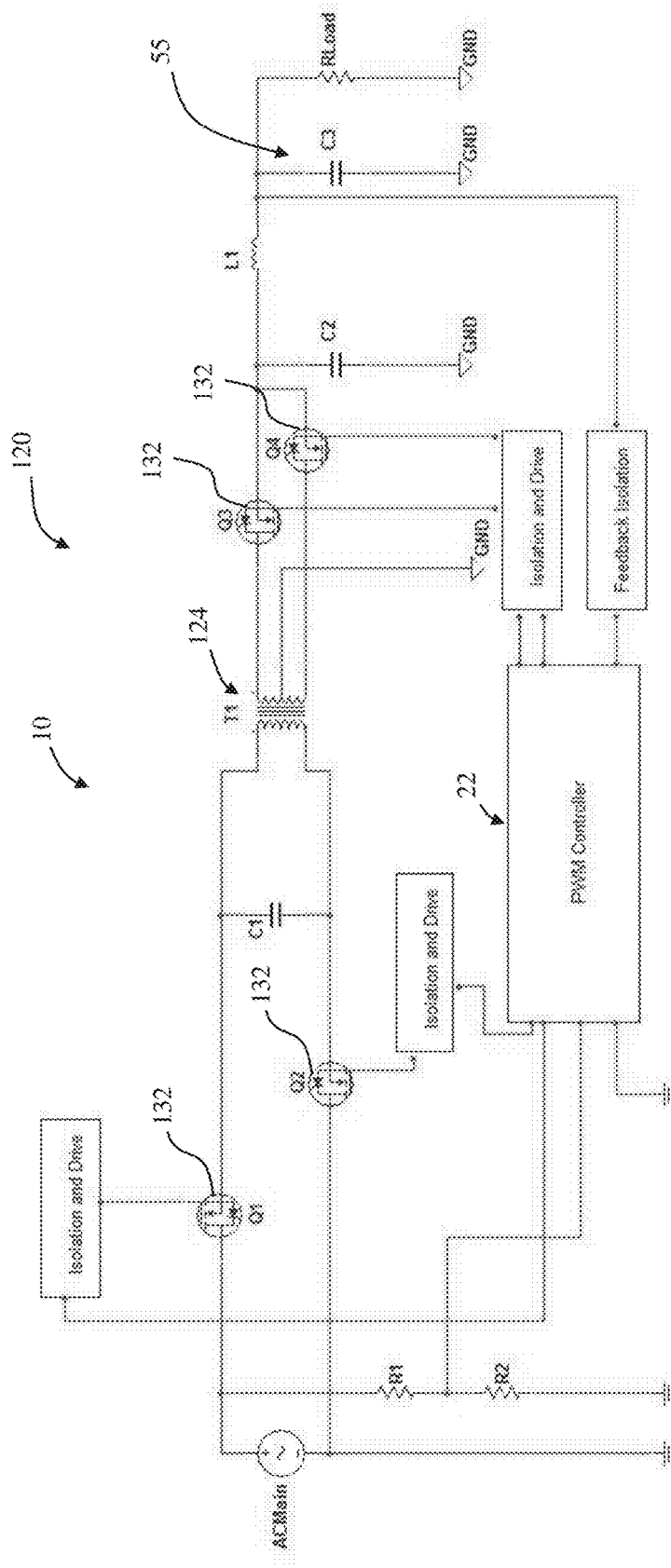
Figure 36:
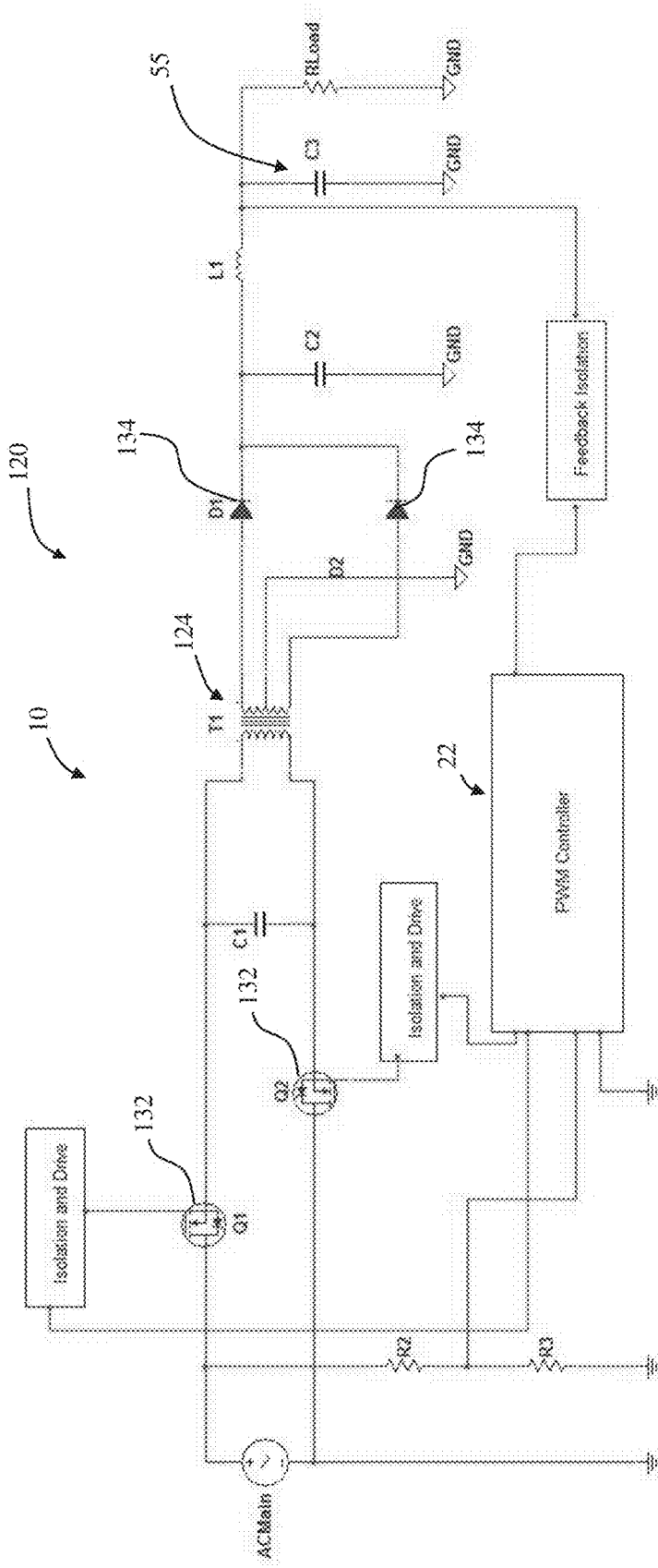
Figure 37:
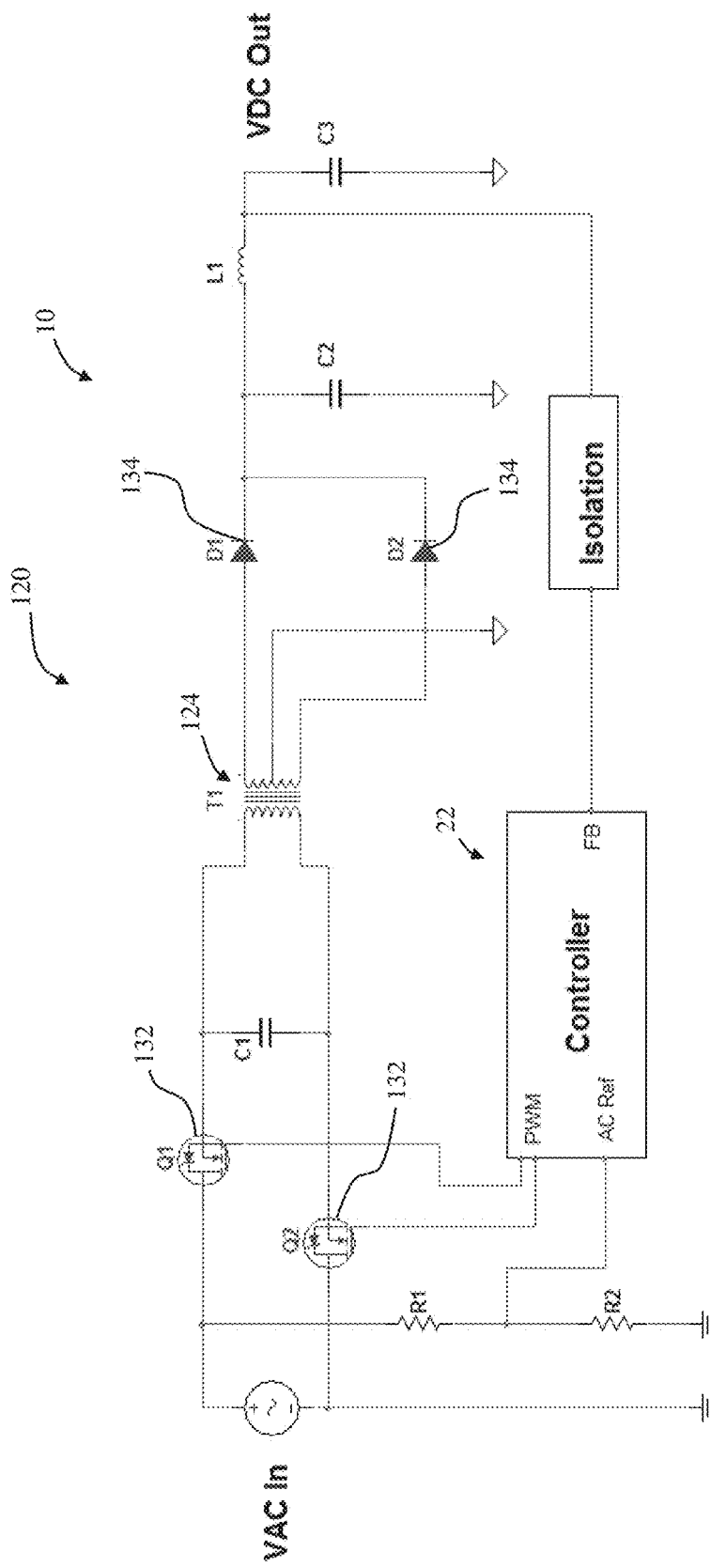
Figure 38:
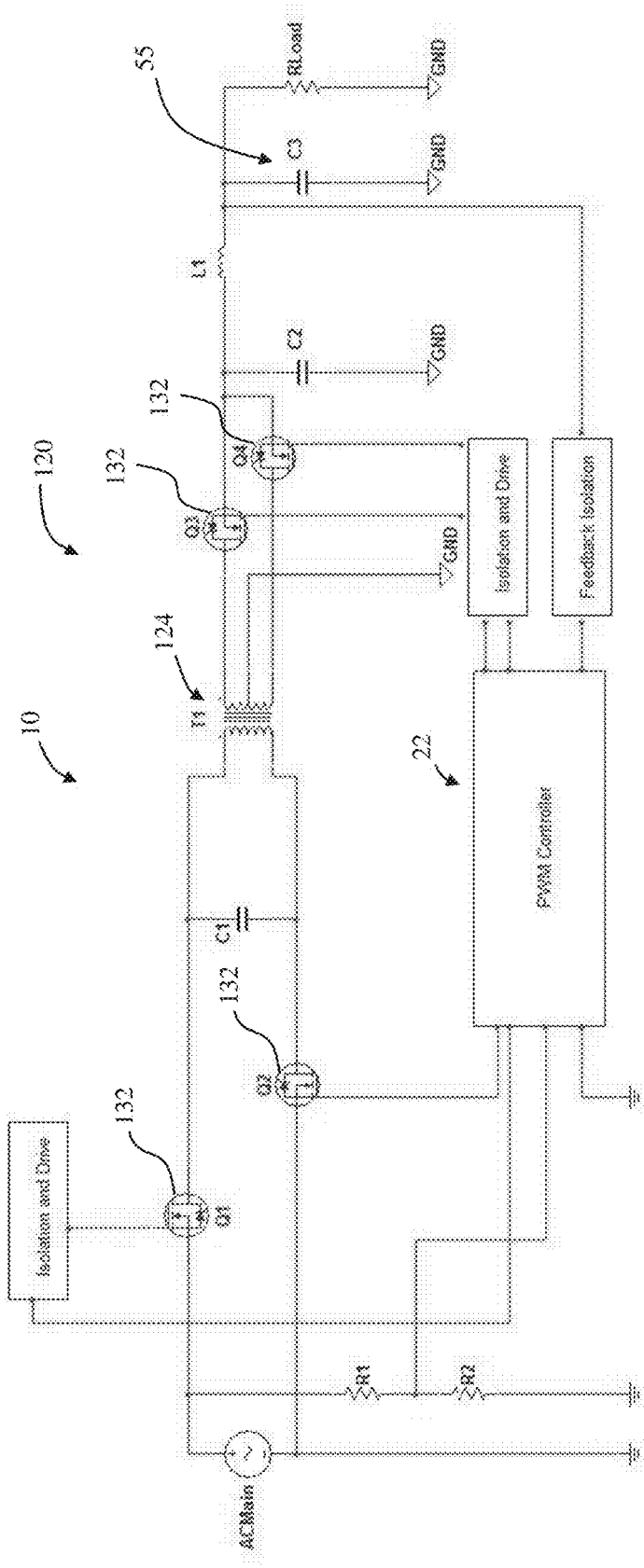
Figure 39:
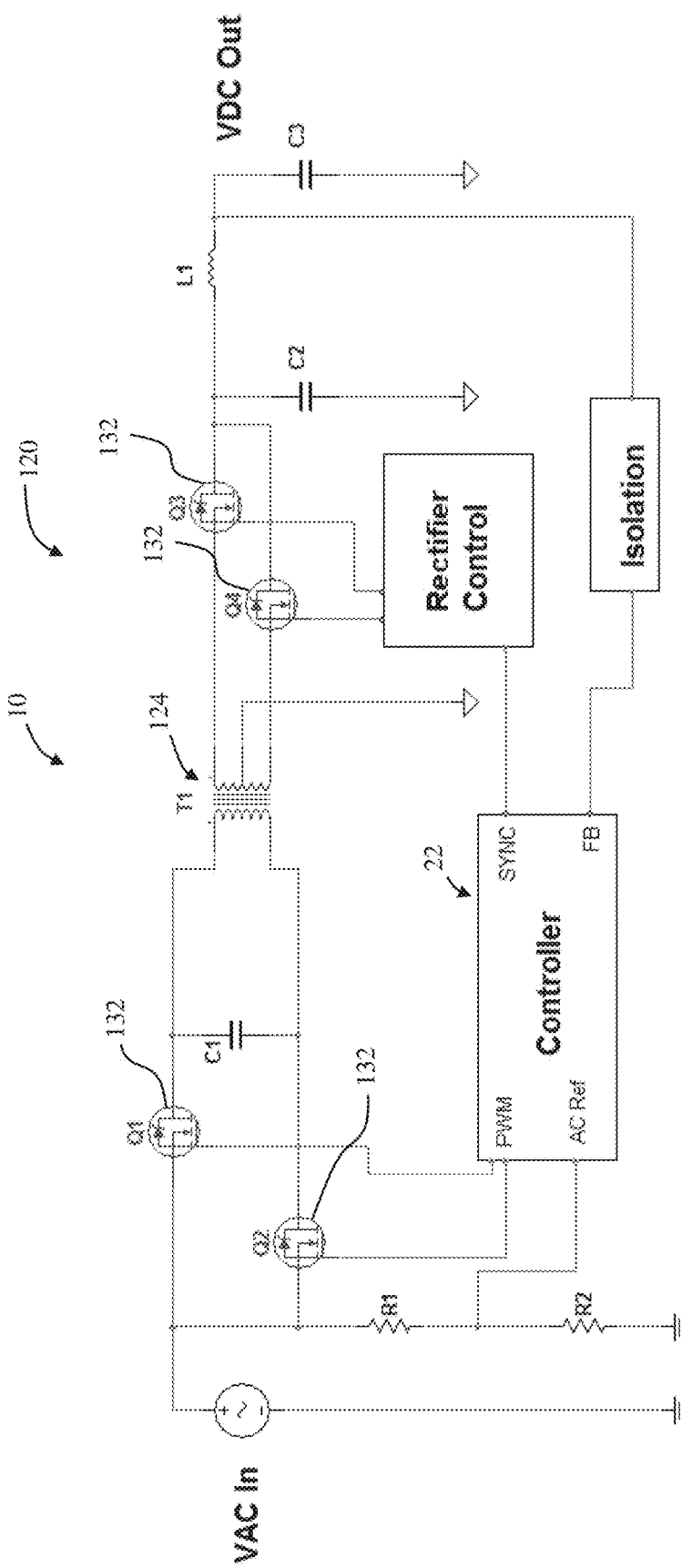
Figure 40:
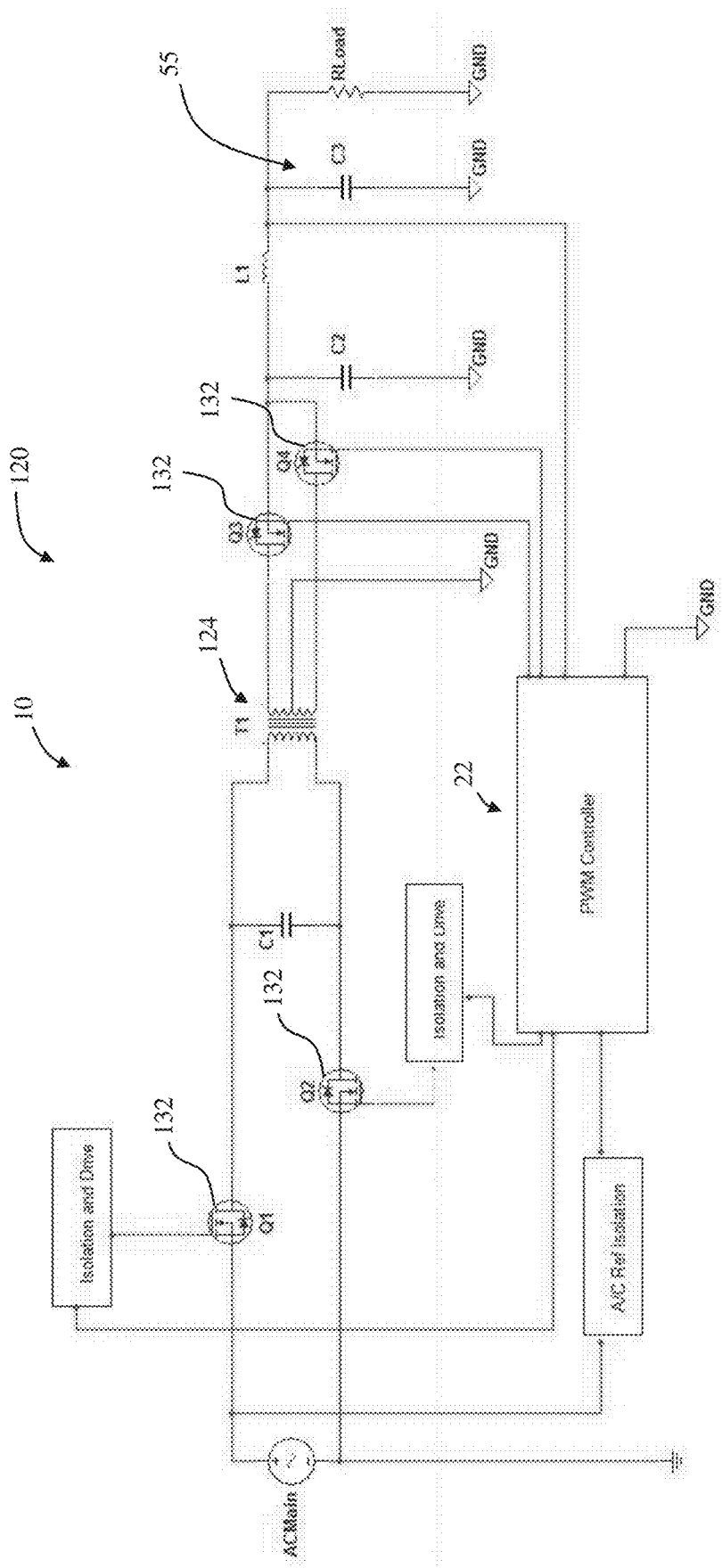

FIG. 29 is a schematic diagram of the BiDFET circuit 120 including a multi-tap transformer. FIG. 30 is a schematic diagram of the BiDFET circuit 120 including the BiDFET with FET source connected to the AC main, asynchronous secondary, and PWM controller referenced to secondary. FIG. 31 is a schematic diagram of the BiDFET circuit 120 including an asynchronous BiDFET with FETs blocking current from the transformer. FIG. 32 is a schematic diagram of the BiDFET circuit 120 including the BiDFET with single side switching. FIG. 33 is a schematic diagram of the BiDFET circuit 120 including the BiDFET with FET source connected to the transformer, synchronous secondary, and PWM controller referenced to secondary. FIG. 34 is a schematic diagram of the BiDFET circuit 120 including the BiDFET with FET source connected to the transformer and PWM controller referenced to asynchronous secondary. FIG. 35 is a schematic diagram of the BiDFET circuit 120 including the BiDFET with FET source connected to the transformer, synchronous secondary, and PWM controller referenced to primary. FIG. 36 is a schematic diagram of the BiDFET circuit 120 including the BiDFET with FET source connected to the transformer, asynchronous secondary, and PWM controller referenced to primary. FIG. 37 is a schematic diagram of the BiDFET circuit 120 with asynchronous BiDFET with FETs blocking current from AC source. FIG. 38 is a schematic diagram of the BiDFET circuit 120 including the BiDFET with FET source connected to the AC main, synchronous secondary, and PWM controller referenced to primary. FIG. 39 is schematic diagram of the BiDFET circuit 120 including synchronous BiDFET with FETs blocking current from the transformer. FIG. 40 is a schematic diagram of the BiDFET circuit 120 including the BiDFET with FET source connected to the AC main and PWM controller referenced to synchronous secondary. FIG. 41 is a schematic diagram of the BiDFET circuit 120 including the BiDFET with FET source connected to the AC main, asynchronous secondary, and PWM controller referenced to primary.

In one embodiment, the BiDFET 122 does not include a diode and includes an 'N' channel FETs 132 that opposes the current on the high side of the transformer 124 and a diode 134 (shown in FIGS. 30 and 31) on the low side of the transformer 124 (and similarly for the other half of the wave). As shown in FIGS. 30 and 31, during operation, during the positive half of the wave FET Q1 is toggled at the switching frequency and FET Q2 is on and serves as a forward biased diode. In addition, a reverse biased FET can't be turned off because of the forward biased body diode, but it can be turned on even with current flowing backwards. So, if the FET is turned on then the result is a very small resistor in parallel with the diode so that as long as the $R_{DS(ON)}$ is lower than the effective resistance of the diode the diode drop is effectively removed as well, improving efficiency. In another embodiment, for increased efficiency, D1 and D2 are replaced with synchronous FETS (as shown in FIG. 33).

Figure 43:
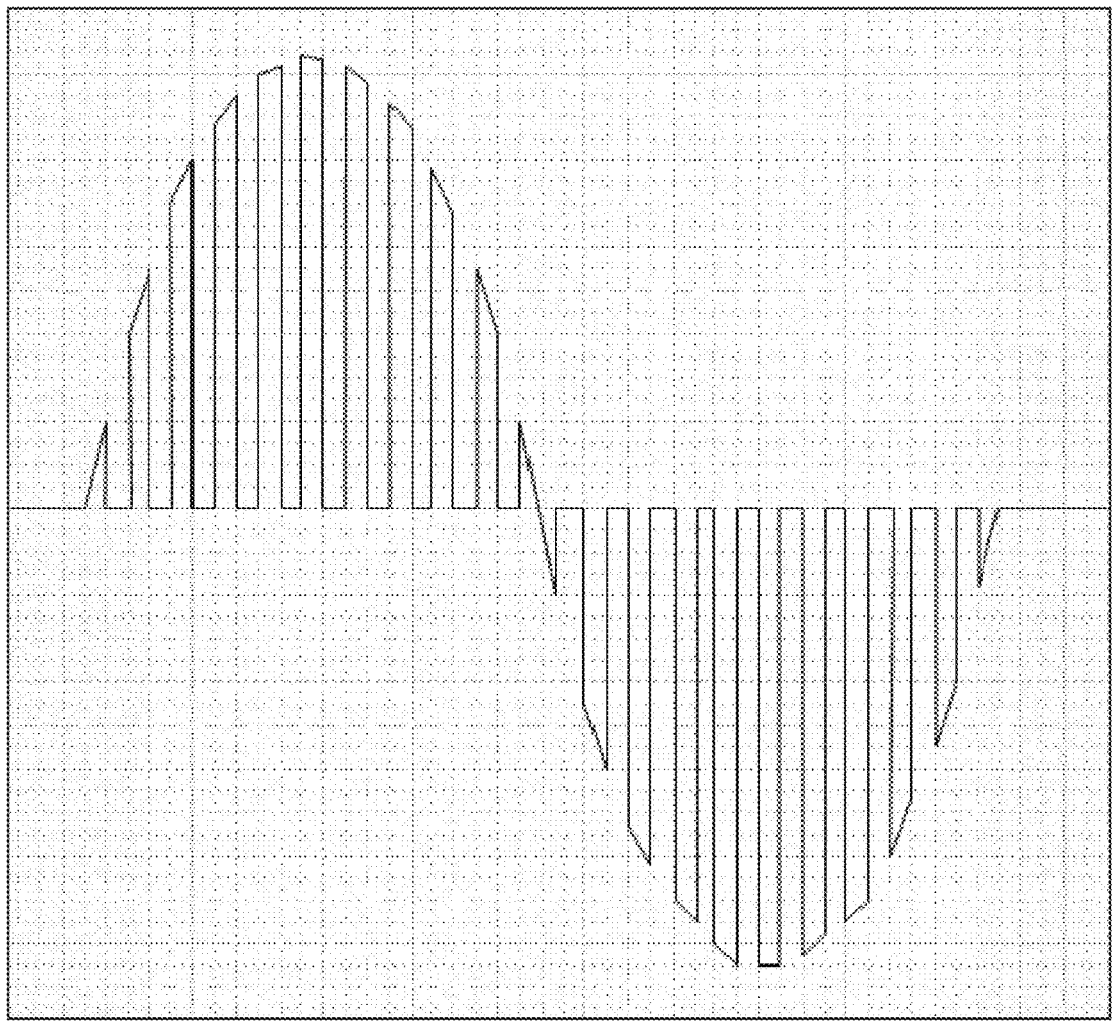
FIGS. 43 and 44 are graphic illustrations of the power output of the bi-directional field effect transistor shown in FIGS. 26-42, according to an embodiment of the present invention.
Figure 44:
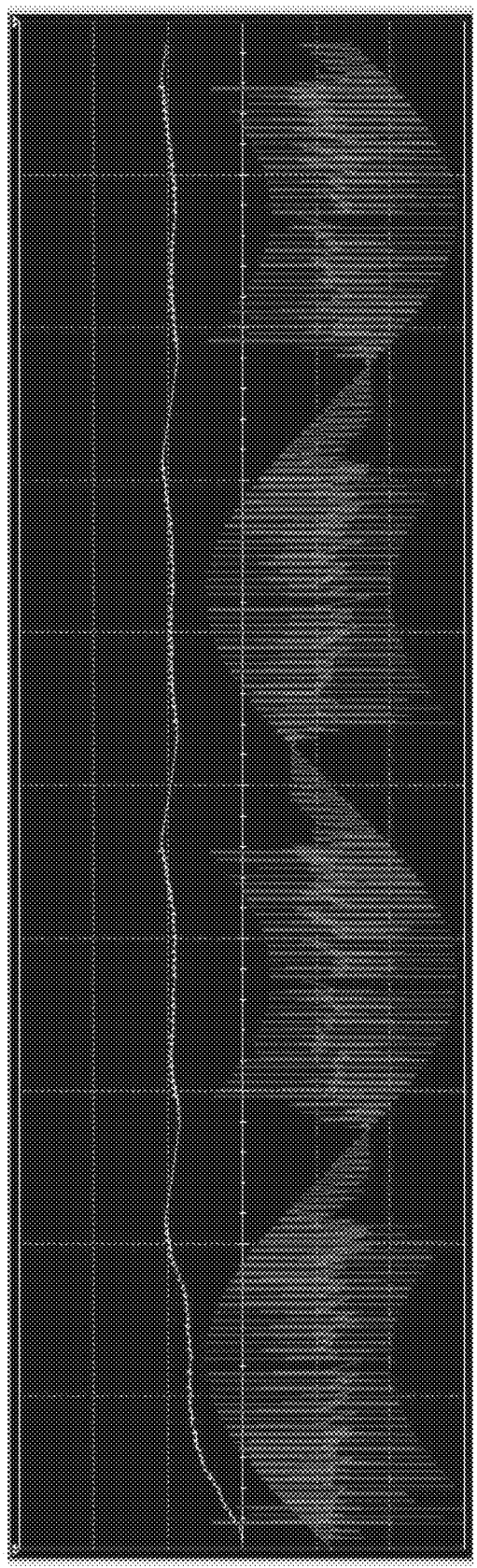

Referring to FIGS. 43 and 44 during operation, the BiDFET circuit 120 is configured to "chop up" a low frequency (50-60 cycle) AC voltage into much smaller segments by operating at a much higher frequency. For example, during operation an input AC power signal may be chopped into much finer pieces at a rate equal to about 50 to 60 Khz, or up to 1 Mhz or more if the switch losses are low enough to warrant such a faster chop rate. A higher BiDFET switching rate leads to smaller parts but higher switching losses. In addition, an operation of the BiDFET circuit 120 may be optimized to operate at an efficient frequency using the $R_{on}$ features of the BiDFET circuit 120.

FIG. 43 illustrates a "chopped" frequency wave generated by the BiDFET circuit 120 demonstrating that the BiDFET chops both the positive and negative segments of the sign wave. In addition, the control element 22 includes a PWM protocol enables the BiDFET to generate the "chops" narrow at the highest voltage and "fatter" closer to the zero point crossing, where the least energy exists in AC waveform. This minimizes the pulsating effect inherent in these chops on both the positive and negative segments of the sign wave.

In the illustrated embodiment, the power circuit 10 includes a high-speed AC switch, operated by a PWM signal from the control element 22 slicing both the positive and negative segments of a 50/60 sine wave. However, the BiDFETs are not limited to any specific frequency and could manage any given frequency at the right controller speed. In addition, in one embodiment, the BiDFETs 122 may be operated similar to fast Triacs (which are also AC switches but operate at relatively low speeds). The BiDFET 122 is a high-speed switcher including switching speeds within a range between about 50 Kz-1 MHz, and/or greater than 1 MHz.

Referring to FIGS. 27-41, in the illustrated embodiment, the two BiDFETs 122 are directly controlling the AC Mains input instead of a full wave bridge rectifier 24 and large filter capacitor 26. This reduces initial intake parts count and defers the AC/DC conversion to the isolated (low power) side of the circuitry, as is customary; resulting in an energy savings though reduced part count and rectification on the lower voltage side of the circuit. In addition, even though there is not a true "continuous" current (due to the low current at zero crossovers) the power circuit 10 includes one or more final output supply capacitors 55 that store the energy. This final capacitor 55 is sized to hold sufficient current between AC cycles for the desired constant output current, and further minimizes or erases any current diminishment due to the lower energy at the zero crossings.

The power circuit 10 also includes a simplified driver circuit because one BiDFET at a time is driven on the cycle being sliced, and the other just "flaps in the breeze" without energy loss when its cycle is not extant. For example, during operation, when the AC is positive, it will all go through one-half of the BiDFET (top FET(s)), when the AC turns negative, it will go through the other half of the BiDFET (bottom FET(s)). In addition, the AC at the output not being "continuous" is not a problem, because a capacitor and/or a super capacitor will be placed on the secondary, which, when sized right for the output voltage, will, itself, sustain constant DC for the power output required. In a complete system, this is an advantage as the feedback loop, and current sense loop can control the BiDFET System, which will work with slow PWM switching stand-by power, thus permitting high energy efficiencies on diminishing (almost fully charged) loads and/or no load (momentary "wake-up" to sense and sustain the load/connection).

Figure 45:
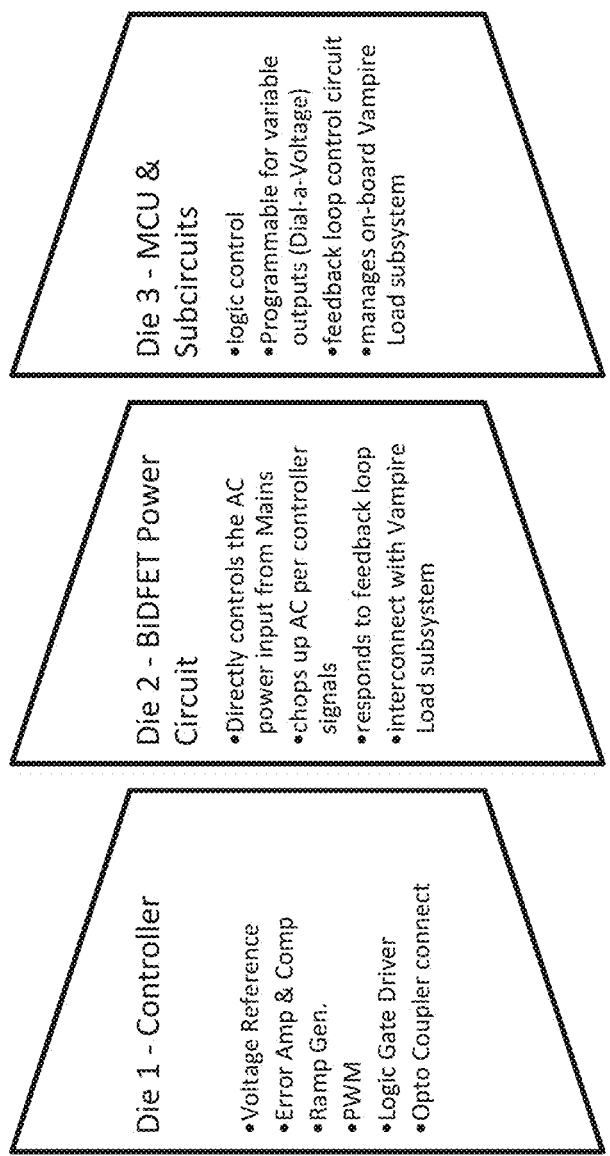
FIG. 45 is a block diagram of a process for manufacturing the power circuit shown in FIGS. 26-42, according to an embodiment of the present invention.

FIG. 45 is a block diagram of a process that may be used to manufacture the power circuit 10 shown in FIGS. 26-42 as integrated into a hybrid package. In the illustrated embodiment, the BiDFET circuit would contain its "Controller/Driver" (Die 1) and incorporate an opto coupler to allow any external control to be a logic level and isolated from any of the voltages that the BiDFETs are controlling. The BCD process could be used for this integration. The Controller will be powered by an internal power supply on the die. In one embodiment, the BiDFETs may be packaged using only a single BiDFET die in package.

Many modifications and variations of the present invention are possible in light of the above teachings. The invention may be practiced otherwise than as specifically described within the scope of the appended claim.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Other aspects and features of the invention can be obtained from a study of the drawings, the disclosure, and the appended claims. The invention may be practiced otherwise than as specifically described within the scope of the appended claims. It should also be noted, that the steps and/or functions listed within the appended claims, notwithstanding the order of which steps and/or functions are listed therein, are not limited to any specific order of operation.

Although specific features of various embodiments of the invention may be shown in some drawings and not in others, this is for convenience only. In accordance with the principles of the invention, any feature of a drawing may be referenced and/or claimed in combination with any feature of any other drawing.

What is claimed is:

1. An electrical circuit for providing electrical power for use in powering electronic devices, comprising:
   a full-wave synchronous rectification circuit electrically coupled to an electrical power source for receiving an alternating current (AC) input power signal from the electrical power source and generating a modified AC power signal, the full-wave synchronous rectification circuit including at least one field effect transistor (FET);
   a quasi-resonant circuit electrically coupled to the full-wave synchronous rectification circuit for receiving the modified AC power signal and delivering an intermediate power signal, the quasi-resonant circuit including a first switching device that is coupled to the full-wave synchronous rectification circuit, a diode coupled in series between the first switching device and a first inductor, and a first capacitor that is coupled to the first inductor;
   a power converter circuit electrically coupled to the quasi-resonant circuit through a second capacitor and a second inductor for receiving the intermediate power signal and delivering a direct current (DC) output power signal to an electronic device, the power converter circuit including a transformer and a second switching device coupled to a primary side of the transformer;
   a Hall Effect sensor coupled to the primary side of the transformer for sensing a magnetic field being generated by the transformer; and
   a controller configured to:
      regulate the first and the second switching devices to regulate the transformer to deliver the DC output power signal at a lower voltage level than the AC input power signal; and identify a zero crossing of the transformer as a function of the sensed magnetic field and operate the second switching device to deliver input power to the transformer near the identified transformer zero crossing.

2. The electrical circuit of claim 1, wherein the controller regulates the first and the second switching devices as a function of a current level of the DC output power signal and a predefined output voltage level.

3. The electrical circuit of claim 1, wherein the controller regulates the first and the second switching devices as a function of a voltage level of the DC output power signal.

4. The electrical circuit of claim 1, wherein the controller regulates the full-wave synchronous rectification circuit and the first and the second switching devices as a function of a voltage level of the DC output power signal.

5. The electrical circuit of claim 1, further comprising a voltage sensor coupled to the transformer for sensing a voltage level of power being generated by the transformer, the controller configured to determine a zero crossing of the transformer as a function of the sensed voltage level.

6. The electrical circuit of claim 1, further comprising a startup circuit including a low power regulator circuit that is connected to the power source for providing start-up power to the controller.

7. The electrical circuit of claim 6, further comprising a vampire load subsystem coupled to the low power regulator circuit and configured to disable the power converter circuit if a current level of the DC output power signal is lower than a threshold current level and to subsequently enable the power converter circuit when the current level of the DC output power signal is higher than the threshold current level.

8. The electrical circuit of claim 1, wherein the full-wave synchronous rectification circuit includes at least one diode.

9. The electrical circuit of claim 1, further comprising:
a synchronous rectifier circuit coupled to a secondary side of the transformer, the synchronous rectifier circuit including:
a synchronous switching device coupled to the secondary side of the transformer; and
a synchronous control device coupled to the synchronous switching device for regulating the synchronous switching device to deliver the DC output power signal, the synchronous control device coupled to the controller for receiving a synchronization control signal from the controller and regulating the synchronous switching device as a function of the received synchronization control signal.

10. An apparatus for providing electrical power for use in powering electronic devices, comprising:
a semiconductor chip;
a full-wave synchronous rectification circuit formed on the semi-conductor chip, the full-wave synchronous rectification circuit adapted to be electrically coupled to an electrical power source for receiving an AC input power signal from the electrical power source and generating a modified AC power signal, the full-wave synchronous rectification circuit including at least one field effect transistor;
a quasi-resonant circuit electrically coupled to the full-wave synchronous rectification circuit for receiving the modified AC power signal and delivering an intermediate power signal, the quasi-resonant circuit including a first switching device that is coupled to the full-wave synchronous rectification circuit, a diode coupled in series between the first switching device and a first inductor, and a first capacitor that is coupled to the first inductor;
a power converter circuit electrically coupled to the quasi-resonant circuit through a second capacitor and a second inductor for receiving the intermediate power signal and delivering a DC output power signal to an electronic device, the power converter circuit including a transformer and a second switching device coupled to a primary side of the transformer;
a Hall Effect sensor coupled to the primary side of the transformer for sensing a magnetic field being generated by the transformer; and
a controller configured to:
regulate the first and the second switching devices to regulate the transformer to deliver the DC output power signal at a lower voltage level than the AC input power signal; and
identify a zero crossing of the transformer as a function of the sensed magnetic field and operate the second switching device to deliver input power to the transformer near the identified transformer zero crossing.

11. The apparatus of claim 10, wherein the second switching device includes a bi-directional FET circuit including a pair of FETs coupled in parallel.

12. The apparatus of claim 10, further comprising a voltage sensor coupled to the transformer for sensing a voltage level of power being generated by the transformer, the controller configured to determine a zero crossing of the transformer as a function of the sensed voltage level.

13. The apparatus of claim 10, further comprising a startup circuit including a low power regulator circuit that is connected to the power source for providing start-up power to the controller.

14. The apparatus of claim 13, further comprising a vampire load subsystem coupled to the low power regulator circuit and configured to disable the power converter circuit if a current level of the DC output power signal is lower than a threshold current level, and subsequently enable the power converter circuit when the current level of the DC output power signal is higher than the threshold current level.

15. The apparatus of claim 10, further comprising:
a synchronous rectifier circuit coupled to a secondary side of the transformer, the synchronous rectifier circuit including:
a synchronous switching device coupled to the secondary side of the transformer; and
a synchronous control device coupled to the synchronous switching device for regulating the synchronous switching device to deliver the DC output power signal, the synchronous control device coupled to the controller for receiving a synchronization control signal from the controller and regulating the synchronous switching device as a function of the received synchronization control signal.

16. A method of assembling an electrical circuit, comprising the steps of:
forming full-wave synchronous rectification circuit on a semi-conductor chip, the full-wave synchronous rectification circuit adapted to be electrically coupled to an electrical power source for receiving an AC input power signal from the electrical power source and generating a modified AC power signal, the full-wave synchronous rectification circuit including at least one field effect transistor;
coupling a quasi-resonant circuit electrically coupled to the full-wave synchronous rectification circuit for receiving the modified AC power signal and delivering an intermediate power signal, the quasi-resonant circuit including a first switching device that is coupled to the full-wave synchronous rectification circuit, a diode coupled in series between the first switching device and a first inductor, and a first capacitor that is coupled to the first inductor;

coupling a power converter circuit to the quasi-resonant circuit through a second capacitor and a second inductor for receiving the intermediate power signal and delivering a DC output power signal to an electronic device, the power converter circuit including a transformer and a second switching device coupled to a primary side of the transformer;

a Hall Effect sensor coupled to the primary side of the transformer for sensing a magnetic field being generated by the transformer; and coupling a controller circuit to the quasi-resonant circuit, the power converter circuit, and the Hall Effect sensor, the control circuit including a controller configured to regulate the first and the second switching devices to regulate the transformer to deliver the DC output power signal at a lower voltage level than the AC input power signal, and identify a zero crossing of the transformer as a function of the sensed magnetic field and operate the second switching device to deliver input power to the transformer near the identified transformer zero crossing.

* * * * *